US010452743B2

(12) United States Patent
Dong et al.

(10) Patent No.: US 10,452,743 B2
(45) Date of Patent: Oct. 22, 2019

(54) VIDEO AND DATA PROCESSING USING EVEN-ODD INTEGER TRANSFORMS

(71) Applicant: VID Scale, Inc., Wilmington, DE (US)

(72) Inventors: Jie Dong, San Diego, CA (US); Yan Ye, San Diego, CA (US)

(73) Assignee: VID SCALE, INC., Wilmington, DE (US)

(*) Notice: Subject to any disclaimer, the term of this patent is extended or adjusted under 35 U.S.C. 154(b) by 1211 days.

(21) Appl. No.: 13/669,844

(22) Filed: Nov. 6, 2012

(65) Prior Publication Data

US 2013/0114732 A1 May 9, 2013

Related U.S. Application Data

(60) Provisional application No. 61/556,681, filed on Nov. 7, 2011, provisional application No. 61/556,823, filed on Nov. 7, 2011.

(51) Int. Cl.
*G06F 17/14* (2006.01)
*H04N 19/122* (2014.01)
*H04N 19/61* (2014.01)

(52) U.S. Cl.
CPC ......... *G06F 17/147* (2013.01); *H04N 19/122* (2014.11); *H04N 19/61* (2014.11)

(58) Field of Classification Search
CPC ........ H04N 7/30; H04N 19/61; H04N 19/122; G06F 17/147

(Continued)

(56) References Cited

U.S. PATENT DOCUMENTS 5,825,935 A 10/1998 Murakoshi
6,856,262 B2 2/2005 Mayer et al.
(Continued)

FOREIGN PATENT DOCUMENTS

CN 1697328 11/2005
CN 101855909 7/2012
(Continued)

OTHER PUBLICATIONS

Hong, Y.M., M.-S. Cheon, I-K., Kim, "Low-complexity 16×16 and 32×32 transforms and partial frequency transform", Joint Collaborative Team on Video Coding (JCT-VC) 3rd Meeting: Guangzhou, CN, Oct. 7-15, 2010.*

(Continued)

*Primary Examiner* — Richard A Hansell, Jr.
(74) *Attorney, Agent, or Firm* — Julian F. Santos

(57) ABSTRACT

Methods, apparatuses and systems for integer transforms, and/or integer transform operations, for transforming data (e.g., residual video data) are disclosed. Included among such methods, apparatuses and systems is an apparatus that may include a processor and memory. The memory may include a set of transform matrices and instructions executable by the processor for transforming data (e.g., residual video data) using any of the set of transform matrices. Each transform matrix of the set of transform matrices may be orthogonal or, alternatively, may be approximately orthogonal and be fully factorizable. Each transform matrix of the set of transform matrices may have a different number of elements. Each element of the respective number of elements is an integer. Differences among norms of basis vectors of each transform matrix satisfy a given threshold, and the basis vectors approximate corresponding basis vectors of a discrete cosine transform (DCT) matrix.

27 Claims, 18 Drawing Sheets

PARTIAL FACTORIZATION STRUCTURE FOR A FORWARD TRANSFORM

(58) Field of Classification Search
USPC .............................. 375/E07.226, 240.18–20
See application file for complete search history.

(56) References Cited

U.S. PATENT DOCUMENTS

| | | | |
|---|---|---|---|
| 7,110,338 | B2 | 9/2006 | Cheng et al. |
| 7,123,773 | B2 | 10/2006 | Takeo |
| 7,242,713 | B2 * | 7/2007 | Srinivasan .............. G06T 9/007 375/240.01 |
| 7,302,105 | B2 | 11/2007 | Kajiwara |
| 7,372,999 | B2 | 5/2008 | Oneda et al. |
| 7,487,193 | B2 | 2/2009 | Srinivasan et al. |
| 8,331,454 | B2 | 12/2012 | Bjontegaard et al. |
| 2002/0111979 | A1 | 8/2002 | Sun |
| 2005/0207498 | A1 | 9/2005 | Vitali et al. |
| 2005/0256916 | A1 * | 11/2005 | Srinivasan ............ G06F 17/147 708/400 |
| 2006/0193524 | A1 | 8/2006 | Tarumoto et al. |
| 2006/0291735 | A1 * | 12/2006 | Hou ...................... G06F 17/147 382/240 |
| 2007/0081734 | A1 * | 4/2007 | Sullivan ................ G06F 17/147 382/250 |
| 2009/0122861 | A1 * | 5/2009 | Bjontegaard ......... G06F 17/147 375/240.2 |
| 2012/0230422 | A1 * | 9/2012 | Korodi ................. H04N 19/463 375/240.18 |

FOREIGN PATENT DOCUMENTS

| | | | | |
|---|---|---|---|---|
| EP | | 0854653 | A2 * | 7/1998 ........... G06F 17/147 |
| EP | | 0854653 | A2 * | 7/1998 ........... G06F 17/147 |
| EP | | 1596309 | A2 | 11/2005 |
| JP | | 2003-333598 | | 11/2003 |
| JP | | 2005-327298 | | 11/2005 |
| WO | WO-2010/024907 | | | 3/2010 |

OTHER PUBLICATIONS

Joshi, R., and M. Karczewicz, "Recursive factorization for 16 and 32-point transforms using 4 and 8-point HM 3.0 core transforms", Joint Collaborative Team on Video Coding (JCT-VC) 6th Meeting: Torino, IT, Jul. 14-22, 2011.*

Dong, J., K.N. Ngan, C-K.,Fong, and W-K., Cham, 2-D Order-16 Integer Transforms for HD Video Coding, IEEE Transactions on Circuits and Systems for Video Technology, vol. 19, No. 10, Oct. 2009.*

Lee J., N. Vijaykrishnan, M.J. Irwin, Inverse Discrete Cosine Transform Architecture Exploiting Sparseness and Symmetry Proerties, IEEE Transactions on Circuits and systems for Video Technology, vol. 16, No. 5, May 2006.*

Hong, Y.M., M.-S. Cheon, I-K., Kim, "Low-complexity 16×16 and 32×32 transforms and partial frequency transform", Joint Collaborative Team on Video Coding (JCT-VC) 3rd Meeting: Guangzhou, CN, Oct. 7-15, 2010 (Year: 2010).*

Joshi, R., and M. Karczewicz, "Recursive factorization for 16 and 32-point transforms using 4 and 8-point HM 3.0 core transforms", Joint Collaborative Team on Video Coding (JCT-VC) 6th Meeting: Torino, IT, Jul. 14-22, 2011 (Year: 2011).*

Dong, J., K.N. Ngan, C-K.,Fong, and W-K., Cham, 2-D Order-16 Integer Transforms for HD Video Coding, IEEE Transactions on Circuits and Systems for Video Technology, vol. 19, No. 10, Oct. 2009 (Year: 2009).*

Lee J., N. Vijaykrishnan, M.J. Irwin, Inverse Discrete Cosine Transform Architecture Exploiting Sparseness and Symmetry Proerties , IEEE Transactions on Circuits and systems for Video Technology, vol. 16, No. 5, May 2006 (Year: 2006).*

"Written Opinion of the International Preliminary Examining Authority", International Application No. PCT/US2012/063709, dated Dec. 2, 2013, 10 pages.

"International Search Report and the Written Opinion of the International Searching Authority, or the Declaration", International Patent Application No. PCT/US2012/06307, dated Jun. 26, 2013, 25 pages.

Dong, Jie, et al., "Core Transform Design for High-Efficiency Video Coding", Proceedings of Spie, vol. 8499, Oct. 15, 2012, pp. 84990T1-84990T13, XP055055979, ISSN: 0277-786X, DOI: 10.1117/12. 954129, Oct. 15, 2012, 13 pages.

Hong, Y-M, et al., "Low-complexity 16×16 and 32×32 Transforms and Partial Frequency Transform", JCT-VC Meeting; 94. MPEG Meeting; Oct. 7, 2010-Oct. 15, 2010; Guangzuou; (Joint Collaborative Team on Video Coding of ISO/IEC JTC1/SC29/WG11 and ITU-T SG.16); URL: http://wfp3.itu.int/av-arch/jctvc-site/ JCTVC-C209, Oct. 2, 2010; xP030007916, abstract sections 1, Oct. 15, 2010, 8 pages.

Kim, Il-Koo, et al., "CE10: Fast Integer Transform Based on Modified Loeffler's Factorization", Document: JCTVC-E277; Joint Collaborative Team on Video Coding (JCT-VC) of ITU-T SG16 WP3 and ISO/IEC JTC1/SC29/WG11, 5th Meeting: Geneva, CH, Mar. 16-23, 2011, Mar. 23, 2011, 12 pages.

Loeffler, C., et al., "Practical Fast 1-D DCT Algorithms with 11 Multiplications", Speech Processing 2, Digital Signal Processing; Glasgow, May 23-26, 1989; International Conference on Acoustics, Speech & Signal Processing, New York, IEEE, US, vol. 2, May 23, 1989, May 23, 1989, 4 pages.

"Invitation to Pay Additional Fees and, Where Applicable, Protest Fee", PCT Form 205, International Application No. PCT/US2012/063709, dated Jan. 13, 2013, 6 pages.

Alshina, et al., "CE10: Full-factorized core transform proposal by Samsung/FastVDO", Joint Collaborative Team on Video Coding (JCT-VC) of ITU-T SG16 WP3 and ISO/IEC JTC1/SC29/WG11 6th Meeting: Torino, IT, Jul. 14-22, 2011; Document: JCTVC-F251, Jul. 2011, 17 Pages.

Alshina, et al., "CE10: Full Factorization Core Transforms for HEVC", JCTVC-G737, 10 pages.

Alshina, et al., "CE10: Full Factorization Core Transforms for HEVC", Joint Collaborative Team on Video Coding (JCT-VC) of ITU-T SG16 WP3 and ISO/IEC JTC1/SC29/WG11 7th Meeting: November, Jul. 14-22, 2011; Document: JCTVC-G737-r2, Jul. 14-22, 2011, 27 pages.

Cham, et al., "An Order-16 Integer Cosine Transform", IEEE Transactions on Signal Processing. vol. 39. No. 5, May 1991, 4 Pages.

Cham, W.-K, "Development of Integer Cosine Transforms by the Principle of Dyadic Symmetry", IEE Proceedings, vol. 136, Pt. I, No. 4, Aug. 1989, 7 Pages.

Chen, et al., "A Fast Computational Algorithm for the Discrete Cosine Transform", IEEE Transactions on Communications, vol. COM-25, No. 9, Sep. 1977, 6 pages.

Dong, et al., "2-D Order-16 Integer Transforms for HD Video Coding", IEEE Transactions on Circuits and Systems for Video Technology, vol. 19, No. 10, Oct. 2009, 13 Pages.

Fong, et al., "LLM Integer Cosine Transform and Its Fast Algorithm", IEEE Transactions on Circuits and Systems for Video Technology, Vol. 22, No. 6, Jun. 2012, 11 pages.

Fong, et al., "Simple Order-16 Integer Transform for Video Coding", Proceedings of 2010 IEEE 17th International Conference on Image Processing, Sep. 26-29, 2010, 4 pages.

Fuldseth, et al., "CE10: Core transform design for HEVC", Joint Collaborative Team on Video Coding (JCT-VC) of ITU-T SG16 WP3 and ISO/IEC JTC1/SC29/WG11 7th Meeting: Geneva, CH, Nov. 21-30, 2011; Document: JCTVC-G495, Nov. 2011, 10 pages.

Fuldseth, et al., "CE10: Core transform design for HEVC", Joint Collaborative Team on Video Coding (JCT-VC) of ITU-T SG16 WP3 and ISO/IEC JTC1/SC29/WG11 6th Meeting: Torino, IT, Jul. 14-22, 2011; Document: JCTVC-F446, Jul. 2011, 13 Pages.

Garcia, et al., "GPU-based 3D wavelet reconstruction with tileboarding", The Visual Computer Sep. 2005, vol. 21, Issue 8-10, pp. 755-763, 9 pages.

(56) References Cited

OTHER PUBLICATIONS

International Telecommunication Union (ITU), "Advanced Video Coding for Generic Audiovisual Services", Series H: Audiovisual and Multimedia Systems; Infrastructure of Audiovisual Services-Coding of Moving Video; ITU-T Tec H.264 and ISO/IEC/MPEG 4 Part 10, Advanced Video Coding for Generic Audiovisual Services, Nov. 2007, 680 pages.
Joshi, et al., "CE10: Scaled orthogonal integer transforms supporting recursive factorization structure", Joint Collaborative Team on Video Coding (JCT-VC) of ITU-T SG16 WP3 and ISO/IEC JTC1/SC29/WG11 6th Meeting: Torino, IT, Jul. 14-22, 2011; Document: JCTVC-F352_r1, Jul. 2011, 12 Pages.
Joshi, et al., "Recursive factorization for 16 and 32-point transforms using 4 and 8-point HM 3.0 core transforms", Joint Collaborative Team on Video Coding (JCT-VC) of ITU-T SG16 WP3 and ISO/IEC JTC1/SC29/WG11 6th Meeting: Torino, IT, Jul. 14-22, 2011; Document: JCTVC-F592, Jul. 2011, 4 Pages.
Joshi, et al., "CE10: Scaled integer transforms supporting recursive factorization structure", Joint Collaborative Team on Video Coding (JCT-VC) of ITU-T SG16 WP3 and ISO/IEC JTC1/SC29/WG11 7th Meeting: Geneva, CH, Nov. 21-30, 2011; Document: JCTVC-G579, Nov. 2011, 7 pages.
Loeffler, et al., "Practical Fast 1-D DCT Algorithms with 11 Multiplications", Acoustics, Speech, and Signal Processing, 1989. ICASSP-89., 1989 International Conference on , vol. No., pp. 988,991 vol. 2, May 23-26, 1989 doi: 10.1109/ICASSP.1989.266596, 4 pages.
Ma, et al., "High-Definition Video Coding with Super-macroblocks", Proc. SPIE 6508, Visual Communications and Image Processing 2007, 650816 (Jan. 29, 2007); doi:10.1117/12.707582, 12 pages.
Mackenzie, Adrian, "Codecs: Encoding/decoding images and sounds", Lancaster University, Jan. 2006, 6 pages.
McCann, et al., "HM3: High Efficiency Video Coding (HEVC) Test Model 3 Encoder Description", Joint Collaborative Team on Video Coding (JCT-VC) of ITU-T SG16 WP3 and ISO/IEC JTC1/SC29/WG11 5th Meeting: Geneva, CH, Mar. 16-23, 2011; Document: JCTVC-E602; Mar. 2011, 35 Pages.
Paul, et al., "Very Low Bit-rate Video Coding", Video Data Management and Information Retrieval: Chapter V, 2005, 49 pages.
Pearlman, et al., "Image Wavelet Coding Systems: Part II of Set Partition Coding and Image Wavelet Coding Systems", Foundations and Trends in Signal Processing, vol. 2, No. 3, 2008, 66 pages.
Qualcomm Inc., "Video Coding Using Extended Block Sizes", International Telecommunication Union; Telecommunication Standardization Sector; Study Period 2009-2012; Jan. 2009, 4 Pages.
Society of Motion Picture and Television Engineers (SMPTE), "Proposed SMPTE Standard for Television: VC-1 Compressed Video Bitstream Format and Decoding Process", SMPTE Draft Standard for Telelvision; SMPTE 421M, Aug. 23, 2005, 500 Pages.
Suhring, Karsten, "Unified Coding Style for the H. 26L Reference Software", Heinrich Hertz Institute, 5 Pages.
Sullivan, et al., "Rate-Distortion Optimization for Video Compression", IEEE Signal Processing magazine, Nov. 1998, 17 Pages.
Taubman, et al., "Highly Scalable Video Compression with Scalable Motion Coding", IEEE Transactions on Image Processing, vol. 13, Issue 8, Aug. 2004, 4 pages.
Topiwala, et al., "CE10: Core transform design", Joint Collaborative Team on Video Coding (JCT-VC) of ITU-T SG16 WP3 and ISO/IEC JTC1/SC29/WG11 6th Meeting: Torino, IT, Jul. 14-22, 2011; Document: JCTVC-E910, Jul. 2011, 5 pages.
Tourapis, et al., "H.264/14496-10 AVC Reference Software Manual", Joint Video Team (JV) of ISO/IEC MPEG & ITU-T VCEG (ISO/IEC JTC1/SC29/WG11 and ITU-T SG16 Q.6) 31st Meeting: London, UK, Jun. 28-Jul. 3, 2009; Document: JCT-AE010; Filename: JCT-AE10.doc, Jul. 2009, 90 Pages.
Wiegand, et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5th Meeting: Geneva, CH, Mar. 16-23, 2011; Document: JCTVC-E603, Mar. 2011, 223 Pages.
Wien, et al., "ICT Comparison for Adaptive Block Transforms", ITU-Telecommunications Standardization Sector; Study Group 16 Question 6; Video Coding Experts Group (VCEG); Twelfth Meeting: Eibsee, Germany, Jan. 9-12, 2001; Jan. 3, 2001, 6 Pages.
"First Notification of Office Action", Chinese Patent Application No. 201280054519.7, dated Nov. 2, 2016, 10 pages.
"First Notification of Office Action (English Translation)", Chinese Patent Application No. 201280054519.7, dated Nov. 2, 2016, 16 pages.
"Official Notice of Rejection", Japanese Patent Application No. 2014-541159, dated Nov. 22, 2016, 4 pages.
"Official Notice of Rejection (English Translation)", Japanese Patent Application No. 2014-541159, dated Nov. 22, 2016, 4 pages.
Joshi, R., et al., "Recursive factorization for 16 and 32-point transforms using 4 and 8-point HM 3.0 core transforms", Joint Collaborative Team on Video Coding (JCT-VC) of ITU-T SG16 WP3 and ISO/IEC JTC1/SC29/WG11 6th Meeting: Torino, IT, Jul. 14-22, 2011, 11 pages.
"Examination Notification", Taiwanese Patent Application No. 105126956, dated Aug. 9, 2017, 12 pages.
"Examination Notification (English Translation)", Taiwanese Patent Application No. 105126956, dated Aug. 9, 2017, 7 pages.
"Examination Notification", Taiwanese Patent Application No. 101141217, dated Apr. 21, 2016, 10 pages.
"Examination Notification (English Translation)", Taiwanese Patent Application No. 101141217, dated Apr. 21, 2016, 5 pages.
Lee, Jooheung, et al., "Inverse Discrete Cosine Transform Architecture Exploiting Spareness and Symmetry Properties", IEEE Transactions on Circuits and Systems for Video Technology; vol. 16, No. 5, May 2006, 8 pages.

* cited by examiner

FIG. 2

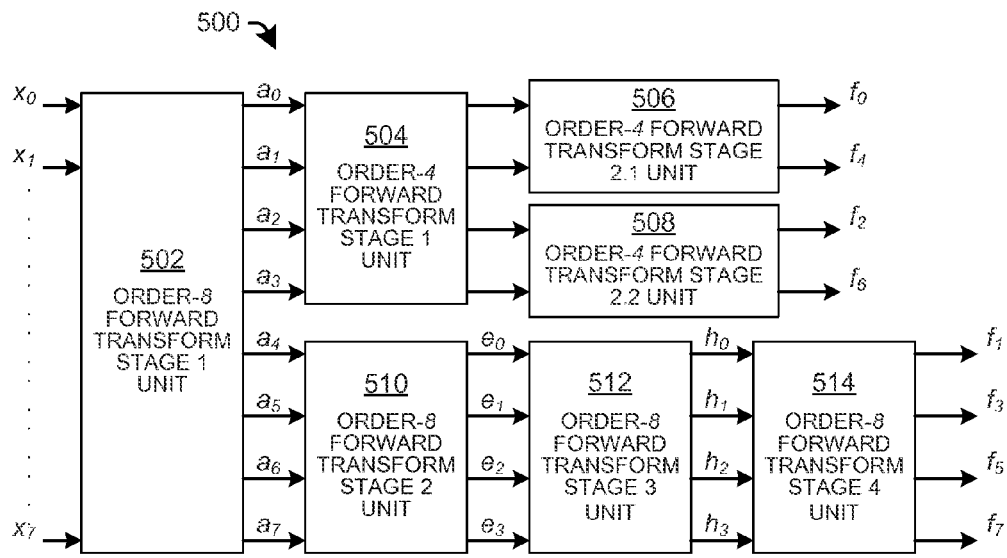
FIG. 5A - FULL FACTORIZATION STRUCTURE FOR AN ORDER-*8* FORWARD TRANSFORM
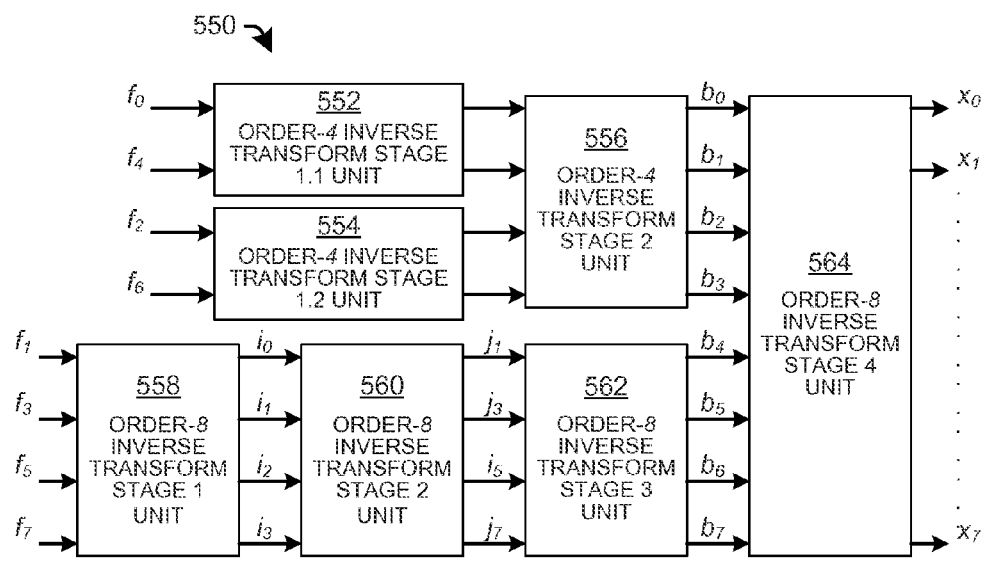
FIG. 5B - FULL FACTORIZATION STRUCTURE FOR AN ORDER-*8* INVERSE TRANSFORM
FIG. 5

VIDEO AND DATA PROCESSING USING EVEN-ODD INTEGER TRANSFORMS

CROSS REFERENCE TO RELATED APPLICATIONS

This application claims the benefit of (i) U.S. Provisional Application Ser. No. 61/556,681 filed Nov. 7, 2011, and (ii) U.S. Provisional Application Ser. No. 61/556,823, filed Nov. 7, 2011; each of which is incorporated by reference herein in its entirety.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular, satellite or other wireless radio telephones, and the like. Many digital video devices implement video compression techniques, such as those described in the standards defined by Moving Picture Experts Group (MPEG), such as MPEG-2, MPEG-4; and International Telecommunications Union (ITU), such as ITU-T H.263 or ITU-T H.264/MPEG-4, Part 10, Advanced Video Coding (AVC), and extensions of such standards, to transmit and receive digital video information more efficiently.

Video compression techniques may perform spatial prediction and/or temporal prediction to reduce or remove redundancy inherent in video sequences. For block-based video coding, a video frame or slice may be partitioned into blocks ("video blocks"). In accordance with various coding techniques, video blocks in an intra-coded (I) frame or slice are encoded using spatial prediction with respect to neighboring blocks. Video blocks in an inter-coded (P or B) frame or slice may use spatial prediction with respect to neighboring video blocks in the same frame or slice or temporal prediction with respect to video blocks in other reference frames.

SUMMARY

Methods, apparatuses and systems for integer transforms, and/or integer transform operations, for transforming data (e.g., residual video data) are disclosed. Included among such methods, apparatuses and systems is an apparatus that may include a processor and memory. The memory may include a set of transform matrices and instructions executable by the processor for transforming data (e.g., residual video data) using any of the set of transform matrices. Each transform matrix of the set of transform matrices is orthogonal and has a different number of elements. Each element of the respective number of elements is an integer. Differences among norms of basis vectors of each transform matrix satisfy a given threshold, and the basis vectors approximate corresponding basis vectors of a discrete cosine transform (DCT) matrix.

As an alternative, each transform matrix of the set of transform matrices may be approximately orthogonal, have a different number of elements and be fully factorizable.

Also included among the methods, apparatuses and systems is a method for processing residual video data using an order-N integer transform. The method may include receiving, at a first preconditioning unit, a vector of (e.g., residual) video data and processing the vector of (e.g., residual) video data at the first preconditioning unit so as to form first and second intermediate output vectors for transform. The method may also include receiving the first intermediate output vector at a first transform unit and transforming the first intermediate output vector at the first transform unit so as to form even-indexed transform coefficients using basis vectors of an order-N/2 integer even part transform matrix and an order-N/2 integer odd part matrix. The method may further include receiving the second intermediate output vector at a second transform unit, and transforming the second intermediate output vector at the second transform unit so as to form odd-indexed transform coefficients by processing the second intermediate output vector through successive order-N/2 integer matrices. The order-N/2 integer matrices may, collectively, factorize the odd part of the order-N transform matrix.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 2 illustrates an example order-32 transform matrix in accordance with an non-limiting embodiment;

FIGS. 5A-5B are a block diagram illustrating an example structure for performing full factorization for an order-8 transform;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples disclosed herein.

Example System Architecture

Figure 1A:
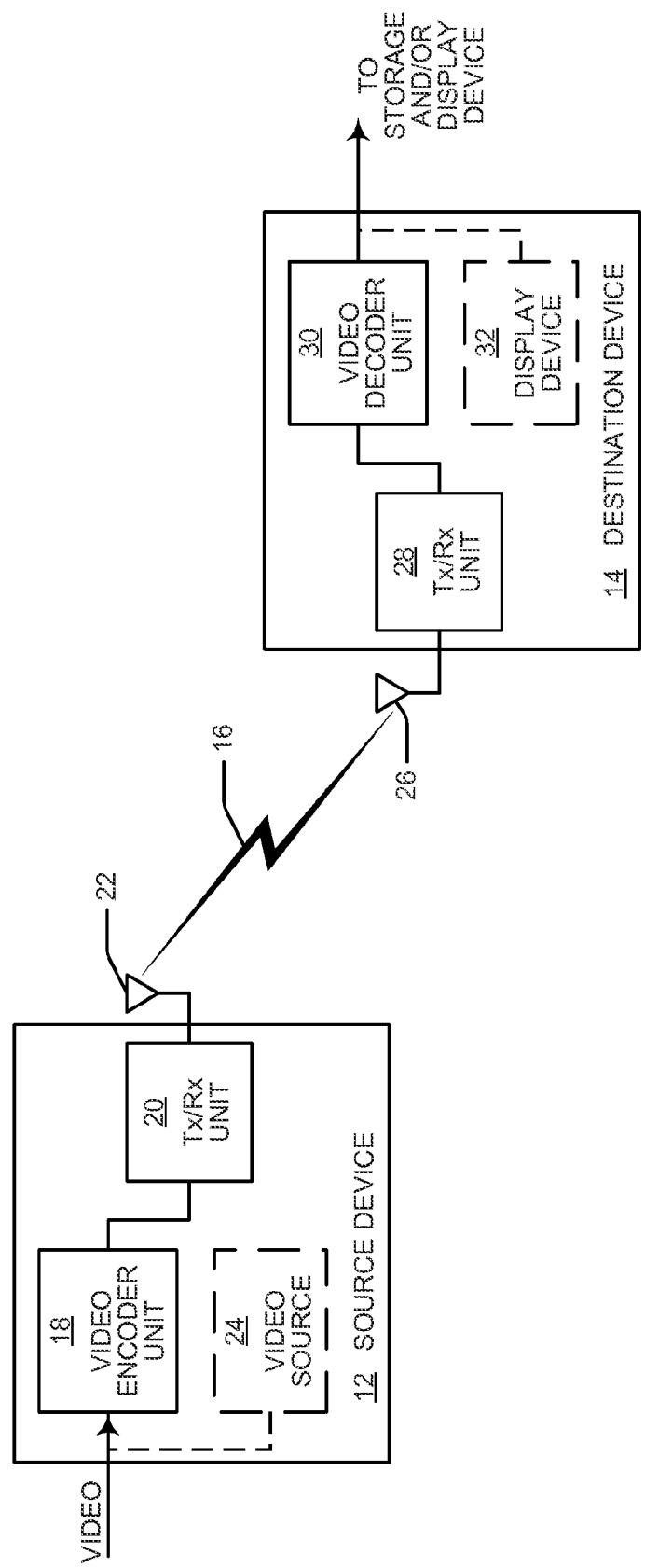
FIG. 1A is a block diagram illustrating an example video encoding and decoding system in which one or more embodiments may be carried out and/or implemented.

FIG. 1A is a block diagram illustrating an example video encoding and decoding system 10 in which one or more embodiments may be carried out and/or implemented. The system 10 may include a source device 12 that transmits encoded video information to a destination device 14 via a communication channel 16.

The source device 12 and destination device 14 may be any of a wide range of devices. In some embodiments, the source device 12 and the destination device 14 may include wireless transmit and/or receive units (WTRUs), such as wireless handsets or any wireless devices that can communicate video information over the communication channel 16, in which case, communication channel 16 includes a wireless link. The methods, apparatuses and systems described, disclosed or otherwise provided explicitly, implicitly and/or inherently (collectively "provided") herein, however, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, the communication channel 16 may include and/or may be any combination of wireless or wired media suitable for transmission of encoded video data.

The source device 12 may include a video encoder unit 18, a transmit and/or receive (Tx/Rx) unit 20 and a Tx/Rx element 22. As shown, the source device 12 may optionally include a video source 24. The destination device 14 may include a Tx/RX element 26, a Tx/Rx unit 28 and a video decoder unit 30. As shown, the destination device 14 may optionally include a display device 32. Each of the Tx/Rx units 20, 28 may be or include a transmitter, a receiver or a combination of a transmitter and a receiver (e.g., a transceiver or transmitter-receiver). Each of the Tx/Rx elements 22, 26 may be, for example, an antenna. In accordance with this disclosure, video encoder unit 18 of source device 12 and/or the video decoder unit 30 of the destination device may be configured and/or adapted (collectively "adapted") to apply the coding techniques provided herein.

The source and destination devices 12, 14 may include other elements/components or arrangements. For example, the source device 12 may be adapted to receive video data from an external video source. And, the destination device 14 may interface with an external display device (not shown), rather than including and/or using the (e.g., integrated) display device 32. In some embodiments, a data stream generated by the video encoder unit 18 may be conveyed to other devices without the need for modulating the data onto a carrier signal, such as by direct digital transfer, wherein the other devices may or may not modulate the data for transmission.

The illustrated system 10 of FIG. 1 is merely one example. The techniques provided herein may be performed by any digital video encoding and/or decoding device. Although generally the techniques provided herein are performed by separate video encoding and/or video decoding devices, the techniques may also be performed by a combined video encoder/decoder, typically referred to as a "CODEC." Moreover, the techniques provided herein may also be performed by a video preprocessor or the like. The source device 12 and the destination device 14 are merely examples of such coding devices in which the source device 12 generates (and/or receives video data and generates) the encoded video information for transmission to the destination device 14. In some embodiments, the devices 12, 14 may operate in a substantially symmetrical manner such that each of the devices 12, 14 include both video encoding and decoding components and/or elements (collectively "elements"). Hence, the system 10 may support any of one-way and two-way video transmission between the devices 12, 14, e.g., for any of video streaming, video playback, video broadcasting, video telephony and video conferencing. In some embodiments, the source device 12 may be, for example, a video streaming server adapted to generate (and/or receive the video data and generate) the encoded video information for one or more destination devices, where the destination devices may be in communication with the source device 12 over wired and/or wireless communication systems.

The external video source and/or the video source 24 may be and/or include a video capture device, such as a video camera, a video archive containing previously captured video, and/or a video feed from a video content provider. Alternatively, the external video source and/or the video source 24 may generate computer graphics-based data as the source video, or a combination of live video, archived video, and computer-generated video. In some embodiments, if the video source 24 is a video camera, the source device 12 and destination device 14 may be or embody camera phones or video phones. As mentioned above, however, the techniques provided herein may be applicable to video coding in general, and may be applied to wireless and/or wired applications. In any case, the captured, pre-captured, computer-generated video, video feed, or other type of the video data (collectively "un-encoded video") may be encoded by the video encoder unit 18 so as to form the encoded video information.

The Tx/Rx unit 20 may modulate the encoded video information, e.g., according to a communication standard, so as to form one or more modulated signals carrying the encoded video information. The Tx/Rx unit 20 may also pass the modulated signals to its transmitter for transmission. The transmitter may transmit the modulated signals via the Tx/Rx element 22 to the destination device 14.

At the destination device 14, the Tx/Rx unit 28 may receive the modulated signals from over channel 16 via the Tx/Rx element 26. The Tx/Rx unit 28 may demodulate the modulated signals to obtain the encoded video information. The Tx/RX unit 28 may pass the encoded video information to the video decoder unit 30.

The video decoder unit 30 may decode the encoded video information to obtain decoded video data. The encoded video information may include syntax information defined by the video encoder unit 18. This syntax information may include one or more elements ("syntax elements"); some or all of which may be useful for decoding the encoded video information. The syntax elements may include, for example, characteristics of the encoded video information. The syntax elements may also include characteristics, and/or describe the processing, of the un-encoded video used to form the encoded video information.

The video decoder unit 30 may output the decoded video data for later storage and/or display on the external display (not shown). Alternatively, the video decoder unit 30 may output the decoded video data to the display device 32. The display device 32 may be and/or include any individual, multiple, combination, combination of multiples of a variety of display devices adapted to display the decoded video data to a user. Examples of such display devices include a liquid crystal display (LCD), a plasma display, an organic light emitting diode (OLED) display, a cathode ray tube (CRT), etc.

The communication channel 16 may be any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network, such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14. Details of an example communications system, which may facilitate such communication between the devices 12, 14, are provided below with reference to FIGS. 8, 9A-9E. Details of devices that may be representative of the devices 12, 14 are provided below, as well.

The video encoder unit 18 and the video decoder unit 30 may operate according to one or more standards and/or specifications, such as, for example, MPEG-2, H.261, H.263, H.264, H.264/AVC, H.264 as extended according to SVC extensions ("H.264/SVC"), etc. It is understood, however, the methods, apparatuses and systems provided herein are applicable to other video encoders, decoders and/or CODECs implemented according to (and/or compliant with) different standards, or to proprietary video encoders, decoders and/or CODECs, including future video encoders, decoders and/or CODECs yet to be developed. Further, the techniques provided herein, however, are not limited to any particular coding standard.

Relevant portions of H.264/AVC noted above are available from the International Telecommunications Union as ITU-T Recommendation H.264, or more specifically, "ITU-T Rec. H.264 and ISO/IEC 14496-10 (MPEG4-AVC), 'Advanced Video Coding for Generic Audiovisual Services,' v5, March, 2010;" which is incorporated herein by reference, and which may be referred to herein as the H.264 standard or H.264 specification, or the H.264/AVC standard or specification. The H.264/AVC standard was formulated by the ITU-T Video Coding Experts Group (VCEG) together with the ISO/IEC MPEG as a product of a collective partnership, known as the Joint Video Team (JVT). In some aspects, the techniques provided herein may be applied to devices that generally conform to the H.264 standard. The JVT continues to work on extensions to H.264/AVC standard.

Work to advance the H.264/AVC standard has been undertaken in various forums of the ITU-T, such as, the Key Technologies Area (KTA) forum. At least some of the forums seek, in part, advancement of coding technologies that exhibit higher coding efficiencies than that exhibited by the H.264/AVC standard. For example, the ISO/IEC MPEG and ITU-T VCEG have established a Joint Collaborative Team on Video Coding (JCT-VC), which has begun to develop a next generation video coding and/or compression standard, namely, the High Efficiency Video Coding (HEVC) standard. In some aspects, the techniques provided herein may provide for coding improvements relative to and/or in accordance with the H.264/AVC and/or HEVC (currently draft) standards.

Although not shown in FIGS. 1A-1D, in some aspects, each of the video encoder and video decoder units 18, 30 may include and/or be integrated with an audio encoder and/or decoder (as appropriate). The video encoder and video decoder units 18, 30 may include appropriate MUX-DEMUX units, or other hardware and/or software, to handle encoding of both audio and video in a common data stream or, alternatively, separate data streams. If applicable, the MUX-DEMUX units may conform, for example, to the ITU-T Recommendation H.223 multiplexer protocol, or other protocols such as the user datagram protocol (UDP).

Each or multiples of the video encoder and video decoder units 18, 30 may be included in one or more encoders or decoders; any of which may be integrated as part of a CODEC, and may be integrated or otherwise combined with a respective camera, computer, mobile device, subscriber device, broadcast device, set-top box, server, and the like. Further, the video encoder unit 18 and the video decoder unit 30 may be implemented as any of a variety of suitable encoder and decoder circuitries, respectively, such as one or more microprocessors, digital signal processors (DSPs), application specific integrated circuits (ASICs), field programmable gate arrays (FPGAs), discrete logic, software, hardware, firmware or any combinations thereof. Alternatively, either or both of the video encoder and video decoder units 18, 30 may be implemented substantially in software, and accordingly, operations of the elements of the video encoder unit 18 and/or the video decoder unit 30 may be performed by appropriate software instructions executed by one or more processors (not shown). Again, such an embodiment, in addition to the processor, may also contain off-chip components, such as external storage (for example, in the form of non-volatile memory), input/output interfaces, etc.

In other embodiments, some of the elements of each of the video encoder unit 18 and the video decoder unit 30 may be implemented as hardware, while others may be implemented using appropriate software instructions executed by one or more processors (not shown). In any embodiment in which operations of elements of the of the video encoder and/or video decoder units 18, 30 may be performed by software instructions executed by one or more processors, such software instructions may be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Figure 1B:
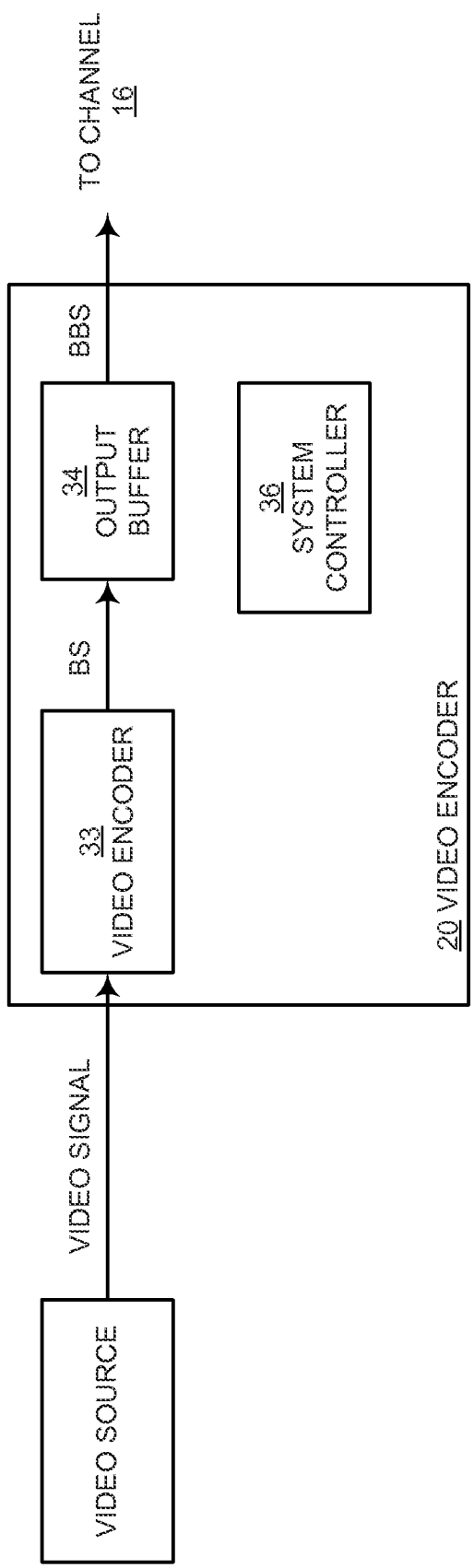
FIG. 1B is a block diagram illustrating an example video encoder unit for use with a video encoding and/or decoding system, such as the system of FIG. 1A.

FIG. 1B is a block diagram illustrating an example video encoder unit 18 for use with a video encoding and/or decoding system, such as the system 10 of FIG. 1A. The video encoder unit 18 may include a video encoder 33, an output buffer 34 and a system controller 36. Like the video encoder unit 18, as a whole, the video encoder 33 (or one or more elements thereof) may be implemented according to one or more standards and/or specifications, such as, for example, H.261, H.263, H.264, H.264/AVC, H.264/SVC, HEVC, etc. It is understood, however, the methods, apparatuses and systems provided herein are applicable to other video encoders implemented according to different standards or to proprietary CODECs, including future CODECs yet to be developed.

The video encoder 33 may receive a video signal provided from a video source, such as, the video source 24 and/or the external video source. This video signal may include the un-encoded video. The video encoder 33 may encode the un-encoded video, and provide an encoded (i.e., compressed) video bit stream (BS) at its output.

The encoded video bit stream BS may be provided to the output buffer 34. The output buffer 34 may buffer the encoded video bit stream BS, and provide such encoded video bit stream BS as a buffered bit stream (BBS) for transmission via the communication channel 16.

The buffered bit stream BBS output from the output buffer 34 may be provided to a storage device (not shown) for later viewing or transmission. Alternatively, the video encoder unit 18 may be configured for visual communication in which the buffered bit stream BBS may be transmitted via the communication channel 16 at a specified constant and/or variable bit rate (e.g., with very low or minimal delay).

The encoded video bit stream BS, and in turn, the buffered bit stream BBS may carry bits of the encoded video information. The bits of the buffered bit stream BBS may be arranged as a stream of encoded video frames. The encoded video frames may be intra-coded frames (e.g., I-frames), inter-coded frames (e.g., B-frames or P-frames), etc., as understood by those skilled in the art. The stream of encoded video frames may be arranged, for example, as a series of GOPs, with the encoded video frames of each GOP arranged in a specified order. Generally, each GOP starts with an intra-coded frame (e.g., an I-frame) followed by one or more inter-coded frames (e.g., P-frames and/or B-frames). Each GOP typically includes only a single intra-coded frame; although any of the GOPs may include multiple. It is noted that traditional B-frames might not be used for real-time, low delay applications (because, for example, bi-directional prediction typically causes extra coding delay as compared to uni-directional prediction (P-frames), for instance). Additional and/or other frame types are supported and the particular ordering of the encoded video frames may be modified as understood by those skilled in the art.

Each GOP may include syntax data ("GOP syntax data"). The GOP syntax data may be disposed in a header of the GOP, in a header of one or more frames of the GOP, or elsewhere. The GOP syntax data may indicate ordering, quantity and/or type of, and/or otherwise describe, the encoded video frames of the respective GOP. Each encoded video frame may include syntax data ("encoded-frame syntax data"). The encoded-frame syntax data may indicate or otherwise describe an encoding mode for the respective encoded video frame.

The system controller 36 may monitor various parameters and/or constraints associated with the channel 16, computational capabilities of the video encoder unit 18, demands by the users, etc., and may establish target parameters to provide an attendant quality of experience (QoE) suitable for the specified constraints and/or conditions of the channel 16. One or more of the target parameters may be adjusted from time to time depending upon the specified constraints and/or channel conditions. As an example, the QoE may be assessed quantitatively using one or more metrics for assessing video quality, including, for example, a metric commonly referred to as relative perceptive quality of encoded video sequences. The relative perceptive quality of encoded video sequences, measured, for example, using a peak-signal-to-noise ratio ("PSNR") metric, is controlled by a bit rate (BR) of the encoded bit stream BS. One or more of the target parameters (including, for example, a quantization parameter (QP)) may be adjusted to maximize the relative perceptive quality of video within the constraints associated with the bit rate BR of the encoded bit stream BS.

Figure 1C:
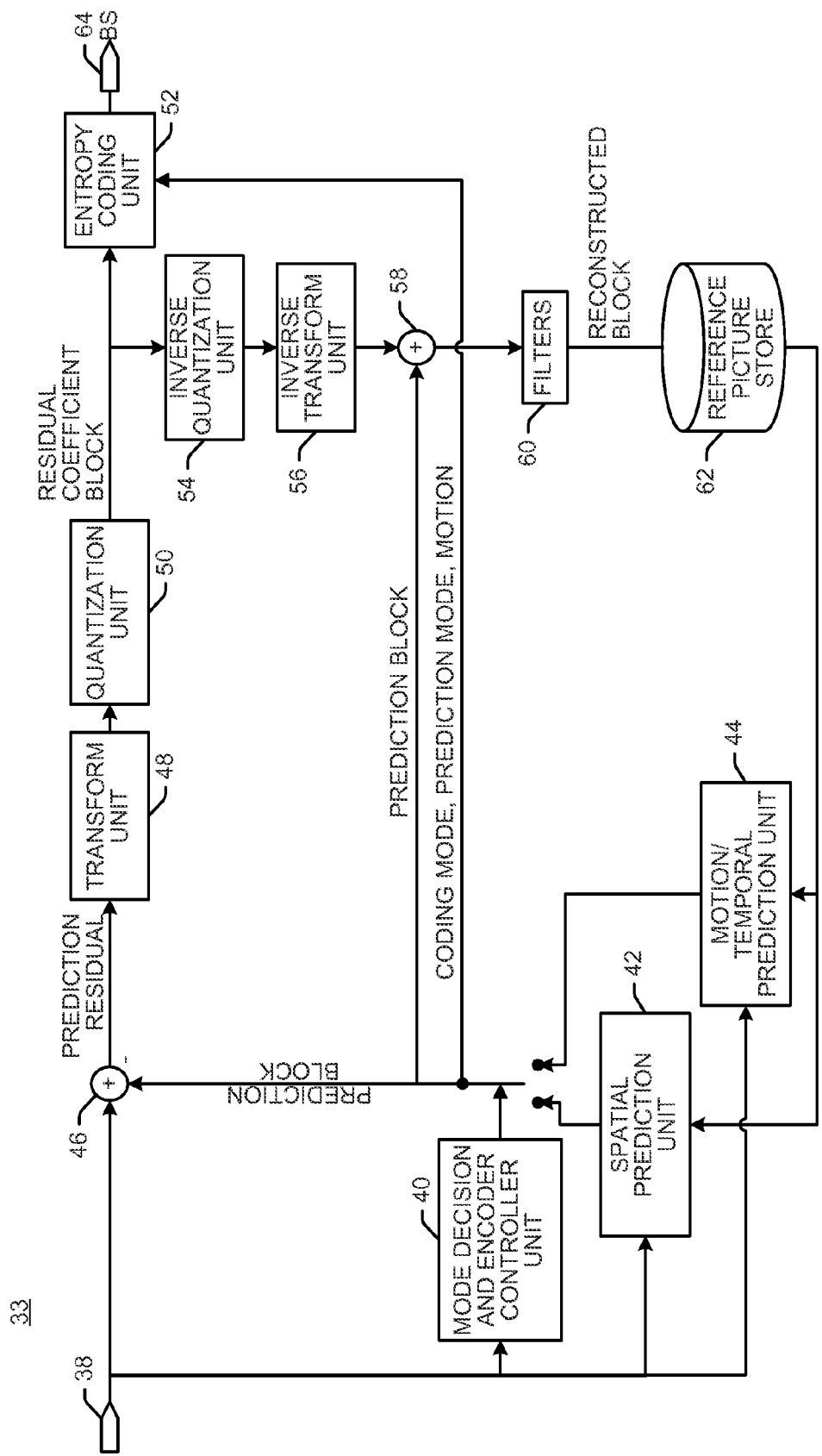
FIG. 1C is a block diagram illustrating an example of a video encoder for use with a video encoder unit, such as the video encoder unit of FIGS. 1A-1B.

FIG. 1C is a block diagram illustrating an example of the video encoder 33 for use with a video encoder unit, such as the video encoder unit 18 of FIGS. 1A-1B. The video encoder 33 may include an input 38, a mode decision and encoder controller unit 40, a spatial prediction unit 42, a motion/temporal prediction unit 44, a first summer 46, a transform unit 48, a quantization unit 50, an entropy coding unit 52, an inverse quantization unit 54, an inverse transform unit 56, a second summer 58, filters 60, a reference picture store 62 and an output 64. The video encoder 33 may include additional and/or different elements. Such elements are not illustrated for the sake of brevity and clarity.

Further, details of video encoder 33 shown in FIG. 1C and provided herein are meant merely to be illustrative, and real world implementations may differ. A real world implementation, for example, may include more, fewer and/or different elements, and/or be arranged differently from the arrangement shown in FIG. 1C. For example, although shown separately, some or all functionality of both of the transform unit 48 and quantization unit 50 may be highly integrated in some of the real-world implementations, such as, for example, implementations that use the core transform of the H.264 standard. Similarly, the inverse quantization unit 54 and inverse transform unit 56 may be highly integrated in some of the real-world implementations (e.g., H.264-standard-compliant implementations), but are likewise illustrated separately for conceptual purposes.

As noted above, the video encoder 33 may receive the video signal at its input 38. The video encoder 33 may generate the encoded video information from the received un-encoded video, and output the encoded video information (e.g., any of intra-frames or inter-frames) from its output 64 in the form of the encoded video bit stream BS. The video encoder 33 may operate, for example, as a hybrid video encoder, and employ a block-based coding process for encoding the un-encoded video. When performing such encoding process, the video encoder 33 typically operates on individual frames, pictures or images (collectively "un-encoded pictures") of the un-encoded video.

To facilitate the block-based encoding process, the video encoder 33 may slice, partition, divide or otherwise segment (collectively "segment") each un-encoded picture received at its input 38 into multiple un-encoded video blocks. In some instances, the video encoder 33 may first segment the un-encoded picture into multiple un-encoded video segments (e.g., slices), and then segment each of the un-encoded video segments into the un-encoded video blocks. The video encoder 33 may pass, supply, send or otherwise provide the un-encoded video blocks to the spatial prediction unit 42, the motion/temporal prediction unit 44 and/or the first summer 46. As described in more detail below, the un-encoded video blocks may be provided on a block-by-block basis.

The spatial prediction unit 42 may receive the un-encoded video blocks, and encode such video blocks in intra-mode. Intra-mode refers to any of several modes of spatial-based compression, and encoding in intra-mode endeavors to provide spatial-based compression of the un-encoded picture. The spatial-based compression, if any, may result from reducing or removing spatial redundancy of video information within the un-encoded picture. In forming the prediction blocks, the spatial prediction unit 42 may perform spatial prediction (or "intra-prediction") of each un-encoded video block relative to one or more video blocks of the un-encoded picture that have been already encoded ("encoded video blocks") and/or reconstructed ("reconstructed video blocks"). The encoded and/or reconstructed video blocks may be neighbors of, adjacent to, or in close proximity to, the un-encoded video block.

The motion/temporal prediction unit 44 may receive the un-encoded video blocks from the input 38, and encode them in inter-mode. Inter-mode refers to any of several modes of temporal-based compression, including, for example, P-mode (uni-directional prediction) or B-mode (bi-directional prediction). Encoding in inter-mode endeavors to provide temporal-based compression of the un-encoded picture. The temporal-based compression, if any, may result from reducing or removing temporal redundancy of video information among the un-encoded picture and one or more reference (e.g., adjacent) pictures. The motion/temporal prediction unit 44 may perform temporal prediction (or "inter-prediction") of each un-encoded video block relative to one or more video blocks of the reference pictures ("reference video blocks"). The temporal prediction carried out may be uni-directional prediction (e.g., for P-mode) or, alternatively, bi-directional prediction (e.g., for B-mode).

Under uni-directional prediction, the reference video blocks may be from previously encoded and/or reconstructed pictures, and in some instances, from only one previously encoded and/or reconstructed picture. The encoded and/or reconstructed pictures may be neighbors of, adjacent to, or in close proximity to, the un-encoded picture.

Under bi-directional prediction, the reference video blocks may be from one or more previously encoded and/or reconstructed pictures and one or more other un-encoded pictures of the video stream. The encoded and/or reconstructed pictures and the other un-encoded pictures may be neighbors of, adjacent to, or in close proximity to, the un-encoded picture.

If multiple reference pictures are supported (as is the case for the recent video coding standards such as H.264/AVC or HEVC), then for each video block, its reference picture index may be sent to the entropy coding unit 52 for subsequent output and/or transmission. The reference index may be used to identify from which reference picture(s) in the reference picture store 62 the temporal prediction comes.

Although typically highly-integrated, functions of the motion/temporal prediction unit 44 for the motion estimation and motion compensation may be carried out by separate entities or units (not shown). Motion estimation may be carried out to estimate motion for each un-encoded video block relative to the reference-picture video blocks, and may involve generating a motion vector for the un-encoded video block. The motion vector may indicate a displacement of a prediction block relative to the un-encoded video block being coded. This prediction block is the reference-picture video block that is found to closely match, in terms of pixel difference, the un-encoded video block being coded. The matching may be determined by sum of absolute difference (SAD), sum of square difference (SSD), or other difference metrics. Motion compensation may involve fetching or generating the prediction block based on the motion vector determined by motion estimation.

The motion/temporal prediction unit 44 may calculate the motion vector for the un-encoded video block by comparing the un-encoded video block to the reference video blocks from reference pictures stored in the reference picture store 64. The motion/temporal prediction unit 44 may calculate values for fractional pixel positions of a reference picture included in reference picture store 62. In some instances, the summer 58 or another unit of video encoder 33 may calculate the fractional pixel position values for reconstructed video blocks, and then store the reconstructed video blocks, with the calculated values for the fractional pixel positions, in reference picture store 62. The motion/temporal prediction unit 44 may also interpolate sub-integer pixels of the reference picture (e.g., of an I-frame or a P-frame).

The motion/temporal prediction unit 44 may be configured to encode the motion vector relative to a selected motion predictor. The motion predictor selected by the motion/temporal prediction unit 44 may be, for example, a vector equivalent to a mean of motion vectors of neighboring blocks that have already been encoded. To encode the motion vector for the un-encoded video block, the motion/temporal prediction unit 44 may calculate the difference between the motion vector and the motion predictor to form a motion vector difference value.

H.264 refers to a set of potential reference frames as a "list." A set of reference pictures stored in reference picture store 62 may correspond to such list of reference frames. The motion/temporal prediction unit 44 may compare the reference video blocks of the reference pictures from reference picture store 62 to the un-encoded video block (e.g., of a P-frame or a B-frame). When the reference pictures in reference picture store 62 include values for sub-integer pixels, the motion vector calculated by motion/temporal prediction unit 44 may refer to a sub-integer pixel location of the reference picture. The motion/temporal prediction unit 44 may send the calculated motion vector to the entropy coding unit 52 and to the motion compensation functions of the motion/temporal prediction unit 44. The motion/temporal prediction unit 44 (or the motion compensation functions thereof) may calculate error values for the prediction block relative to the un-encoded video block being coded. The motion/temporal prediction unit 44 may calculate prediction data based on the prediction block.

The mode decision and encoder controller unit 40 may select one of the coding modes, intra-mode or inter-mode. The mode decision and encoder controller unit 40 may do so based on a rate-distortion optimization method and/or on error results produced in each mode, for example.

The video encoder 33 may form a block of residuals ("residual video block") by subtracting the prediction data provided from motion/temporal prediction unit 42 from the un-encoded video block being coded. The summer 46 represents an element or multiple elements that perform this subtraction operation.

The transform unit 48 may apply a transform to the residual video block to convert such residual video block from a pixel value domain to a transform domain, such as a frequency domain. The transform may be, for example, any of the transforms provided herein, a discrete cosine transform (DCT), or a conceptually similar transform. Other examples of the transform include those defined in H.264, wavelet transforms, integer transforms, sub-band transforms, etc. In any case, application of the transform to the residual video block by the transform unit 48 produces a corresponding block of transform coefficients of the residual video block ("residual-transform coefficients"). These residual-transform coefficients may represent magnitudes of frequency components of the residual video block. The transform unit 48 may forward the residual-transform coefficients and motion vectors to the quantization unit 50.

The quantization unit 50 may quantize the residual-transform coefficients to further reduce the encoded bit rate. The quantization process may, for example, reduce the bit depth associated with some or all of the residual-transform coefficients. In some instances, the quantization unit 50 may divide the values of residual-transform coefficients by a quantization level corresponding to the QP so as to form a block of quantized transform coefficients. The degree of quantization may be modified by adjusting the QP value. In general, the quantization unit 50 applies the quantization so as to represent the residual-transform coefficients using a desired number of quantization steps; the number of steps used (or correspondingly the value of the quantization level) may determine the number of encoded video bits used to represent the residual video block. The quantization unit 50 may obtain the QP value from a rate controller (not shown). Following quantization, the quantization unit 50 may provide the quantized transform coefficients and the motion vectors to the entropy coding unit 52 and to the inverse quantization unit 54.

The entropy coding unit 52 may apply entropy coding to the quantized transform coefficients so as to form entropy-coded coefficients (i.e., a bit stream). The entropy coding unit 52 may use adaptive variable length coding (CAVLC), context adaptive binary arithmetic coding (CABAC) or another entropy coding technique to form the entropy-coded coefficients. CABAC, as understood by those skilled in the art, requires input of contextual information ("context"). This context may be based on neighboring video blocks, for instance.

The entropy coding unit 52 may provide the entropy-coded coefficients along with the motion vectors in the form of a raw encoded video bit stream to an internal bit-stream formatter (not shown). This bit-stream formatter may form the encoded video bit stream BS provided to the output buffer 34 (FIG. 1B) by appending to the raw encoded video bit stream additional information, including headers and/or other information to enable the video decoder unit 30 to decode the encoded video block from the raw encoded video bit stream. Following the entropy coding, the encoded video bit stream BS provided from the entropy coding unit 52 to the output buffer 34 may be transmitted to the destination device 14 via the channel 16 or archived for later transmission or retrieval.

In some embodiments, the entropy coding unit 52 or another unit of video encoder 33 may be configured to perform other coding functions, in addition to entropy coding. For example, the entropy coding unit 52 may be configured to determine the CBP values for the video blocks. Also, in some embodiments, the entropy coding unit 52 may perform run length coding of the quantized transform coefficients in a video block. As an example, the entropy coding unit 52 may apply a zigzag scan or other scan pattern to arrange the quantized transform coefficients in a video block and encode runs of zeros for further compression. The entropy coding unit 52 also may construct the header information with appropriate syntax elements for transmission in the encoded video bit stream BS.

The inverse quantization unit 54 and inverse transform unit 56 may apply inverse quantization and inverse transformation, respectively, to reconstruct a residual video block in the pixel domain, e.g., for later use as one of the reference video blocks (e.g., within one of the reference pictures in the reference picture list).

The mode decision and encoder controller unit 40 may calculate the reference video block by adding the reconstructed residual video block to the prediction block of one of the reference pictures stored in the reference picture store 62. The mode decision and encoder controller unit 40 may also apply one or more interpolation filters to the reconstructed residual video block to calculate sub-integer pixel values (e.g., for half-pixel positions) for use in motion estimation.

The summer 58 may add the reconstructed residual video block to the motion compensated prediction video block to produce a reconstructed video block for storage in the reference picture store 62. The reconstructed (pixel value domain) video block may be used by the motion/temporal prediction unit 44 (or motion estimation functions thereof and/or the motion compensation functions thereof) as one of the reference blocks for inter-coding an un-encoded video block in subsequent un-encoded video.

The filters 60 may include a deblocking filter. The deblocking filter may operate to remove visual artifacts that may be present in reconstructed macro-blocks. These artifacts may be introduced in the encoding process due to, for example, the use of different modes of encoding such as I-type, P-type or B-type. Artifacts may be present, for example, at boundaries and/or edges of the received video blocks, and the de-blocking filter may operate to smoothen the boundaries and/or edges of the video blocks to improve visual quality. If desired, the deblocking filter would typically filter the output of the summer 58.

Figure 1D:
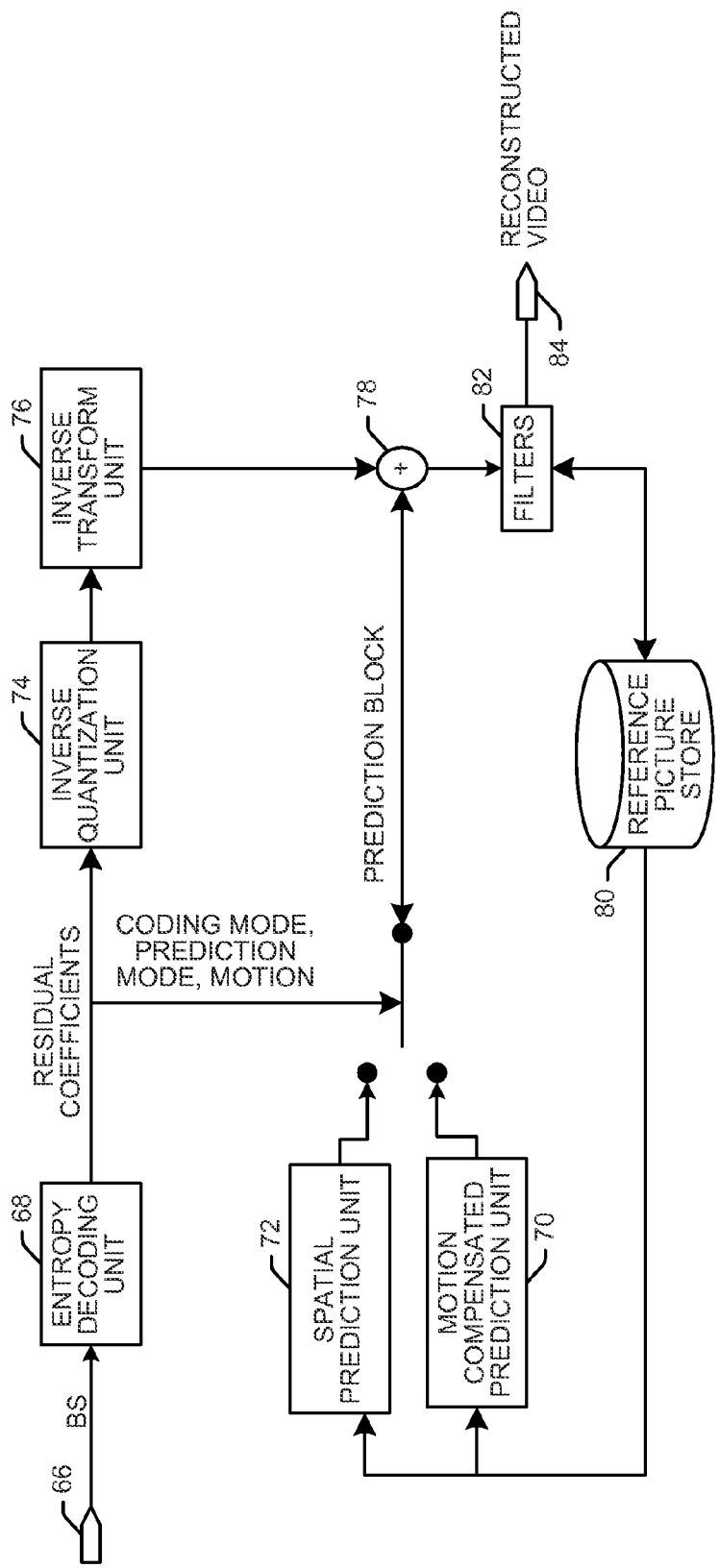
FIG. 1D is a block diagram illustrating an example of a video decoder for use with a video decoder unit, such as the video decoder unit of FIGS. 1A-1B.

FIG. 1D is a block diagram illustrating an example of a video decoder 35 for use with a video decoder unit, such as the video decoder unit 30 of FIGS. 1A-1B. The video decoder 35 may include an input 66, entropy decoding unit 68, a motion compensated prediction unit 70, a spatial prediction unit 72, an inverse quantization unit 74, an inverse transformation unit 76, a reference picture store 80, filters 82, a summer 78 and an output 84. The video decoder 35 may perform a decoding process that is, generally, reciprocal to the encoding process provided with respect to video encoder 33 (FIG. 1C). This decoding process may be carried out as follows.

The motion compensated prediction unit 70 may generate prediction data based on motion vectors received from the entropy decoding unit 68. The motion vectors may be encoded relative to a motion predictor for a video block corresponding to the encoded motion vector. The motion compensated prediction unit 70 may determine the motion predictor, for example, as the median of motion vectors of blocks neighboring the video block to be decoded. After determining the motion predictor, the motion compensated prediction unit 70 may decode the encoded motion vector by extracting a motion vector difference value from the encoded video bit stream BS and adding the motion vector difference value to the motion predictor. The motion compensated prediction unit 70 may quantize the motion predictor to the same resolution as the encoded motion vector. Alternatively, the motion compensated prediction unit 70 may use the same precision for all encoded motion predictors. As another alternative, motion compensated prediction unit 70 may be configured to use either of the above methods, and to determine which method to use by analyzing data included in a sequence parameter set, slice parameter set, or picture parameter set obtained from the encoded video bit stream BS.

After decoding the motion vector, the motion compensated prediction unit 70 may extract a prediction video block identified by the motion vector from a reference picture of reference picture store 80. If the motion vector points to a fractional pixel position, such as a half-pixel, the motion compensated prediction unit 70 may interpolate values for the fractional pixel positions. The motion compensated prediction unit 70 may use adaptive interpolation filters or fixed interpolation filters to interpolate these values. Furthermore, the motion compensated prediction unit 70 may obtain indicia of which of the filters 82 to use, and in some embodiments, coefficients for the filters 82, from the received encoded video bit stream BS.

The spatial prediction unit 72 may use intra prediction modes received in the encoded video bit stream BS to form a prediction video block from spatially adjacent blocks. Inverse quantization unit 74 may inverse quantize, i.e., de-quantize, quantized block coefficients provided in the encoded video bit stream BS and decoded by the entropy decoding unit 68. The inverse quantization process may include a conventional process, e.g., as defined by H.264. The inverse quantization process may also include use of a quantization parameter QP calculated by the video encoder 33 for each video block to determine a degree of quantization and, likewise, a degree of inverse quantization that should be applied.

The inverse transform unit 76 may apply an inverse transform, e.g., an inverse of any of the transforms provided herein, inverse DCT, an inverse integer transform, or a conceptually similar inverse transform process, to the transform coefficients to produce residual video blocks in the pixel domain. The motion compensated prediction unit 70 may produce motion compensated blocks, possibly performing interpolation based on interpolation filters. Identifiers for interpolation filters to be used for motion estimation with sub-pixel precision may be included in syntax elements of the video block. The motion compensated prediction unit 70 may use the interpolation filters as used by video encoder 33 during encoding of the video block to calculate interpolated values for sub-integer pixels of a reference block. The motion compensated prediction unit 70 may determine the interpolation filters used by the video encoder 33 according to received syntax information and use the interpolation filters to produce prediction blocks.

The motion compensated prediction unit 70 may use some of the syntax information to determine sizes of the video blocks used to encode picture(s) of the encoded video sequence, partition information that describes how each video block of a frame of the encoded video sequence is partitioned, modes indicating how each partition is encoded, one or more reference pictures for each inter-encoded video block, and other information to decode the encoded video sequence.

The summer 78 may sum the residual blocks with the corresponding prediction blocks generated by the motion compensated prediction unit 70 or the spatial prediction unit 72 to form decoded video blocks. If desired, a deblocking filter (e.g., filters 82) may also be applied to filter the decoded video blocks in order to remove blockiness artifacts. The decoded video blocks are then stored in reference picture store 80, which provides the reference video blocks for subsequent motion compensation and also produces decoded video for presentation on a display device (such as display device 34 of FIG. 1).

As each video block undergoes the encoding and/or decoding process, the video information of such video block may be represented differently. For example, the video block may include (i) pixel data in the pixel domain; (ii) residual data ("residuals") representing pixel differences between an un-encoded video blocks and a prediction block; (iii) transform coefficients in the transform domain (e.g., following application of a transform); and (iv) quantized transform coefficients in the quantized transform domain.

Each video block may have given dimensions or, collectively "size". The video block size may depend on the coding standard. As an example, the H.264 standard supports intra prediction in various video block sizes, such as 16×16, 8×8, or 4×4 for luma components, and 8×8 for chroma components, and supports inter prediction in various block sizes, such as 16×16, 16×8, 8×16, 8×8, 8×4, 4×8 and 4×4 for luma components and corresponding scaled sizes for chroma components. In the H.264 standard, a video block whose dimensions are 16 pixels by 16 pixels is generally referred to as a macroblock (MB), and a video block with less than 16 pixels by 16 pixels is generally referred to as a partition of an MB ("MB partition"). In HEVC, a video block called a "coding unit" or "CU" may be used to compress high resolution (e.g., 1080p and beyond) video signals more efficiently. In HEVC, the CU size is set in a parameter sequence set, and may be set as large as 64×64 pixels or as small as 4×4 pixels. The CU can be further partitioned into prediction units (PUs), for which separate prediction methods are applied. Each video block (whether a MB, CU, PU, etc.) may be processed by using the spatial prediction unit 42 and/or motion/temporal prediction unit 44.

As used herein, "N×N" and "N by N" may be used interchangeably to refer to a size of the block in terms of components (e.g., pixels, residuals, transform coefficients, quantized transform coefficients, etc.) in both vertical and horizontal dimensions, e.g., 16×16 elements or 16 by 16 elements. In general, a 16×16 video block will have 16 elements in a vertical direction (y=16) and 16 elements in a horizontal direction (x=16). Likewise, an N×N block generally has N elements in a vertical direction and N elements in a horizontal direction, where N represents a nonnegative integer value. The elements in a video block may be arranged in rows and columns. Moreover, the video blocks may have the same or different number of pixels in the horizontal direction as in the vertical direction. For example, the video blocks may include N×M pixels, where M is not necessarily equal to N.

The H.264/AVC standard specifies order-4 and order-8 integer transforms, namely, $T_4$ and $T_8$, as given below:

$$T_4 = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad (1)$$

$$T_8 = \begin{bmatrix} 8 & 8 & 8 & 8 & 8 & 8 & 8 & 8 \\ 12 & 10 & 6 & 3 & -3 & -6 & -10 & -12 \\ 8 & 4 & -4 & -8 & -8 & -4 & 4 & 8 \\ 10 & -3 & -12 & -6 & 6 & 12 & 3 & -10 \\ 8 & -8 & -8 & 8 & 8 & -8 & -8 & 8 \\ 6 & -12 & 3 & 10 & -10 & -3 & 12 & -6 \\ 4 & -8 & 8 & -4 & -4 & 8 & -8 & 4 \\ 3 & -6 & 10 & -12 & 12 & -10 & 6 & -3 \end{bmatrix} \quad (2)$$

These two integer transforms, $T_4$ and $T_8$, are orthogonal, and have very low complexity. However, the basis vectors of such transforms are substantially different from the DCT, and therefore performance is generally worse than the DCT. Additionally, the norms of the basis vectors are different from each other. For reversibility and energy conservation, a scaling process has to be carried after transform to compensate for this drawback, which increases computational complexity and memory requirement. In addition, such scaling matrices often differ from transform to transform. For example, the order-4 and order-8 transforms, $T_4$ and $T_8$, require the use of different scaling matrices. The use of different scaling matrices further complicates CODEC design and implementation, and makes it more difficult to support additional transforms when needed.

As noted above, in HEVC, the CU size and PU size may be as large as 64×64 elements, and transforms larger than order-4 and order-8 are required. Currently, four transform sizes are used in HEVC: order-4, order-8, order-16, and order-32.

Disclosed herein are apparatuses and tangible computer readable storage mediums having a set of transform matrices. Each transform matrix of the set of transform matrices is orthogonal and has a different number of elements. Each element of the respective number of elements is an integer. Differences among norms of basis vectors of each transform matrix satisfy a given threshold. And the basis vectors approximate corresponding basis vectors of a DCT matrix. The given threshold may be, for example, a threshold which, when satisfied, indicates the differences among the norms of the basis vectors are insignificant (e.g., within a certain degree of precision). Alternatively, the given threshold may be a threshold which, when satisfied, indicates the norms of the basis vectors are approximately equal. In an embodiment, the basis vectors approximate the corresponding DCT basis vectors in accordance with a measure of distortion. In an embodiment, the basis vectors approximate the corresponding DCT basis vectors in accordance with a measure of distortion that satisfies a pre-defined threshold.

Also disclosed herein are methods, apparatuses and systems for generating and/or using order-N integer transforms, namely, $T_N$, where N may be 4, 8, 16, 32, etc. In various embodiments disclosed herein, the "order" of the transforms may be expressed using other notations, including, for example, the term "order-K" and the like.

Each of the order-N integer transforms $T_N$ may be orthogonal. Being orthogonal, these order-N integer transforms $T_N$ may cause an average energy of reconstruction error equal to an average energy of quantization error (unlike non-orthogonal transforms), and in turn, have better transform performance than non-orthogonal transforms.

Each of the order-N integer transforms $T_N$ may have basis vectors ("$T_N$ basis vectors") that have almost equal norms ("$T_N$ basis-vector norms"). For example, differences between the $T_N$ basis-vector norms may be less than a given threshold. The $T_N$ basis vectors, for example, may approximate basis vectors of the DCT ("DCT basis vectors"). Differences between the $T_N$ basis vectors and the DCT basis vectors may be measured by DCT distortion. And the $T_N$ basis vectors may approximate the DCT basis vectors when the DCT distortion is smaller than a pre-defined threshold. Calculation of the DCT distortion may include all or a portion of the basis vectors of a transform. In an embodiment, the DCT distortion of $T_N$ may be calculated as follows. First, each of the $T_N$ basis vectors is normalized. The $T_N$ basis vectors may be normalized by dividing each of the $T_N$ basis vectors with its own norm. Thereafter, the DCT distortion may be calculated using equations (3) and (4) below:

$$\text{DistortionMatrix} = ICT_N \times DCT_N^T \quad (3)$$

where $ICT_N$ is the normalized $T_N$, and $DCT_N$ is an N×N DCT matrix, and $$\text{Distortion}_{DCT} = \frac{1}{N} \sum_{s \in S} \sum_{\substack{j=0 \\ j \neq s}}^{N-1} \left| \frac{\text{DistortionMatrix}(s, j)}{\text{DistortionMatrix}(s, s)} \right| \quad (4)$$

where S is a set of basis vectors of a transform. S can include all the basis vectors (e.g. s can be $\{0, 1, 2, \ldots, N-1\}$) or a portion of the basis vectors (e.g., s can be $\{0, 1, 2, 7, 10, \ldots\}$).

In an embodiment, the order-N integer transforms $T_N$ may have respective transform matrices that exhibit special symmetries and structures. These symmetries and structures may facilitate use of a fast algorithm, such as, for example, disclosed herein. In an embodiment, any of forward transform, quantization, dequantization and/or inverse transform of the order-N integer transforms $T_N$ may be implemented using 16-bit arithmetic.

Also disclosed herein are families of order-N transforms, where N is 8, 16 and 32. Each transform $T_N$ of the same family may have the same structure ("transform family structure"). For instance, the transforms $T_8$ of the order-8 transform family may all have the order-8 transform family structure. The transforms $T_{16}$ of the order-16 transform family may all have the order-16 transform family structure, and the transforms $T_{32}$ of the order-32 transform family may all have the order-32 transform family structure. The transform family structures may allow each transform $T_N$ of such corresponding family to be fully factorized and implemented using a fast algorithm. In addition to being implementable using full-factorization, many embodiments within each family of transforms, like the order-N integer transforms, namely, $T_N$, may (i) be orthogonal or approximately orthogonal and (ii) have basis vectors that have almost equal norms. These basis vectors may approximate basis vectors of DCT, as well. Further, any of forward transform, quantization, dequantization and/or inverse transform of such embodiments may be carried out using and/or implemented with structures configured to use 16-bit arithmetic. Alternatively, any of the forward transform, quantization, dequantization and/or inverse transform of the embodiments may be carried out using and/or implemented with structures configured to use other arithmetic formats, as well.

Example Transform Matrices of the Order-N Integer Transforms

In an embodiment, an order-K transform, $T_K$, may be formed using an intermediate matrix, namely, $T'_K$. In accordance with an embodiment, the intermediate matrix $T'_K$ may be expressed in terms of a matrix multiplication of intermediary transform coefficient matrix by an even-odd decomposition matrix. The intermediary transform coefficient matrix may include an even part and an odd part. Application of the even-odd decomposition matrix to the order-K transform $T_K$ may decompose the order-K transform $T_K$ into the even and odd parts. The even part may be, for example, an order-N/2 (i.e., lower-order) transform $T_{k/2}$, and the odd part may be a lower-order transform matrix $P_{k/2}$. In an embodiment, the intermediate matrix $T'_K$ may be expressed as follows:

$$T'_K = \begin{bmatrix} T_{K/2} & 0 \\ 0 & P_{K/2} \end{bmatrix} \begin{bmatrix} I_{K/2} & J_{K/2} \\ I_{K/2} & -J_{K/2} \end{bmatrix} \quad (5)$$

where $K=2^Z$, Z is a positive integer, $$\begin{bmatrix} T_{K/2} & 0 \\ 0 & P_{K/2} \end{bmatrix}$$

may be the intermediary transform coefficient matrix, and $$\begin{bmatrix} I_{K/2} & J_{K/2} \\ I_{K/2} & -J_{K/2} \end{bmatrix}$$

may be the even-odd decomposition matrix. In the even-odd decomposition matrix, the $I_N$ and $J_N$ may be defined as follows:

$$I_N(i, j) = \begin{cases} 1 & \text{if } i = j \\ 0 & \text{otherwise} \end{cases} \quad 0 \le i, j \le N-1 \quad (6)$$

$$J_N(i, j) = \begin{cases} 1 & \text{if}(i + j) = N - 1 \\ 0 & \text{otherwise} \end{cases} \quad 0 \le i, j \le N-1 \quad (7)$$

Conversion from the intermediate matrix $T_N'$ to the order-N transform matrix $T_N$ may be carried out as follows:

$$T_N(i, j) = \begin{cases} T_N'(n, j) & \text{if } i = 2n \\ T_N'\left(n + \dfrac{N}{2}, j\right) & \text{if } i = 2n+1 \end{cases} \quad 0 \le i, j \le K-1 \quad (8)$$

By way of example, and intermediate matrix, namely, $T'_8$, for forming an order-8 transform, $T_8$, in accordance with an embodiment may be expressed in terms of a matrix multiplication of intermediary transform coefficient matrix $$\begin{bmatrix} T_4 & 0 \\ 0 & P_4 \end{bmatrix}$$

by an even-odd decomposition matrix $$\begin{bmatrix} I_4 & J_4 \\ I_4 & -J_4 \end{bmatrix}.$$

For example, the intermediate matrix $T'_8$ may be expressed as follows:

$$T'_8 = \begin{bmatrix} T_4 & 0 \\ 0 & P_4 \end{bmatrix} \begin{bmatrix} I_4 & J_4 \\ I_4 & -J_4 \end{bmatrix} \quad (9)$$

The intermediary transform coefficient matrix $$\begin{bmatrix} T_4 & 0 \\ 0 & P_4 \end{bmatrix}$$

may include the even part and the odd parts. The even part may be a transform matrix of an order-4 transform $T_4$ (i.e., an lower order-N/2 where N=8), and the odd part may be a lower-order matrix $P_4$. The order-4 transform $T_4$ (or, with respect to equation (9), "lower-order even-part matrix") in accordance with an embodiment may be as follows:

$$T_4 = \begin{bmatrix} 128 & 128 & 128 & 128 \\ 167 & 70 & -70 & -167 \\ 128 & -128 & -128 & 128 \\ 70 & -167 & 167 & -70 \end{bmatrix} \quad (10)$$

The transform coefficients of the order-4 transform $T_4$ may be empirically determined based on a number of factors. These factors may include, for example, all of the transform coefficients being integers, the order-4 transform $T_4$ being orthogonal, the $T_4$ basis vectors norms being or almost being equal (e.g., satisfying a threshold) and the $T_4$ basis vectors approximating the DCT basis vectors (e.g., satisfying the condition that the DCT distortion is smaller than the pre-defined threshold).

The lower-order matrix $P_4$ (or, with respect to equation (9), the "lower-order odd-part matrix") in accordance with an embodiment may be as follows:

$$P_4 = \begin{bmatrix} 185 & 144 & 96 & 37 \\ 144 & -37 & -185 & -96 \\ 96 & -185 & 37 & 144 \\ 37 & -96 & 144 & -185 \end{bmatrix} \quad (11)$$

The element of the lower-order matrix $P_4$ may be empirically determined based on a number of factors. These factors may include, for example, all of the elements being integers, the lower-order matrix $P_4$ being orthogonal, the lower-order matrix $P_4$ basis vectors norms being or almost being equal (e.g., satisfy a threshold) and the lower-order matrix $P_4$ basis vectors approximating the DCT basis vectors (e.g., satisfying the condition that the DCT distortion is smaller than a pre-defined threshold).

The $I_4$, and $J_4$ of the even-odd decomposition matrix may be as expressed above equations in (6) and (7), respectively.

From application of the equations (8)-(11), the order-8 integer transform $T_8$ may be as follows:

$$T_8 = \begin{bmatrix} 128 & 128 & 128 & 128 & 128 & 128 & 128 & 128 \\ 185 & 144 & 96 & 37 & -37 & -96 & -144 & -185 \\ 167 & 70 & -70 & -167 & -167 & -70 & 70 & 167 \\ 144 & -37 & -185 & -96 & 96 & 185 & 37 & -144 \\ 128 & -128 & -128 & 128 & 128 & -128 & -128 & 128 \\ 96 & -185 & 37 & 144 & -144 & -37 & 185 & -96 \\ 70 & -167 & 167 & -70 & -70 & 167 & -167 & 70 \\ 37 & -96 & 144 & -185 & 185 & -144 & 96 & -37 \end{bmatrix} \quad (12)$$

In one embodiment, each of the order-N integer transforms $T_N$ may be expressed in terms of a lower order integer transform. For example, intermediate matrix $T'_{16}$ for forming an order-16 transform $T_{16}$ in accordance with an embodiment may be expressed in terms of a matrix multiplication of the intermediary transform coefficient matrix $$\begin{bmatrix} T_8 & 0 \\ 0 & P_8 \end{bmatrix}$$

and an even-odd decomposition matrix $$\begin{bmatrix} I_8 & J_8 \\ I_8 & -J_8 \end{bmatrix}.$$

The intermediary transform coefficient matrix $$\begin{bmatrix} T_8 & 0 \\ 0 & P_8 \end{bmatrix}$$

may include an even part and an odd part. The even part may be the order-8 (i.e., lower-order) transform $T_8$, and the odd part may be a lower-order transform matrix $P_4$. The intermediate matrix $T'_{16}$ may be expressed as follows:

$$T'_{16} = \begin{bmatrix} T_8 & 0 \\ 0 & P_8 \end{bmatrix} \begin{bmatrix} I_8 & J_8 \\ I_8 & -J_8 \end{bmatrix} \quad (13)$$

where $P_8$ may be defined as follows:

$$P_8 = \begin{bmatrix} 180 & 173 & 160 & 140 & 115 & 85 & 53 & 17 \\ 115 & 85 & 53 & 17 & -180 & -173 & -160 & -140 \\ 160 & 140 & -180 & -173 & -53 & -17 & 115 & 85 \\ 17 & 53 & -85 & -115 & 140 & 160 & -173 & -180 \\ 53 & -17 & -115 & 85 & 160 & -140 & -180 & 173 \\ 173 & -180 & -140 & 160 & -85 & 115 & 17 & -53 \\ 140 & -160 & 173 & -180 & -17 & 53 & -85 & 115 \\ 85 & -115 & 17 & -53 & 173 & -180 & 140 & -160 \end{bmatrix} \quad (14)$$

Based on equations (6)-(8) and (13)-(14), the order-16 transform matrix $T_{16}$ may be as follows:

$$T_{16} = \begin{bmatrix} 128 & 128 & 128 & 128 & 128 & 128 & 128 & 128 & 128 & 128 & 128 & 128 & 128 & 128 & 128 & 128 \\ 180 & 173 & 160 & 140 & 115 & 85 & 53 & 17 & -17 & -53 & -85 & -115 & -140 & -160 & -173 & -180 \\ 185 & 144 & 96 & 37 & -37 & -96 & -144 & -185 & -185 & -144 & -96 & -37 & 37 & 96 & 144 & 185 \\ 115 & 85 & 53 & 17 & -180 & -173 & -160 & -140 & 140 & 160 & 173 & 180 & -17 & -53 & -85 & -115 \\ 167 & 70 & -70 & -167 & -167 & -70 & 70 & 167 & 167 & 70 & -70 & -167 & -167 & -70 & 70 & 167 \\ 160 & 140 & -180 & -173 & -53 & -17 & 115 & 85 & -85 & -115 & 17 & 53 & 173 & 180 & -140 & -160 \\ 144 & -37 & -185 & -96 & 96 & 185 & 37 & -144 & -144 & 37 & 185 & 96 & -96 & -185 & -37 & 144 \\ 17 & 53 & -85 & -115 & 140 & 160 & -173 & -180 & 180 & 173 & -160 & -140 & 115 & 85 & -53 & -17 \\ 128 & -128 & -128 & 128 & 128 & -128 & -128 & 128 & 128 & -128 & -128 & 128 & 128 & -128 & -128 & 128 \\ 53 & -17 & -115 & 85 & 160 & -140 & -180 & 173 & -173 & 180 & 140 & -160 & -85 & 115 & 17 & -53 \\ 96 & -185 & 37 & 144 & -144 & -37 & 185 & -96 & -96 & 185 & -37 & -144 & 144 & 37 & -185 & 96 \\ 173 & -180 & -140 & 160 & -85 & 115 & 17 & -53 & 53 & -17 & -115 & 85 & -160 & 140 & 180 & -173 \\ 70 & -167 & 167 & -70 & -70 & 167 & -167 & 70 & 70 & -167 & 167 & -70 & -70 & 167 & -167 & 70 \\ 140 & -160 & 173 & -180 & -17 & 53 & -85 & 115 & -115 & 85 & -53 & 17 & 180 & -173 & 160 & -140 \\ 37 & -96 & 144 & -185 & 185 & -144 & 96 & -37 & -37 & 96 & -144 & 185 & -185 & 144 & -96 & 37 \\ 85 & -115 & 17 & -53 & 173 & -180 & 140 & -160 & 160 & -140 & 180 & -173 & 53 & -17 & 115 & -85 \end{bmatrix} \quad (15)$$

In one embodiment, each of the order-N integer transforms $T_N$ may be expressed in terms of a lower order integer transform. The intermediate matrix $T'_{32}$ for forming an order-32 transform $T_{32}$ in accordance with an embodiment may be expressed in terms of a matrix multiplication of the intermediary transform coefficient matrix $$\begin{bmatrix} T_{16} & 0 \\ 0 & P_{16} \end{bmatrix}$$

and an even-odd decomposition matrix $$\begin{bmatrix} I_{16} & J_{16} \\ I_{16} & -J_{16} \end{bmatrix}.$$

The intermediary transform coefficient matrix $$\begin{bmatrix} T_{16} & 0 \\ 0 & P_{16} \end{bmatrix}$$

may include the even part and odd parts. The even part may be the order-16 (i.e., lower-order) transform $T_{16}$, and the odd part may be a lower-order matrix $P_{16}$. The intermediate matrix $T'_{32}$ may be expressed as follows:

$$T'_{32} = \begin{bmatrix} T_{16} & 0 \\ 0 & P_{16} \end{bmatrix} \begin{bmatrix} I_{16} & J_{16} \\ I_{16} & -J_{16} \end{bmatrix} \quad (16)$$

In one embodiment, the lower-order matrix $P_{16}$ of equation (16) may be defined as follows:

$$P_{16} = \begin{bmatrix} P_8 & 0 \\ 0 & P_8 \end{bmatrix} W \quad (17)$$

where $$\begin{bmatrix} P_8 & 0 \\ 0 & P_8 \end{bmatrix}$$

is a lower-order intermediate matrix for wavelet decomposition, W may be 16×16 wavelet transform, an example of which may be shown as follows:

$$W = \begin{bmatrix} 1 & 1 & 0 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 & 0 \\ 0 & 0 & 0 & 0 & 0 & 0 & 1 & 1 & 0 & 0 & 0 & 0 & 0 & 0 & 0 & 0 \\ 0 & 0 & 0 & 0 & 0 & 0 & 0 & 0 & 1 & 1 & 0 & 0 & 0 & 0 & 0 & 0 \\ 0 & 0 & 0 & 0 & 0 & 0 & 0 & 0 & 0 & 0 & 1 & 1 & 0 & 0 & 0 & 0 \\ 0 & 0 & 0 & 0 & 0 & 0 & 0 & 0 & 0 & 0 & 0 & 0 & 1 & 1 & 0 & 0 \\ 0 & 0 & 0 & 0 & 0 & 0 & 0 & 0 & 0 & 0 & 0 & 0 & 0 & 0 & 1 & 1 \\ 1 & -1 & 0 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 0 & 1 & -1 \end{bmatrix} \quad (18)$$

Figure 2:
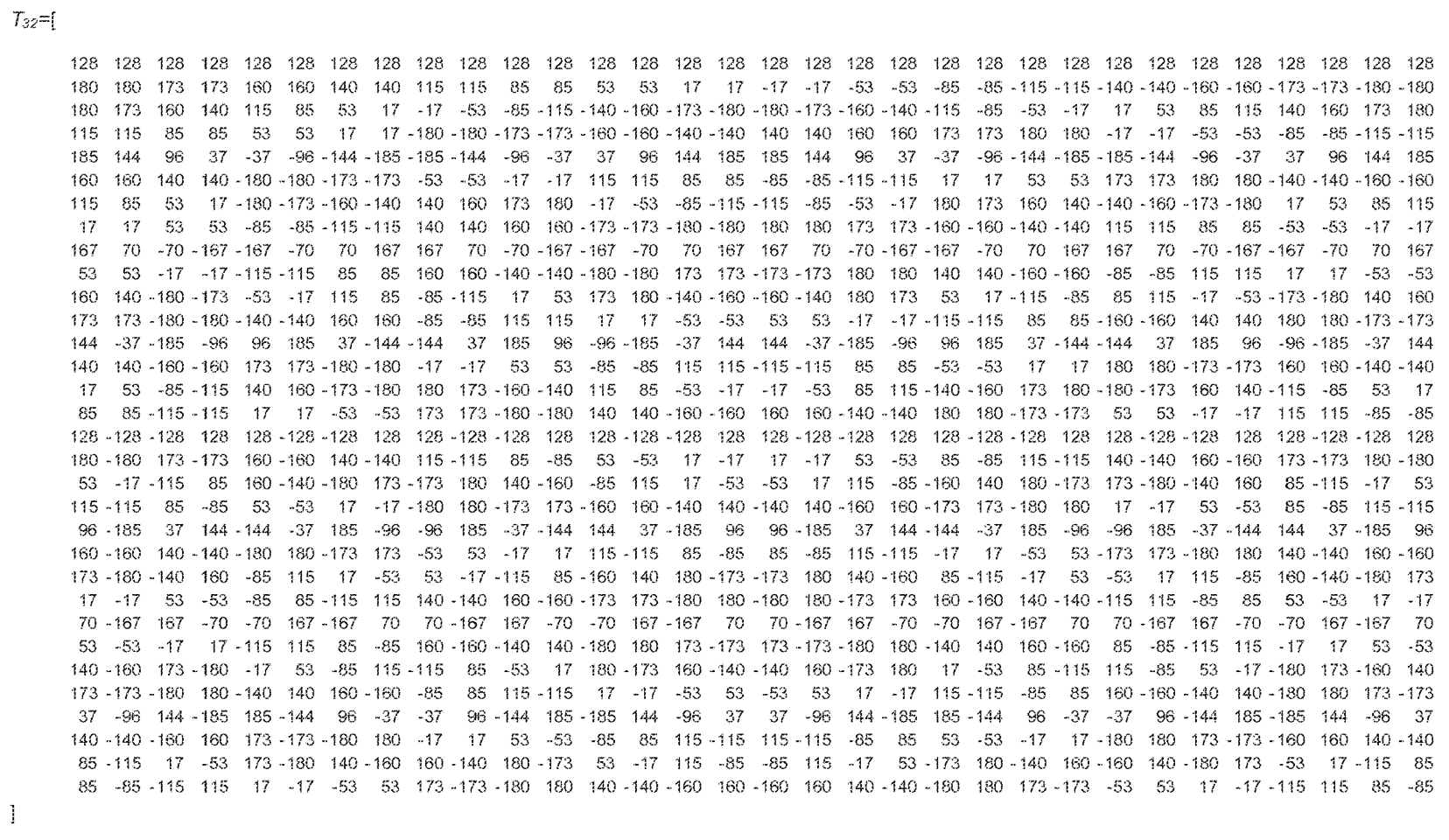

The wavelet transform may be, for example, a Haar transform. The wavelet transform may be other wavelet transforms as well. The $P_8$ in the lower-order intermediate matrix for wavelet decomposition may be the lower order-8 transform $T_8$ (i.e., an order-N/4 transform). Based on equations (6)-(8) and (16)-(18), the order-32 transform matrix $T_{32}$ shown in FIG. 2 may be generated.

Example Operation

With reference to FIGS. 1C-1D, for the video encoder 33 and video decoder 35, a dynamic range of the input to the transform unit 48 of the video encoder 33 and the dynamic range of the output of inverse transform 74 of the video decoder 35 may be the same. For transform operations in the video encoder 33 and/or the video decoder 35, this dynamic range may be first detected, and then represented by bit-depth, ("BD"). As an example, if the dynamic range is [−255, 255], then BD is equal to 8. If the dynamic range is [−1023, 1023], then BD is equal to 10. After determining the dynamic range, a variable ΔBD may be calculated. The variable ΔBD may be calculated as BD−8, for example.

In the video encoder 33, a prediction residual block $X_{M \times N}$, of which the size is M×N (M, N∈{4,8,16,32}), is processed in the transform unit 48, quantization unit 50, inverse quantization unit 54 and inverse transform unit 56, consequently. These four operations of video processing are provided in more detail below. As used herein, the operations carried out in the inverse quantization unit 54 and inverse transform unit 56 may be referred as to dequantization and inverse transform, respectively. In the video decoder 35, the operations carried out in the inverse quantization unit 74 and inverse transform unit 76 are typically the same as those carried out in the inverse quantization unit 54 and the inverse transform unit 56.

Forward Transform

The input to a forward transform may be a prediction residual block, denoted as $X_{M \times N}$. To perform a 2-D forward transform on $X_{M \times N}$, the M rows and N columns in $X_{M \times N}$ are transformed in each dimension sequentially, which are known as the horizontal and vertical forward transforms, respectively. Either the horizontal or vertical forward transform may be formed first.

If the horizontal forward transform is performed first, $X_{M \times N}$ may be right-multiplied by $T_N^T$ first (the superscript T means transposition) and right shifted with a proper number of bits in order to accommodate 16-bit arithmetic. The result may be $U_{M \times N}$, as follows:

$$U_{M \times N} = (X_{M \times N} \times T_N^T + f_{fwd,h}) >> (\log_2(N) + \Delta BD) \quad (19)$$

where $T_N$ (N∈{4,8,16,32}) as above and ">>" means right shifting. The factor $f_{fwd,h}$ is for rounding, and may be in the range [0, $2^{(\log_2(N)+\Delta BD)}$]. For simplicity of exposition herein, $f_{fwd,h}$ may be equal to $2^{(\log_2(N)+\Delta BD-1)}$.

After the horizontal forward transform, a vertical forward transform may be performed on the intermediate block $U_{M \times N}$. The process of vertical forward transform may be as follows:

$$Y_{M \times N} = (T_M \times U_{M \times N} + f_{fwd,v}) >> (\log_2(M) + 7) \quad (20)$$

where the factor $f_{fwd,v}$ may be in the range [0, $2^{(\log_2(M)+7)}$], and, for simplicity of exposition herein, may be equal to $2^{(\log_2(N) \times \Delta BD-1)}$.

If, however, the vertical forward transform may be performed first, $X_{M \times N}$ may be left-multiplied by $T_M$ first and right shifted with a proper number of bits in order to fit 16-bit arithmetic. The result may be $U_{M \times N}$, as follows:

$$U_{M \times N} = (T_M \times X_{M \times N} + f_{fwd,v}) >> (\log_2(M) + \Delta BD) \quad (21)$$

where the factor $f_{fwd,v}$ is for rounding, and may be in the range [0, $2^{(\log_2(M)+\Delta BD)}$]. For simplicity of exposition herein, the $f_{fwd,v}$ may be equal to $2^{(\log_2(M)+\Delta BD-1)}$.

After the vertical forward transform, horizontal forward transform may be performed on the intermediate block $U_{M \times N}$. The process of horizontal forward transform may be as follows:

$$Y_{M \times N} = (U_{M \times N} \times T_N^T + f_{fwd,h}) >> (\log_2(N) + 7) \quad (22)$$

where the factor $f_{fwd,h}$ should be in the range [0, $2^{(\log_2(N)+7)}$], and, for simplicity of exposition herein, may be equal to $2^{(\log_2(N)+6)}$.

Quantization

The input of quantization may be the output of the 2-D forward transform, i.e., $Y_{M \times N}$. The quantization process for all the elements in $Y_{M \times N}$ may be either the same or different. Given an element $Y_{M \times N}(i,j)$ (0≤i≤M−1, 0≤j≤N−1) and the associated quantization stepsize $W_{M \times N}(i,j)$, the quantization process may be as follows:

$$Z_{M \times N}(i,j) = (Y_{M \times N}(i,j) \times S_{M \times N}(i,j) + f_{M \times N,q}(i,j)) \gg \qquad (23)$$
$$\left(Q_{M \times N}(i,j) + 7 - \frac{1}{2}\log_2(M \times N) - \Delta BD\right)$$

where $f_{M \times N,q}(i,j)$ is a factor for rounding, and may be in we range $$\left[0, 2^{(Q_{M \times N}(i,j)+7-\frac{1}{2}\log_2(M \times N)-\Delta BD)}\right].$$

For simplicity of exposition herein, the $f_{M \times N,q}(i,j)$ may be equal to $$2^{(Q_{M \times N}(i,j)+6-\frac{1}{2}\log_2(M \times N)-\Delta BD)}.$$

In (23), $S_{M \times N}(i,j)$ and $Q_{M \times N}(i,j))$ may satisfy a relationship as follows:

$$\frac{S_{M \times N}(i,j)}{2^{Q_{M \times N}(i,j)}} \approx \frac{1}{W_{M \times N}((i,j)} \qquad (24)$$

which ≈ means multiplying $S_{M \times N}(i,j)$ and then right shifting $Q_{M \times N}(i,j)$ bits are used to approximate dividing by the quantization stepsize $W_{M \times N}(i,j)$. More precise approximation may be achieved by increasing the number of right shifting bits $Q_{M \times N}(i,j)$.

Dequantization

Dequantization may be used to reconstruct $Y_{M \times N}$, using the input $Z_{M \times N}$. The reconstructed block is denoted as $Y'_{M \times N}$. Intuitively, $Y'_{M \times N}(i,j)$ may be equal to $Z_{M \times N}(i,j)$ multiplied by the quantization stepsize $W_{M \times N}(i,j)$. However, $W_{M \times N}(i,j)$ might not necessarily be an integer, and therefore, the approximation similar to (24) may also be performed for dequantization, as in (25):

$$\frac{D_{M \times N}(i,j)}{2^{IQ_{M \times N}(i,j)}} \approx W_{M \times N}((i,j) \qquad (25)$$

Similarly, large $IQ_{M \times N}(i,j)$ means high precision. The dequantization process may be as follows:

$$Y'_{M \times N}(i,j) = (Z_{M \times N}(i,j) \times D_{M \times N}(i,j) + f_{M \times N,dq}(i,j)) \gg (IQ_{M \times N}(i,j) + \frac{1}{2}\log_2(M \times N) - 7 + \Delta BD) \qquad (26)$$

$f_{M \times N,dq}(i,j)$ is a factor for rounding, and should be in the range $$\left[0, 2^{(IQ_{M \times N}(i,j)+\frac{1}{2}log2(M \times N)-7+\Delta BD)}\right].$$

For simplicity of exposition herein, the $f_{M \times N,dq}(i,j)$ may be equal to and/or in accordance with $$\left[2^{(IQ_{M \times N}(i,j)+\frac{1}{2}log2(M \times N)-8+\Delta BD)}\right].$$

Note that a value of $$\left(IQ_{M \times N}(i,j) + \frac{1}{2}\log_2(M \times N) - 7 + \Delta BD\right)$$

smaller than 0 means left shifting, in which case $f_{M \times N,dq}(i,j)$ may be set to zero.

Inverse Transform

The input to inverse transform may be a dequantized block $Y'_{M \times N}$. To perform a 2-D inverse transform on $Y'_{M \times N}$, the M rows and N columns in $Y'_{M \times N}$ are transformed in a sequential manner, using the horizontal and vertical inverse transforms, respectively. Either horizontal or vertical inverse transform may be performed first.

If the horizontal inverse transform is performed first, $Y'_{M \times N}$ may be first right-multiplied by $T_N$ and right shifted with a proper number of bits in order to accommodate 16-bit arithmetic. The resultant intermediate block $V_{M \times N}$ may be as follows:

$$V_{M \times N} = (Y'_{M \times N} \times T_N + f_{inv,h}) \gg 8 \qquad (27)$$

The factor $f_{inv,h}$ may be in the range [0, 256]. For simplicity of exposition herein, the $f_{inv,h}$ may be equal to 128.

After the horizontal inverse transform, vertical inverse transform may be performed on the intermediate block $V_{M \times N}$. The process of vertical inverse transform may be as follows:

$$X'_{M \times N} = (T_M^T \times V_{M \times N} + f_{inv,v}) \gg (13 - \Delta BD) \qquad (28)$$

where the factor $f_{inv,v}$ may be in the range [0, $2^{(13-\Delta BD)}$], and, for simplicity of exposition herein, may be equal to $2^{(12-\Delta BD)}$.

If the vertical inverse transform is performed first, $Y'_{M \times N}$ may be left-multiplied by $T_M^T$ first and right shifted with a proper number of bits in order to accommodate 16-bit arithmetic. The resultant intermediate block $V_{M \times N}$ may be as follows:

$$V_{M \times N} = (T_M^T \times Y'_{M \times N} + f_{inv,v}) \gg 8 \qquad (29)$$

The factor $f_{inv,v}$ is for rounding, and may be in the range [0, 256]. For simplicity of exposition herein, the $f_{inv,v}$ may be equal to 128.

After the vertical inverse transform, horizontal inverse transform may be performed on the intermediate block $V_{M \times N}$. The process of horizontal inverse transform may be as follows:

$$X'_{M \times N} = (V_{M \times N} \times T_N + f_{inv,h}) \gg (13 \times \Delta BD) \qquad (30)$$

where the factor $f_{inv,h}$ may be in the range [0, $2^{(13-\Delta BD)}$], and, for simplicity of exposition herein, may be equal to $2^{(12-\Delta BD)}$.

Table I below summarizes the dynamic range after each step of the operations as disclosed above, assuming the horizontal transform is performed before the vertical transform. As is evident from the table, all of the processes may be implemented using 16-bit arithmetic.

TABLE I

Dynamic Range after Various Operations (Horizontal Transform Carried Out First)

| | Operations | Output Bit-Depth |
|---|---|---|
| Input | $X_{M \times N}$ | 9 + ΔBD |
| Horizontal forward transform | $X_{M \times N} \times T_N^T$ | 16 + log$_2$(N) + ΔBD |
| Right shifting | ≫(log$_2$(N) + ΔBD) | 16 |

TABLE I-continued

Dynamic Range after Various Operations (Horizontal Transform Carried Out First)

| Operations | | Output Bit-Depth |
|---|---|---|
| Vertical forward transform | $T_M \times U_{M \times N}$ | $23 + \log_2(M)$ |
| Right shifting | $\gg (\log_2(M) + 7)$ | 16 |
| Quantization by stepsize W | $(Y_{M \times N} \times S_{M \times N} + f_{M \times N, q}) \gg \left(Q_{M \times N} + 7 - \frac{1}{2}\log_2(M \times N) - \Delta BD\right)$ | $9 + \Delta BD + \frac{1}{2}\log_2(M \times N) - \log_2 W$ |
| Dequantization by stepsize W | $(Z_{M \times N} \times D_{M \times N} + f_{M \times N, dq}) \gg \left(\frac{1}{2}\log_2(M \times N) - 7 + IQ_{M \times N} + \Delta BD\right)$ | 16 |
| Horizontal inverse transform | $Y_{M \times N}' \times T_N$ | 23 |
| Right shifting | $\gg 8$ | 15 |
| Vertical inverse transform | $T_M^T \times V_{M \times N}$ | 22 |
| Right shifting | $\gg (13 - \Delta BD)$ | $9 + \Delta BD$ |
| Output | $X_{M \times N}'$ | $9 + \Delta BD$ |

Factorization of Forward/Inverse Transforms

The definitions of forward and inverse transforms include matrix multiplications, such as the equations (19)-(22), and (27)-(30). For certain implementation platforms, the complexity of matrix multiplication is high. Simplifications of matrix multiplication are provided herein. At least some of the simplification were developed based on symmetries of the transform $T_N$, the odd-part, the lower-order intermediate matrix for wavelet decomposition, and wavelet decomposition matrices, etc.

Generic Partial Factorization for Transforms

Figure 3:
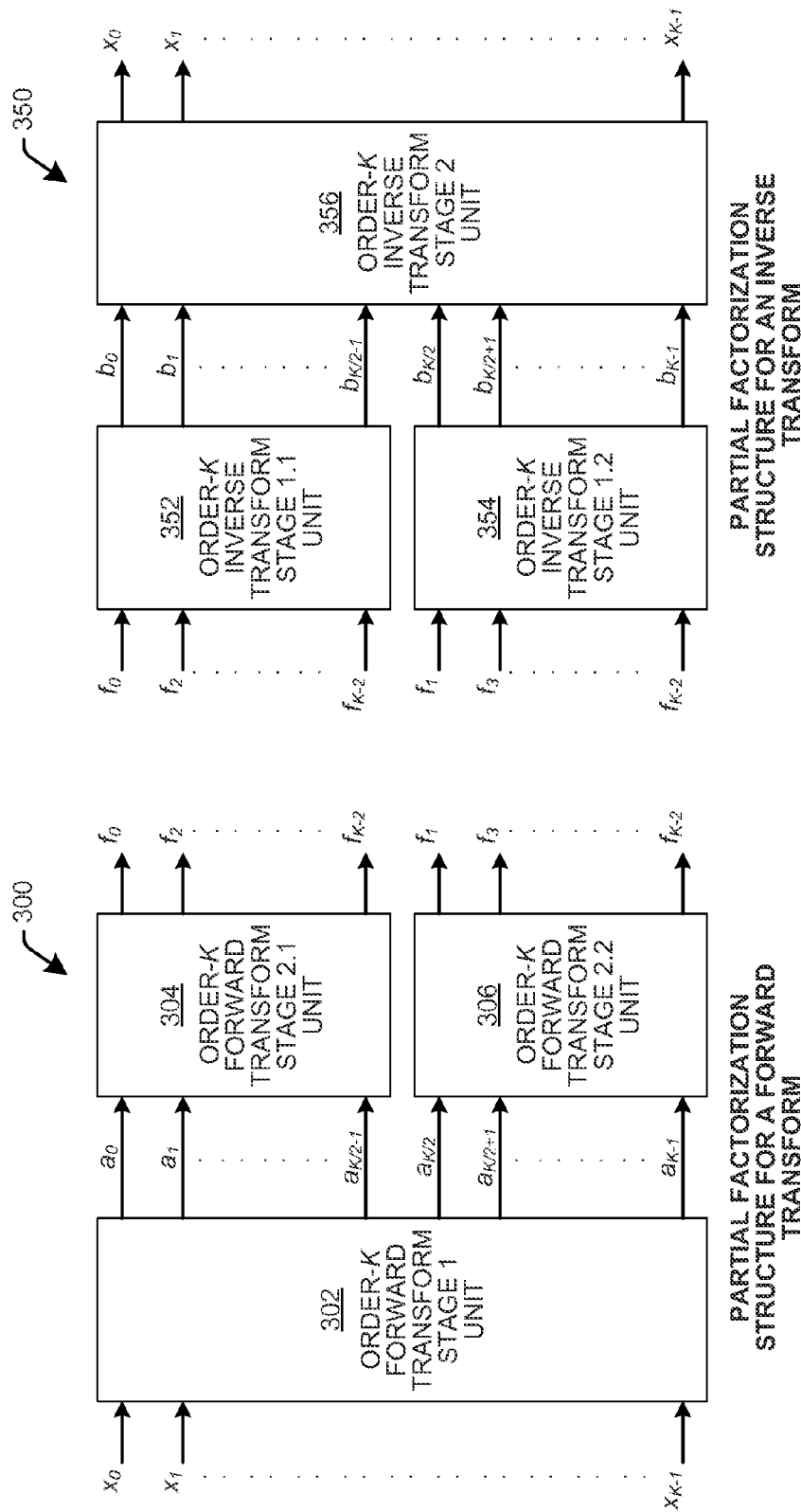
FIGS. 3A-3B are block diagrams illustrating an example structure for performing partial factorization for an order-K transform.

FIGS. 3A-3B are block diagrams illustrating an example structure for performing partial factorization for an order-K transform. An example forward-transform structure, module or unit (collectively "unit") 300 for performing partial factorization for an order-K transform (K∈{4,8,16,32}) is shown in FIG. 3A. The forward transform unit 300 may be decomposed into two stages. The first stage may include a stage 1 unit 302, and the second stage may include two stage 2 units 304, 306. Assuming an input vector of $x=[x_0, x_1, \ldots, x_{k-1}]^T$, the stage 1 unit 302 may be adapted to perform matrix multiplication of $$\begin{bmatrix} I_{K/2} & J_{K/2} \\ I_{K/2} & -J_{K/2} \end{bmatrix}$$

and x, as follows:

$$a = \begin{bmatrix} I_{K/2} & J_{K/2} \\ I_{K/2} & -J_{K/2} \end{bmatrix} x \quad (31)$$

where $a=[a_0, a_1, \ldots, a_{k-1}]^T$ is an intermediary transform result output of the stage 1 unit 302 and an input to the stage 2 units 304 and 306. The stage 2 units 304, 306 may divide the intermediary transform result a into two parts, namely, first and second halves of $a=[a_0, a_1, \ldots, a_{k-1}]^T$. The first half of the intermediary transform result a, namely, $[a_0, a_1, \ldots, a_{k/2-1}]^T$ may be input into the stage 2.1 unit 304. The stage 2.1 unit 304 may perform matrix multiplication with $T_{k/2}$, for example, as follows:

$$[f_0, f_2, \ldots, f_{k-2}]^T = T_{k/2} \times [a_0, a_1, \ldots, a_{k/2-1}]^T. \quad (32)$$

where $[f_0, f_2, \ldots, f_{k-2}]^T$ represents even-indexed elements at the output of the transform matrix $T_N$. Each element of $[f_0, f_2, \ldots, f_{k-2}]^T$ corresponds to a basis vector of an even part of the transform matrix, $T_K$. Also, note that $f=[f_0, f_1, \ldots, f_{k-1}]^T$ is the output of the 1-D forward transform. The second half of the intermediary transform result a, namely, $[a_{k/2}, a_{k/2+1}, \ldots, a_{k-1}]^T$, may be input into the stage 2.2 unit 306. The stage 2.2 unit 306 may perform the matrix multiplication with $P_{k/2}$, for example, as follows:

$$[f_1, f_3, \ldots, f_{k-1}]^T = P_{k/2} \times [a_{k/2}, a_{k/2+1}, \ldots, a_{k-1}]^T. \quad (33)$$

where $[f_1, f_3, \ldots, f_{k-1}]^T$ represents odd-indexed at the output of the transform matrix $T_N$. Each element of $[f_1, f_3, \ldots, f_{k-1}]^T$ corresponds to a basis vector of the odd part of the transform matrix $T_K$.

An example inverse transform unit 350 for performing partial factorization for an order-K transform (K∈{4,8,16,32}) is shown in FIG. 3B. The inverse transform unit 350 may be decomposed into two stages. The first stage may include stage 1 units 352 and 354, and the second stage may include a stage 2 unit 356, The even-indexed and odd-indexed elements of $f=[f_0, f_1, \ldots, f_{k-1}]^T$ may be first grouped separately, and input into the stage 1.1 unit 352 and stage 1.2 unit 354, respectively, as shown. The stage 1.1 unit 352 may perform matrix multiplication of $T_{k/2}^T$ and $[f_0, f_2, \ldots, f_{k-2}]^T$; and the stage 1.2 unit 354 may perform matrix multiplication of $P_{k/2}^T$ and $[f_1, f_3, \ldots, f_{k-1}]^T$, for example, as follows:

$$[b_0, b_1, \ldots, b_{k/2-1}]^T = T_{k/2}^T \times [f_0, f_2, \ldots, f_{k-2}]^T \quad (34)$$

$$[b_{k/2}, b_{k/2+1}, \ldots, b_{k-1}]^T = P_{k/2}^T \times [f_1, f_3, \ldots, f_{k-1}]^T \quad (35)$$

The outputs of the stage 1.1 unit 352 and the stage 1.2 unit 354 may be first and second halves of intermediary inverse transform result $b=[b_0, b_1, \ldots, b_{k-1}]^T$, respectively. The intermediary inverse transform result b may be input to the stage 2 unit 356. The stage 2 unit 356 may perform matrix multiplication of $$\begin{bmatrix} I_{K/2} & J_{K/2} \\ I_{K/2} & -J_{K/2} \end{bmatrix}^T$$

and b, for example, as follows:

$$x = \begin{bmatrix} I_{K/2} & J_{K/2} \\ I_{K/2} & -J_{K/2} \end{bmatrix}^T b. \quad (36)$$

The stage 2 unit 356 may also combine the even and odd parts into the final output transform coefficients.

Example Factorization for Order-32 Transform

Figure 4:
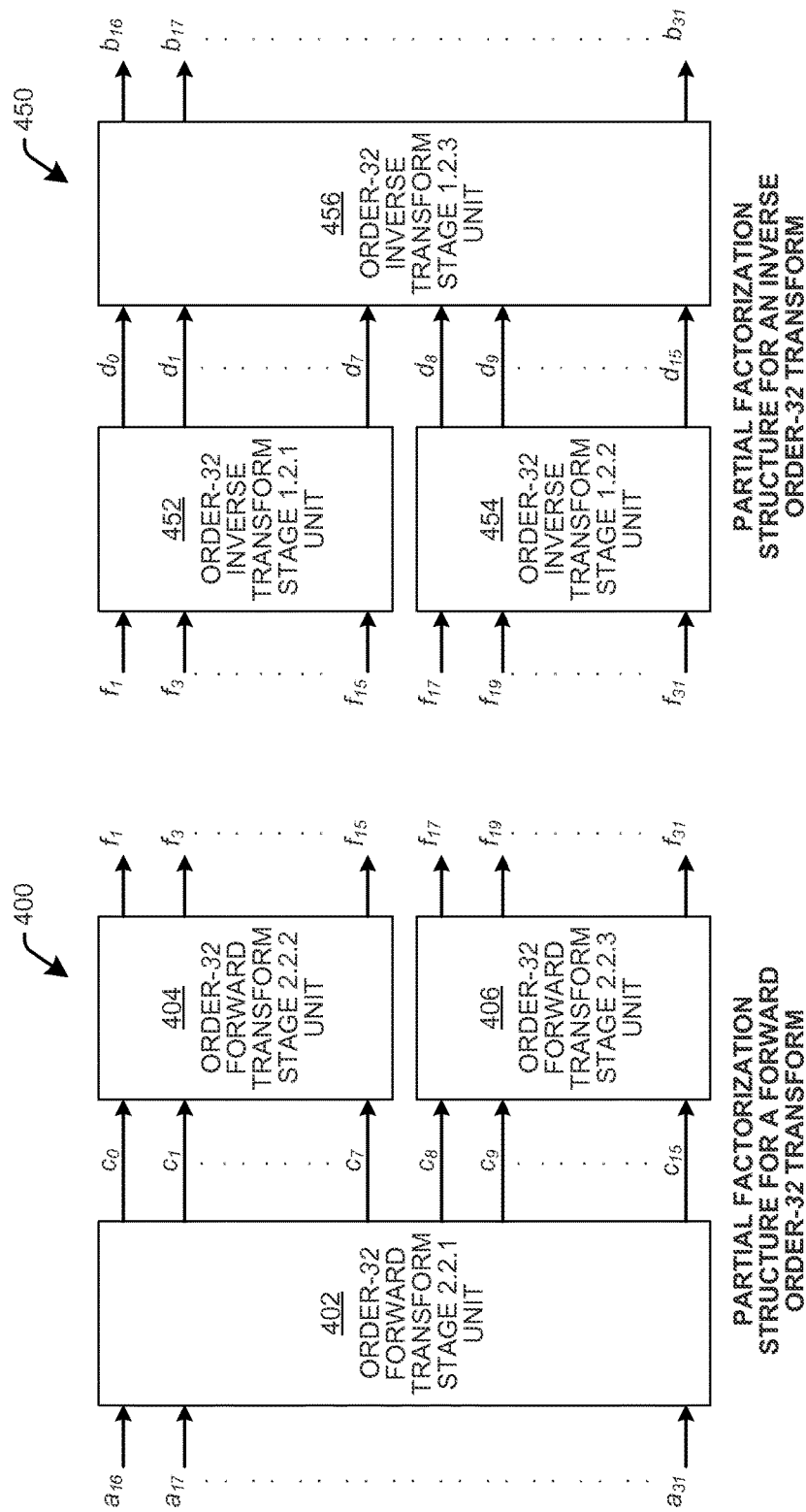
FIGS. 4A-4B are block diagrams illustrating an example structure for performing partial factorization for an order-32 transform.

When K, for example, is equal to 32, each of the forward transform stage 2.2 unit 306 and inverse transform stage 1.2 unit 354 for the order-32 transform can be factorized into two stages 400 and 450, as shown in FIGS. 4A and 4B, respectively. As shown in FIG. 4A, the stage 2.2 unit 306 may be carried out using a stage 2.2.1 unit 402, a stage 2.2.2 unit 404 and a stage 2.2.3 unit 406. The matrix multiplications completed in by the units 402, 404 and 406 may be as follows:

$$c = W \times [a_{16}, a_{17}, \ldots, a_{31}]^T \quad (37)$$

$$[f_1, f_3, \ldots, f_{15}]^T = P_8 \times [c_0, c_1, \ldots, c_7]^T \quad (38)$$

$$[f_{17}, f_{19}, \ldots, f_{31}]^T = P_8 \times [c_8, c_9, \ldots, c_{15}]^T \quad (39)$$

where $c=[c_0, c_1, \ldots, c_{15}]^T$ may be a 16×1 intermediate vector.

As shown in FIG. 4B, the stage 1.2 unit 354 may be carried out using a stage 1.2.1 unit 452, a stage 1.2.2 unit 454 and a stage 1.2.3 unit 456. The matrix multiplications carried out by the units 452, 454 and 456 may be as follows:

$$[d_0, d_1, \ldots, d_7]^T = P_8^T \times [f_1, f_3, \ldots, f_{15}]^T \quad (40)$$

$$[d_8, d_9, \ldots, d_{15}]^T = P_8^T \times [f_{17}, f_{19}, \ldots, f_{31}]^T \quad (41)$$

$$[b_{16}, b_{17}, \ldots, b_{31}]^T = W^T \times d \quad (42)$$

where $d=[d_0, d_1, \ldots, d_{15}]^T$ is a 16×1 intermediate vector.

Example Structure of Order-8 Transforms

The transform matrix $T_8$ may include, as noted above, an even-part lower-order transform matrix and a lower-order odd-part matrix. The lower-order even-part matrix may be, for example, the transform matrix $T_4$, of any order-4 transform, including, for example, the transform matrix $T_4$ of equation (10). The lower-order odd-part matrix may be $P_4$, which may be defined by 10 parameters, namely, {a, b, c, d, e, f, i, j, h, k} as follows:

$$P_4 = \begin{bmatrix} h \times e \times (a+b) & h \times f \times (c+1) & h \times f \times (c-1) & h \times e \times (a-b) \\ k \times j \times a & -k \times i & -k \times i \times c & -k \times j \times b \\ k \times j \times b & -k \times i \times c & k \times i & k \times j \times a \\ h \times e \times (a-b) & -h \times f \times (c-1) & h \times f \times (c+1) & -h \times e \times (a+b) \end{bmatrix} \quad (43)$$

The lower-order odd-part matrix $P_4$ may be equal to a multiplication of three order-N/2 matrices, namely, $M_2^4$, $M_3^4$, and $M_4^4$. That is, the lower-order odd-part matrix $P_4 = M_4^4 \times M_3^4 \times M_2^4$, In one embodiment, the three order-N/2 matrices, $M_2^4$, $M_3^4$, and $M_4^4$ may be expressed as follows:

$$M_2^4 = \begin{bmatrix} a & 0 & 0 & -b \\ 0 & c & -d & 0 \\ 0 & d & c & 0 \\ b & 0 & 0 & a \end{bmatrix} \quad M_3^4 = \begin{bmatrix} e & 0 & f & 0 \\ 0 & -i & 0 & j \\ j & 0 & -i & 0 \\ 0 & f & 0 & e \end{bmatrix} \quad (44)$$

$$M_4^4 = \begin{bmatrix} h & 0 & 0 & h \\ 0 & 0 & k & 0 \\ 0 & k & 0 & 0 \\ h & 0 & 0 & -h \end{bmatrix}$$

In one embodiment, the operations carried out by the stage 2.2 unit 306, as shown in equation (33), may be carried out as follows:

$$[f_1, f_3, f_5, f_7]^T = M_4^4 \times M_3^4 \times M_2^4 \times [a_4, a_5, a_6, a_7]^T \quad (45)$$

which means the matrix multiplication with $P_{k/2}$ may be fully factorized into doing matrix multiplications with $M_2^4$, $M_3^4$, and $M_4^4$, sequentially. Similarly, as for inverse transform, operations of the stage 1.2 unit 354 as shown in equation (35), may be carried out as follows:

$$[b_4, b_5, b_6, b_7]^T = (M_2^4)^T \times (M_3^4)^T \times (M_4^4)^T \times [f_1, f_3, f_5, f_7]^T \quad (46)$$

which means the matrix multiplication with $P_{k/2}^T$ may be fully factorized into doing matrix multiplications with $(M_4^4)^T$, $(M_3^4)^T$, and $(M_2^4)^T$, sequentially.

FIGS. 5A-5B are block diagrams illustrating an example structure for performing full factorization for an order-8 transform. Example values for the parameter set {a, b, c, d, e, f, i, j, h, k} include {3, 2, 5, 1, 37, 24, 37, 48, 1, 1} and {3, 2, 5, 1, 144, 99, 72, 99, 0.5, 1}. The lower-order matrix $P_4$ of equation (10) may be generated using, for example, the example values {3, 2, 5, 1, 37, 24, 37, 48, 1, 1}.

Example Structure of Order-16 Transforms

The transform matrix $T_{16}$ may include, as noted above, an even-part lower-order transform matrix and a lower-order odd-part matrix. The lower-order even-part matrix may be, for example, the transform matrix $T_8$, of any order-8 transform, including, for example, the transform matrix $T_8$ discussed under heading "Example Structure of Order-8 Transforms" above. The lower-order odd-part matrix may be $P_8$, which may be defined by 10 parameters, namely, {a, b, c, d, e, f, g, h, k, l, i, j} as follows:

$$P_8 = \begin{bmatrix} a\times l+b\times l & c\times l+d\times l & e\times l+f\times l & g\times l+h\times l & h\times l-g\times l & -f\times l+e\times l & d\times l-c\times l & -b\times l+a\times l \\ -a\times j+b\times i & -d\times j-c\times i & a\times j+e\times i & g\times j-h\times i & h\times j+g\times i & e\times j-f\times i & c\times j-d\times i & b\times j+a\times i \\ a\times i-b\times j & -d\times i-c\times j & f\times i+e\times j & -g\times i+h\times j & -h\times i-g\times j & e\times i-f\times j & c\times i-d\times j & -b\times i-a\times j \\ a\times k & -c\times k & -e\times k & g\times k & h\times k & f\times k & -d\times k & -b\times k \\ b\times k & -d\times k & -f\times k & h\times k & -g\times k & -e\times k & c\times k & a\times k \\ -a\times j-b\times i & d\times j-c\times i & -f\times j+e\times i & g\times j+h\times i & h\times j-g\times i & -e\times j-f\times i & -c\times j-d\times i & b\times j-a\times i \\ -a\times i-b\times j & -d\times i+c\times j & f\times i-e\times j & g\times i+h\times j & h\times i-g\times j & e\times i+f\times j & c\times i+d\times j & b\times i-a\times j \\ a\times l-b\times l & c\times l-d\times l & e\times l-f\times l & g\times l-h\times l & h\times l+g\times l & -f\times l-e\times l & d\times l+c\times l & -b\times l-a\times l \end{bmatrix} \quad (47)$$

The lower-order odd-part matrix $P_8$ may be equal to a multiplication of four order-N/2 matrices, namely, $M_2^8$, $M_3^8$, $M_4^8$, and $M_5^4$. That is $P_8 = M_5^8 \times M_4^8 \times M_3^8 \times M_2^8$. In one embodiment, the four order-N/2 matrices, $M_2^8$, $M_3^8$, $M_4^8$, and $M_5^4$ may be expressed as follows:

$$M_2^8 = \begin{bmatrix} a & 0 & 0 & 0 & 0 & 0 & 0 & -b \\ 0 & c & 0 & 0 & 0 & 0 & d & 0 \\ 0 & 0 & e & 0 & 0 & -f & 0 & 0 \\ 0 & 0 & 0 & g & h & 0 & 0 & 0 \\ 0 & 0 & 0 & -h & g & 0 & 0 & 0 \\ 0 & 0 & f & 0 & 0 & e & 0 & 0 \\ 0 & -d & 0 & 0 & 0 & 0 & c & 0 \\ b & 0 & 0 & 0 & 0 & 0 & 0 & a \end{bmatrix} \quad (48)$$

$$M_3^8 = \begin{bmatrix} -1 & 0 & 0 & 1 & 0 & 0 & 0 & 0 \\ 0 & -1 & 1 & 0 & 0 & 0 & 0 & 0 \\ 0 & 1 & 1 & 0 & 0 & 0 & 0 & 0 \\ 1 & 0 & 0 & 1 & 0 & 0 & 0 & 0 \\ 0 & 0 & 0 & 0 & -1 & 0 & 0 & 1 \\ 0 & 0 & 0 & 0 & 0 & -1 & 1 & 0 \\ 0 & 0 & 0 & 0 & 0 & 1 & 1 & 0 \\ 0 & 0 & 0 & 0 & 1 & 0 & 0 & 1 \end{bmatrix} \quad (49)$$

$$M_4^8 = \begin{bmatrix} -1 & 0 & 0 & 0 & 0 & 0 & 1 & 0 \\ 0 & -1 & 0 & 0 & 0 & 0 & 0 & 1 \\ 0 & 0 & -1 & 1 & 0 & 0 & 0 & 0 \\ 0 & 0 & 1 & 1 & 0 & 0 & 0 & 0 \\ 0 & 0 & 0 & 0 & -1 & 1 & 0 & 0 \\ 0 & 0 & 0 & 0 & 1 & 1 & 0 & 0 \\ 1 & 0 & 0 & 0 & 0 & 0 & 1 & 0 \\ 0 & 1 & 0 & 0 & 0 & 0 & 0 & 1 \end{bmatrix} \quad (50)$$

$$M_5^8 = \begin{bmatrix} 0 & 0 & 0 & l & -l & 0 & 0 & 0 \\ 0 & 0 & 0 & 0 & 0 & 0 & j & i \\ i & -j & 0 & 0 & 0 & 0 & 0 & 0 \\ 0 & 0 & k & 0 & 0 & 0 & 0 & 0 \\ 0 & 0 & 0 & 0 & 0 & k & 0 & 0 \\ -j & -i & 0 & 0 & 0 & 0 & 0 & 0 \\ 0 & 0 & 0 & 0 & 0 & 0 & i & -j \\ 0 & 0 & 0 & l & l & 0 & 0 & 0 \end{bmatrix} \quad (51)$$

In one embodiment, the operations carried out by the stage 2.2 unit 306, as shown in equation (33), may be carried out as follows:

$$[f_1, f_3, \ldots, f_{15}]^T = M_5^8 \times M_4^8 \times M_3^8 \times M_2^8 \times [a_8, a_9, \ldots, a_{15}]^T \quad (52)$$

which means the matrix multiplication with $P_8$ may be fully factorized into doing matrix multiplications with $M_2^8$, $M_3^8$, $M_4^8$, and $M_5^8$, sequentially. Similarly, as for inverse transform, operations of the stage 1.2 unit 354, as shown in equation (35), may be carried out as follows:

$$[b_8, b_9, \ldots, b_{15}]^T = (M_2^8)^T \times (M_3^8)^T \times (M_4^8)^T \times (M_5^8)^T \times [f_1, f_3, \ldots, f_{15}]^T \quad (53)$$

which means the matrix multiplication with $P_8^T$ may be fully factorized into doing matrix multiplications with $(M_5^8)^T$, $(M_4^8)^T$, $(M_3^8)^T$, and $(M_2^8)^T$, sequentially.

Figure 6A:
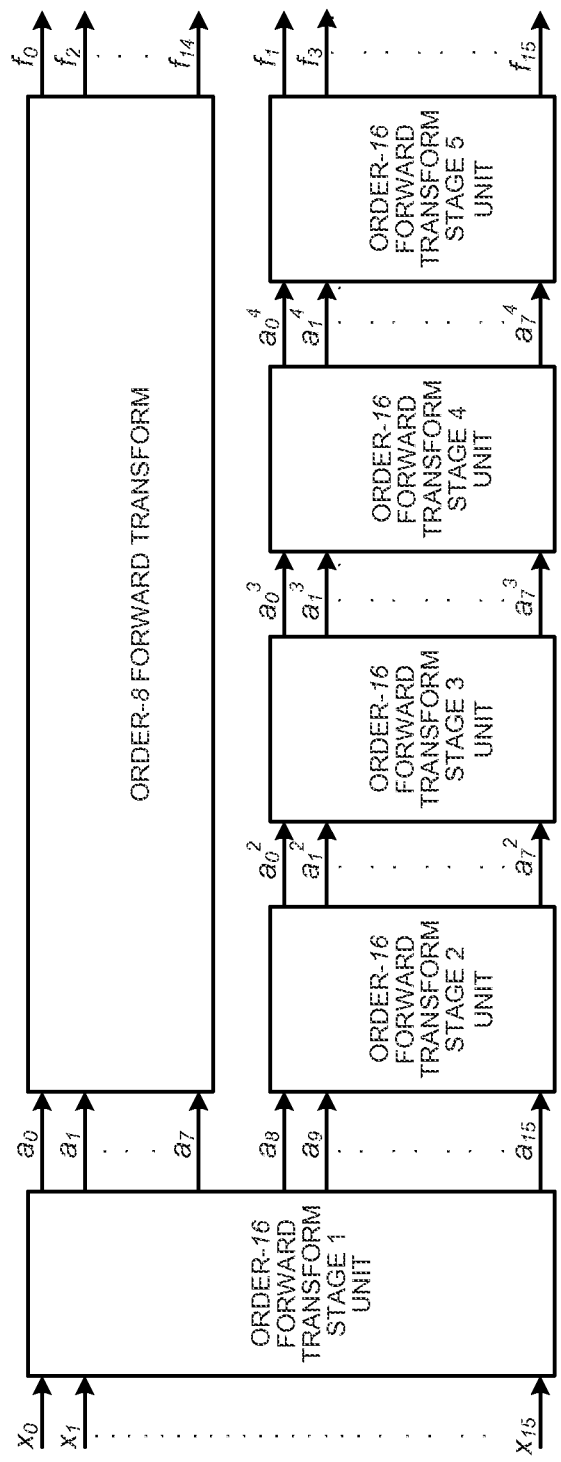
FIG. 6A-6B are block diagrams illustrating an example structure for performing full factorization for an order-16 transform.
Figure 6B:
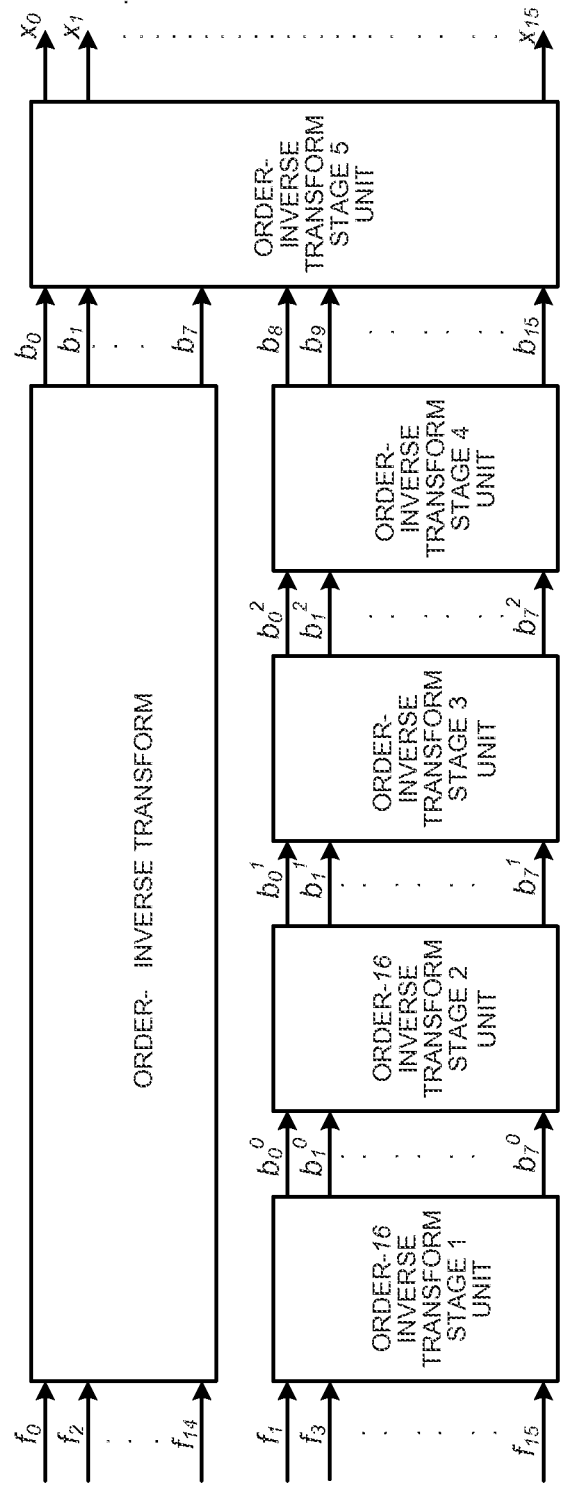
Figure 7A:
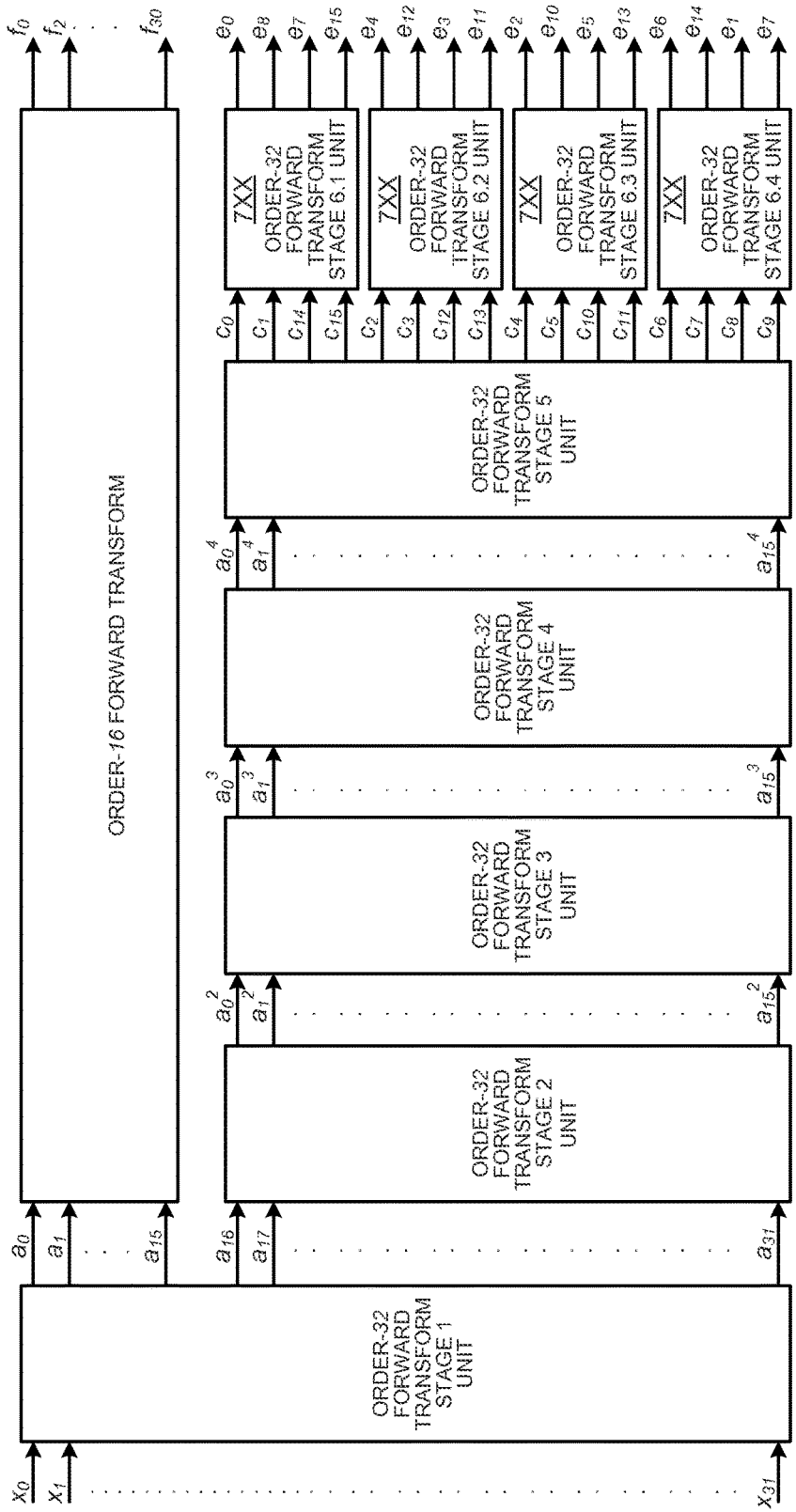
FIGS. 7A-7B are block diagrams illustrating an example structure for performing full factorization for an order-32 transform.
Figure 7B:
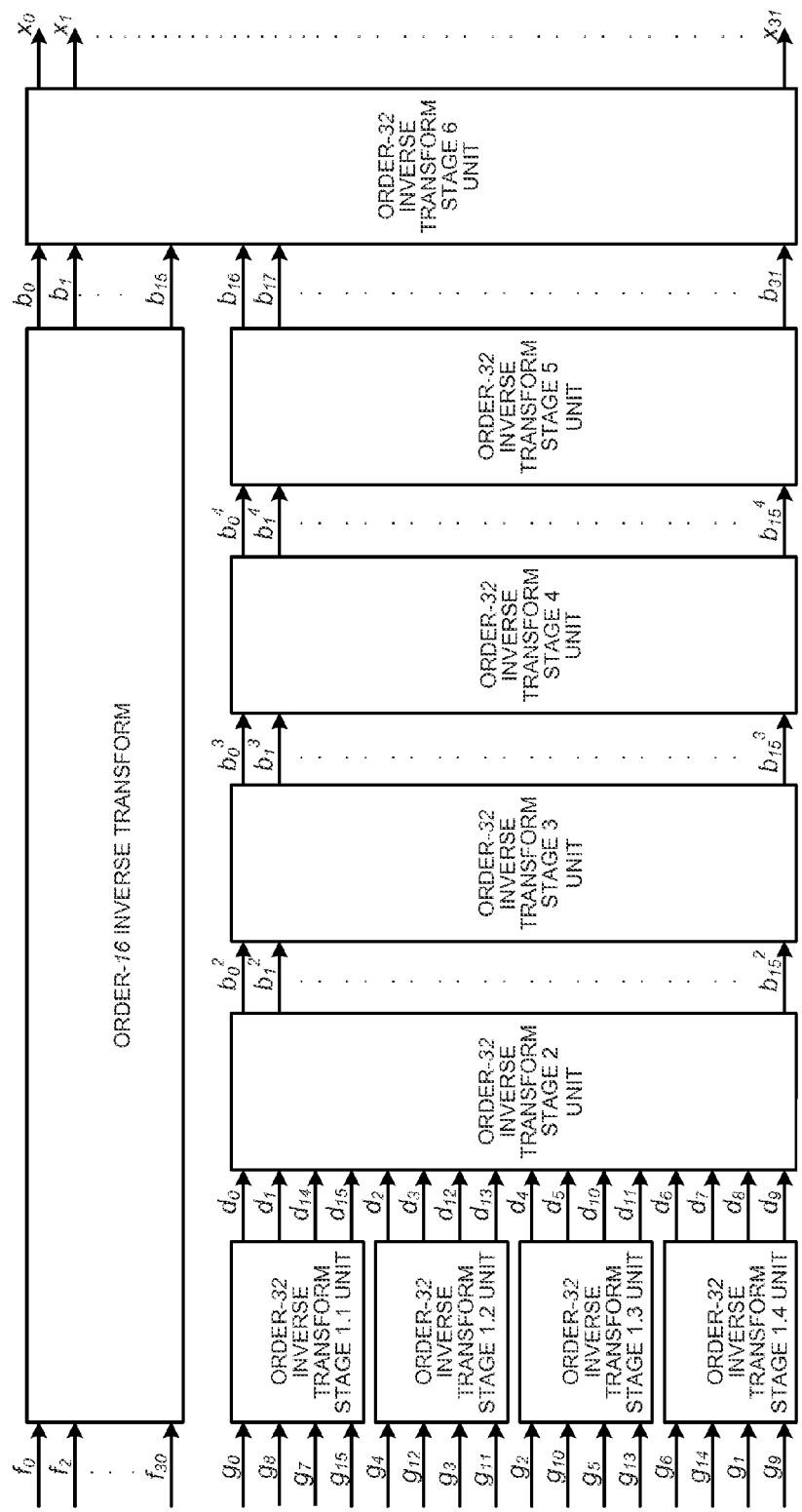

FIGS. 6A-6B are block diagrams illustrating an example structure for performing full factorization for an order-16 transform. Example values for the parameter set {a, b, c, d, e, f, g, h, k, l, i, j} are shown in Table II below

TABLE II

Embodiments for $P_8$

| a | b | c | d | e | f | g | h | k | l | I | j |
|---|---|---|---|---|---|---|---|---|---|---|---|
| 16 | 14 | 10 | 19 | 20 | 6 | 2 | 21 | 17 | 12 | 6 | −16 |
| 16 | 14 | 10 | 19 | 21 | 6 | 2 | 21 | 17 | 12 | 6 | −16 |
| 17 | 13 | 10 | 19 | 20 | 6 | 2 | 21 | 17 | 12 | 6 | −16 |
| 17 | 13 | 10 | 19 | 21 | 6 | 2 | 21 | 17 | 12 | 6 | −16 |
| 17 | 14 | 10 | 19 | 20 | 6 | 2 | 21 | 17 | 12 | 6 | −16 |
| 32 | 28 | 19 | 38 | 41 | 12 | 4 | 42 | 17 | 12 | 6 | −16 |
| 32 | 28 | 19 | 38 | 41 | 12 | 4 | 43 | 17 | 12 | 6 | −16 |
| 32 | 28 | 20 | 38 | 41 | 11 | 4 | 42 | 17 | 12 | 6 | −16 |
| 32 | 28 | 20 | 38 | 41 | 12 | 4 | 42 | 17 | 12 | 6 | −16 |
| 32 | 28 | 20 | 38 | 41 | 12 | 4 | 43 | 17 | 12 | 6 | −16 |
| 32 | 28 | 21 | 37 | 41 | 12 | 4 | 42 | 17 | 12 | 6 | −16 |
| 32 | 28 | 21 | 37 | 41 | 12 | 4 | 43 | 17 | 12 | 6 | −16 |
| 32 | 28 | 21 | 37 | 41 | 12 | 5 | 42 | 17 | 12 | 6 | −16 |
| 33 | 27 | 19 | 38 | 41 | 12 | 4 | 43 | 17 | 12 | 6 | −16 |
| 33 | 27 | 19 | 38 | 41 | 13 | 4 | 43 | 17 | 12 | 6 | −16 |
| 33 | 27 | 19 | 38 | 41 | 13 | 5 | 42 | 17 | 12 | 6 | −16 |
| 33 | 27 | 20 | 38 | 41 | 11 | 4 | 42 | 17 | 12 | 6 | −16 |
| 33 | 27 | 20 | 38 | 41 | 12 | 4 | 43 | 17 | 12 | 6 | −16 |
| 33 | 27 | 21 | 37 | 41 | 12 | 4 | 42 | 17 | 12 | 6 | −16 |
| 33 | 27 | 21 | 37 | 41 | 12 | 4 | 43 | 17 | 12 | 6 | −16 |
| 33 | 27 | 21 | 37 | 41 | 12 | 5 | 42 | 17 | 12 | 6 | −16 |
| 33 | 27 | 21 | 37 | 41 | 13 | 4 | 43 | 17 | 12 | 6 | −16 |
| 33 | 27 | 21 | 37 | 41 | 13 | 5 | 42 | 17 | 12 | 6 | −16 |
| 34 | 26 | 19 | 38 | 41 | 11 | 4 | 42 | 17 | 12 | 6 | −16 |
| 34 | 26 | 19 | 38 | 41 | 12 | 4 | 42 | 17 | 12 | 6 | −16 |
| 34 | 26 | 19 | 38 | 41 | 12 | 5 | 42 | 17 | 12 | 6 | −16 |
| 34 | 26 | 19 | 38 | 41 | 13 | 4 | 43 | 17 | 12 | 6 | −16 |
| 34 | 26 | 20 | 38 | 41 | 12 | 4 | 42 | 17 | 12 | 6 | −16 |
| 34 | 26 | 21 | 37 | 41 | 12 | 4 | 42 | 17 | 12 | 6 | −16 |
| 33 | 27 | 19 | 38 | 41 | 11 | 4 | 42 | 17 | 12 | 6 | −16 |
| 33 | 27 | 19 | 38 | 41 | 12 | 4 | 42 | 17 | 12 | 6 | −16 |
| 33 | 27 | 21 | 37 | 40 | 13 | 5 | 42 | 17 | 12 | 6 | −16 |
| 33 | 27 | 21 | 37 | 41 | 12 | 4 | 42 | 17 | 12 | 6 | −16 |
| 32 | 27 | 20 | 37 | 40 | 12 | 4 | 42 | 17 | 12 | 6 | −16 |
| 32 | 27 | 20 | 37 | 40 | 13 | 4 | 42 | 17 | 12 | 6 | −16 |
| 33 | 26 | 20 | 37 | 40 | 12 | 4 | 42 | 17 | 12 | 6 | −16 |
| 33 | 26 | 20 | 37 | 40 | 13 | 4 | 42 | 17 | 12 | 6 | −16 |
| 33 | 27 | 19 | 38 | 41 | 11 | 4 | 42 | 17 | 12 | 6 | −16 |
| 33 | 27 | 19 | 38 | 41 | 12 | 4 | 42 | 17 | 12 | 6 | −16 |
| 33 | 27 | 21 | 37 | 41 | 12 | 4 | 42 | 17 | 12 | 6 | −16 |
| 33 | 27 | 20 | 38 | 41 | 12 | 4 | 42 | 17 | 12 | 6 | −16 |
| 33 | 27 | 21 | 37 | 41 | 12 | 4 | 42 | 17 | 12 | 6 | −16 |
| 33 | 27 | 19 | 38 | 41 | 10 | 2 | 43 | 17 | 12 | 6 | −16 |
| 33 | 27 | 21 | 37 | 41 | 13 | 4 | 42 | 17 | 12 | 6 | −16 |
| 23 | 19 | 13 | 27 | 29 | 8 | 3 | 30 | 24 | 17 | 10 | −22 |

TABLE II-continued

Embodiments for $P_8$

| a | b | c | d | e | f | g | h | k | l | I | j |
|---|---|---|---|---|---|---|---|---|---|---|---|
| 23 | 19 | 14 | 26 | 29 | 9 | 3 | 30 | 24 | 17 | 10 | −22 |
| 23 | 19 | 14 | 27 | 29 | 8 | 3 | 30 | 24 | 17 | 10 | −22 |
| 23 | 19 | 15 | 26 | 29 | 9 | 3 | 30 | 24 | 17 | 10 | −22 |
| 23 | 19 | 14 | 26 | 29 | 8 | 3 | 30 | 24 | 17 | 10 | −22 |
| 23 | 19 | 14 | 27 | 29 | 8 | 3 | 30 | 24 | 17 | 10 | −22 |
| 23 | 19 | 15 | 26 | 29 | 9 | 3 | 30 | 24 | 17 | 10 | −22 |

Example Structure of Order-32 Transforms

The transform matrix $T_{32}$ may include, as noted above, an even-part lower-order transform matrix and a lower-order odd-part matrix. The lower-order even-part matrix may be, for example, the transform matrix $T_{16}$, of any order-16 transform, including, for example, the transform matrix $T_{16}$ discussed under heading "Example Structure of Order-16 Transforms" above. The lower-order odd-part matrix may be $P_{16}$, which may be defined by matrix multiplication of two matrices: X and Y., i.e., $P_{16}=Y \times X$. Then the process provided by (33) may be decomposed into two stages, as shown in (54) and (55), respectively:

$$c^T = X \times [a_{16}, a_{17}, \ldots, a_{31}]^T \tag{54}$$

$$[f_1, f_3, \ldots, f_{31}]^T = Y \times c^T \tag{55}$$

where $c=[c_0, c_1, \ldots, c_{15}]$ is the intermediate result. Similarly, as for the inverse transform, the process provided by (35) may also decomposed into two stages, as shown in (56) and (57), respectively:

$$d^T = Y^T \times [f_1, f_3, \ldots, f_{31}]^T \tag{56}$$

$$[b_{16}, b_{17}, \ldots, b_{31}]^T = X^T \times d^T \tag{57}$$

where $d=[d_0, d_1, \ldots, d_{15}]$ is also an intermediate result.

X may be defined by five (5) parameters $\{A, a_2, B, b_1, b_2\}$, shown as below.

$$X = \begin{bmatrix}
0 & 0 & 0 & 0 & 0 & 0 & 0 & (b1+b2)*a2 & -b2*A & 0 \\
0 & b1*A & b1*A & (b1-b2)*a2 & 0 & a2*B & -a2*B & 0 & 0 & A*B \\
0 & -b1*A & 0 & 0 & (b1-b2)*a2 & a2*B & 0 & 0 & 0 & A*B \\
0 & 0 & -b1*A & -(b1-b2)*a2 & 0 & 0 & -a2*B & 0 & b2*A & 0 \\
0 & 0 & b2*A & -(b1+b2)*a2 & 0 & -a2*B & a2*B & -(b1+b2)*a2 & b1*A & 0 \\
0 & b2*A & 0 & 0 & -(b1+b2)*a2 & -a2*B & 0 & 0 & 0 & A*B \\
0 & -b2*A & 0 & 0 & +(b1+b2)*a2 & 0 & 0 & (b1-b2)*a2 & 0 & A*B \\
0 & 0 & -b2*A & (b1+b2)*a2 & 0 & -a2*B & a2*B & 0 & -b1*A & 0 \\
A*B & 0 & b1*A & -(b1-b2)*a2 & 0 & -a2*B & 0 & -(b1+b2)*a2 & -b2*A & 0 \\
A*B & b1*A & 0 & 0 & -(b1-b2)*a2 & 0 & 0 & 0 & b2*A & 0 \\
0 & 0 & -b1*A & (b1-b2)*a2 & 0 & a2*B & -a2*B & 0 & 0 & 0 \\
0 & 0 & -b2*A & -(b1+b2)*a2 & 0 & a2*B & a2*B & (b1-b2)*a2 & 0 & 0 \\
A*B & -b2*A & 0 & 0 & (b1+b2)*a2 & 0 & 0 & 0 & -b1*A & 0 \\
A*B & -b2*A & 0 & 0 & (b1+b2)*a2 & a2*B & a2*B & -(b1-b2)*a2 & 0 & 0 \\
0 & 0 & 0 & 0 & 0 & 0 & 0 & 0 & 0 & 0 \\
0 & 0 & b2*A & (b1+b2)*a2 & 0 & a2*B & a2*B & -(b1-b2)*a2 & b1*A & 0
\end{bmatrix} \quad (58)$$

The matrix X may be equal to a multiplication of four order-N/2 matrices, namely, $M_2^{16}$, $M_3^{16}$, $M_4^{16}$, and $M_5^{16}$. That is $X = M_5^{16} \times M_4^{16} \times M_3^{16} \times M_2^{16}$. In one embodiment, the four order-N/2 matrices, $M_2^{16}$, $M_3^{16}$, $M_4^{16}$, and $M_5^{16}$ may be expressed as follows:

$$M_2^{16} = \begin{bmatrix}
0 & 0 & 0 & 0 & 0 & 0 & 0 & 0 & 0 & 0 & 0 & 0 & 0 & 0 & 0 & A \\
0 & 0 & 0 & 0 & 0 & 0 & 0 & 0 & 0 & 0 & 0 & 0 & 0 & 0 & A & 0 \\
0 & 0 & 0 & 0 & 0 & 0 & 0 & 0 & 0 & 0 & 0 & 0 & 0 & A & 0 & 0 \\
0 & 0 & 0 & 0 & 0 & 0 & 0 & 0 & 0 & 0 & 0 & 0 & A & 0 & 0 & 0 \\
0 & 0 & 0 & 0 & a2 & 0 & 0 & 0 & 0 & 0 & 0 & -a2 & 0 & 0 & 0 & 0 \\
0 & 0 & 0 & 0 & 0 & a2 & 0 & 0 & 0 & 0 & -a2 & 0 & 0 & 0 & 0 & 0 \\
0 & 0 & 0 & 0 & 0 & 0 & a2 & 0 & 0 & -a2 & 0 & 0 & 0 & 0 & 0 & 0 \\
0 & 0 & 0 & 0 & 0 & 0 & 0 & a2 & -a2 & 0 & 0 & 0 & 0 & 0 & 0 & 0 \\
0 & 0 & 0 & 0 & 0 & 0 & 0 & a2 & a2 & 0 & 0 & 0 & 0 & 0 & 0 & 0 \\
0 & 0 & 0 & 0 & 0 & 0 & a2 & 0 & 0 & a2 & 0 & 0 & 0 & 0 & 0 & 0 \\
0 & 0 & 0 & 0 & 0 & a2 & 0 & 0 & 0 & 0 & a2 & 0 & 0 & 0 & 0 & 0 \\
0 & 0 & 0 & 0 & a2 & 0 & 0 & 0 & 0 & 0 & 0 & a2 & 0 & 0 & 0 & 0 \\
0 & 0 & 0 & A & 0 & 0 & 0 & 0 & 0 & 0 & 0 & 0 & 0 & 0 & 0 & 0 \\
0 & 0 & A & 0 & 0 & 0 & 0 & 0 & 0 & 0 & 0 & 0 & 0 & 0 & 0 & 0 \\
0 & A & 0 & 0 & 0 & 0 & 0 & 0 & 0 & 0 & 0 & 0 & 0 & 0 & 0 & 0 \\
A & 0 & 0 & 0 & 0 & 0 & 0 & 0 & 0 & 0 & 0 & 0 & 0 & 0 & 0 & 0
\end{bmatrix}$$

(59)

$$M_3^{16} = \begin{bmatrix}
1 & 0 & 0 & 0 & 0 & 0 & 0 & 1 & 0 & 0 & 0 & 0 & 0 & 0 & 0 & 0 \\
0 & 1 & 0 & 0 & 0 & 0 & 1 & 0 & 0 & 0 & 0 & 0 & 0 & 0 & 0 & 0 \\
0 & 0 & 1 & 0 & 0 & 1 & 0 & 0 & 0 & 0 & 0 & 0 & 0 & 0 & 0 & 0 \\
0 & 0 & 0 & 1 & 1 & 0 & 0 & 0 & 0 & 0 & 0 & 0 & 0 & 0 & 0 & 0 \\
0 & 0 & 0 & 1 & -1 & 0 & 0 & 0 & 0 & 0 & 0 & 0 & 0 & 0 & 0 & 0 \\
0 & 0 & 1 & 0 & 0 & -1 & 0 & 0 & 0 & 0 & 0 & 0 & 0 & 0 & 0 & 0 \\
0 & 1 & 0 & 0 & 0 & 0 & -1 & 0 & 0 & 0 & 0 & 0 & 0 & 0 & 0 & 0 \\
1 & 0 & 0 & 0 & 0 & 0 & 0 & -1 & 0 & 0 & 0 & 0 & 0 & 0 & 0 & 0 \\
0 & 0 & 0 & 0 & 0 & 0 & 0 & 0 & -1 & 0 & 0 & 0 & 0 & 0 & 0 & 1 \\
0 & 0 & 0 & 0 & 0 & 0 & 0 & 0 & 0 & -1 & 0 & 0 & 0 & 0 & 1 & 0 \\
0 & 0 & 0 & 0 & 0 & 0 & 0 & 0 & 0 & 0 & -1 & 0 & 0 & 1 & 0 & 0 \\
0 & 0 & 0 & 0 & 0 & 0 & 0 & 0 & 0 & 0 & 0 & -1 & 1 & 0 & 0 & 0 \\
0 & 0 & 0 & 0 & 0 & 0 & 0 & 0 & 0 & 0 & 0 & 1 & 1 & 0 & 0 & 0 \\
0 & 0 & 0 & 0 & 0 & 0 & 0 & 0 & 0 & 0 & 1 & 0 & 0 & 1 & 0 & 0 \\
0 & 0 & 0 & 0 & 0 & 0 & 0 & 0 & 0 & 1 & 0 & 0 & 0 & 0 & 1 & 0 \\
0 & 0 & 0 & 0 & 0 & 0 & 0 & 0 & 1 & 0 & 0 & 0 & 0 & 0 & 0 & 1
\end{bmatrix}$$

(60)

$$M_4^{16} = \begin{bmatrix}
B & 0 & 0 & 0 & 0 & 0 & 0 & 0 & 0 & 0 & 0 & 0 & 0 & 0 & 0 & 0 \\
0 & B & 0 & 0 & 0 & 0 & 0 & 0 & 0 & 0 & 0 & 0 & 0 & 0 & 0 & 0 \\
0 & 0 & -b2 & 0 & 0 & 0 & 0 & 0 & 0 & 0 & 0 & 0 & b1 & 0 & 0 & 0 \\
0 & 0 & 0 & -b2 & 0 & 0 & 0 & 0 & 0 & 0 & 0 & b1 & 0 & 0 & 0 & 0 \\
0 & 0 & 0 & 0 & -b1 & 0 & 0 & 0 & 0 & 0 & 0 & -b2 & 0 & 0 & 0 & 0 \\
0 & 0 & 0 & 0 & 0 & -b1 & 0 & 0 & 0 & 0 & -b2 & 0 & 0 & 0 & 0 & 0 \\
0 & 0 & 0 & 0 & 0 & 0 & B & 0 & 0 & 0 & 0 & 0 & 0 & 0 & 0 & 0 \\
0 & 0 & 0 & 0 & 0 & 0 & 0 & B & 0 & 0 & 0 & 0 & 0 & 0 & 0 & 0 \\
0 & 0 & 0 & 0 & 0 & 0 & 0 & 0 & B & 0 & 0 & 0 & 0 & 0 & 0 & 0 \\
0 & 0 & 0 & 0 & 0 & 0 & 0 & 0 & 0 & B & 0 & 0 & 0 & 0 & 0 & 0 \\
0 & 0 & 0 & 0 & 0 & -b2 & 0 & 0 & 0 & 0 & b1 & 0 & 0 & 0 & 0 & 0 \\
0 & 0 & 0 & 0 & -b2 & 0 & 0 & 0 & 0 & 0 & 0 & b1 & 0 & 0 & 0 & 0 \\
0 & 0 & 0 & b1 & 0 & 0 & 0 & 0 & 0 & 0 & 0 & b2 & 0 & 0 & 0 & 0 \\
0 & 0 & b1 & 0 & 0 & 0 & 0 & 0 & 0 & 0 & 0 & 0 & b2 & 0 & 0 & 0 \\
0 & 0 & 0 & 0 & 0 & 0 & 0 & 0 & 0 & 0 & 0 & 0 & 0 & 0 & B & 0 \\
0 & 0 & 0 & 0 & 0 & 0 & 0 & 0 & 0 & 0 & 0 & 0 & 0 & 0 & 0 & B
\end{bmatrix}$$

(61)

-continued $$M_5^{16} = \begin{bmatrix} 1 & 0 & 0 & 1 & 0 & 0 & 0 & 0 & 0 & 0 & 0 & 0 & 0 & 0 & 0 & 0 \\ 0 & 1 & 1 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 \\ 1 & 0 & 0 & -1 & 0 & 0 & 0 & 0 & 0 & 0 & 0 & 0 & 0 & 0 & 0 & 0 \\ 0 & 0 & 0 & 0 & -1 & 0 & 0 & 1 & 0 & 0 & 0 & 0 & 0 & 0 & 0 & 0 \\ 0 & 0 & 0 & 0 & 0 & -1 & 1 & 0 & 0 & 0 & 0 & 0 & 0 & 0 & 0 & 0 \\ 0 & 0 & 0 & 0 & 0 & 1 & 1 & 0 & 0 & 0 & 0 & 0 & 0 & 0 & 0 & 0 \\ 0 & 0 & 0 & 0 & 1 & 0 & 0 & 1 & 0 & 0 & 0 & 0 & 0 & 0 & 0 & 0 \\ 0 & 0 & 0 & 0 & 0 & 0 & 0 & 0 & 1 & 0 & 0 & 1 & 0 & 0 & 0 & 0 \\ 0 & 0 & 0 & 0 & 0 & 0 & 0 & 0 & 1 & 1 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 1 & 0 & 0 & -1 & 0 & 0 & 0 & 0 & 0 \\ 0 & 0 & 0 & 0 & 0 & 0 & 0 & 0 & 0 & 0 & 0 & 0 & -1 & 0 & 0 & 1 \\ 0 & 0 & 0 & 0 & 0 & 0 & 0 & 0 & 0 & 0 & 0 & 0 & 0 & -1 & 1 & 0 \\ 0 & 0 & 0 & 0 & 0 & 0 & 0 & 0 & 0 & 0 & 0 & 0 & 0 & 1 & 1 & 0 \\ 0 & 0 & 0 & 0 & 0 & 0 & 0 & 0 & 0 & 0 & 1 & 0 & 0 & 0 & 1 \end{bmatrix} \quad (62)$$

The operations in (54) may be further decomposed and carried out as follows:

$$c^T = M_5^{16} \times M_4^{16} \times M_3^{16} \times M_2^{16} \times [a_{16}, a_{17}, \ldots, a_{31}]^T \quad (63)$$

which means the matrix multiplication with X may be fully factorized into doing matrix multiplications with $M_2^{16}$, $M_3^{16}$, $M_4^{16}$, and $M_5^{16}$, sequentially. Similarly, the operations in (57) may also be further decomposed and carried out as follows:

$$[b_{16}, b_{17}, \ldots, b_{31}]^T = (M_2^{16})^T \times (M_3^{16})^T \times (M_4^{16})^T \times (M_5^{16})^T \times d^T \quad (64)$$

which means the matrix multiplication with XT may be fully factorized into doing matrix multiplications with $(M_5^{16})^T$, $(M_4^{16})^T$, $(M_3^{16})^T$, and $(M_2^{16})^T$, sequentially.

FIGS. 6A-6B are block diagrams illustrating an example structure for performing full factorization for an order-32 transform. Examples values for the parameter set of X {A, a2, B, b1, b2} are {3, 2, 5, 2, 5}, {3, 2, 13, 5, 12}, {7, 5, 5, 2, 5}, and {7, 5, 13, 5, 12}.

The following describes a process for factorizing Y, in order to facilitate the fast algorithms in (55) and (56).

First, the elements in c may be grouped into four vectors, namely, $c^0 = [c_0, c_1, c_{14}, c_{15}]$, $c^1 = [c_2, c_3, c_{12}, c_{13}]$, $c^2 = [c_4, c_5, c_{10}, c_{11}]$, and $c^3 = [c_6, c_7, c_8, c_9]$. Then matrix multiplications may be applied to $c^0$, $c^1$, $c^2$, and $c^3$, respectively, as follows:

$$[e_0, e_8, e_7, e_{15}]^T = Y^0 \times (c^0)^T \quad (65)$$

$$[e_4, e_{12}, e_3, e_{11}]^T = Y^1 \times (c^1)^T \quad (66)$$

$$[e_2, e_{10}, e_5, e_{13}]^T = Y^2 \times (c^2)^T \quad (67)$$

$$[e_6, e_{14}, e_1, e_9]^T = Y^3 \times (c^3)^T \quad (68)$$

The four outputting vectors in (65)-(68) may form vector e, $e = [e_0, e_1, e_2, \ldots, e_{15}]$, where e is the same as the outputting vector $[f_1, f_3, \ldots, f_{31}]$ in (55). In other words, with some re-ordering operations, the 16×16 matrix multiplication in (55) may be factorized into four 4×4 matrix multiplications as from equations (65) to (68). In equations (65) to (68), $Y^0$, $Y^1$, $Y^2$, and $Y^3$, may be defined in (69)-(72), respectively, as follows:

$$Y^0 = \begin{bmatrix} e1 & f1 & g1 & h1 \\ j1 & k1 & -m1 & n1 \\ -n1 & -m1 & -k1 & j1 \\ -h1 & g1 & -f1 & e1 \end{bmatrix} \quad (69)$$

$$Y^1 = \begin{bmatrix} e2 & f2 & g2 & h2 \\ -j2 & k2 & m2 & -n2 \\ -n2 & -m2 & k2 & j2 \\ h2 & -g2 & f2 & -e2 \end{bmatrix} \quad (70)$$

$$Y^2 = \begin{bmatrix} e3 & f3 & g3 & h3 \\ j3 & k3 & -m3 & n3 \\ -n3 & -m3 & k3 & j3 \\ -h3 & g3 & -f3 & e3 \end{bmatrix} \quad (71)$$

$$Y^3 = \begin{bmatrix} e4 & f4 & g4 & -h4 \\ -j4 & k4 & m4 & -n4 \\ -n4 & -m4 & k4 & j4 \\ -h4 & -g4 & f4 & -e4 \end{bmatrix} \quad (72)$$

Example values for the parameter sets are shown in Tables III-VI below.

TABLE III

| Embodiments for {e1, f1, g1, h1, j1, k1, m1, n1} | | | | | | | |
|---|---|---|---|---|---|---|---|
| e1 | f1 | g1 | h1 | j1 | k1 | m1 | n1 |
| 1 | 5 | 31 | 32 | 23 | 19 | 25 | 21 |
| 2 | 5 | 31 | 31 | 23 | 19 | 25 | 21 |
| 2 | 5 | 31 | 32 | 23 | 19 | 25 | 21 |
| 1 | 5 | 31 | 32 | 23 | 19 | 26 | 21 |
| 2 | 5 | 31 | 31 | 23 | 19 | 26 | 21 |
| 2 | 5 | 31 | 32 | 23 | 19 | 26 | 21 |
| 1 | 5 | 31 | 32 | 24 | 19 | 25 | 21 |
| 2 | 5 | 31 | 31 | 24 | 19 | 25 | 21 |
| 2 | 5 | 31 | 32 | 24 | 19 | 25 | 21 |

TABLE IV

Embodiments for {e2, f2, g2, h2, j2, k2, m2, n2}

| e2 | f2 | g2 | h2 | j2 | k2 | m2 | n2 |
|----|----|----|----|----|----|----|----|
| 31 | 13 | 29 | 8  | 16 | 30 | 10 | 27 |
| 31 | 14 | 28 | 8  | 16 | 30 | 10 | 27 |
| 30 | 14 | 29 | 8  | 16 | 30 | 11 | 27 |
| 31 | 13 | 28 | 8  | 16 | 30 | 11 | 27 |
| 31 | 13 | 29 | 7  | 16 | 30 | 11 | 27 |
| 31 | 13 | 29 | 8  | 16 | 30 | 11 | 27 |
| 31 | 14 | 28 | 7  | 16 | 30 | 11 | 27 |
| 31 | 14 | 28 | 8  | 16 | 30 | 11 | 27 |
| 31 | 13 | 29 | 8  | 17 | 30 | 11 | 27 |

TABLE V

Embodiments for {e3, f3, g3, h3, j3, k3, m3, n3}

| e3 | f3 | g3 | h3 | j3 | k3 | m3 | n3 |
|----|----|----|----|----|----|----|----|
| 8  | 21 | 23 | 31 | 27 | 1  | 31 | 16 |
| 8  | 21 | 24 | 31 | 27 | 1  | 31 | 16 |
| 8  | 21 | 23 | 30 | 27 | 1  | 32 | 16 |
| 8  | 21 | 23 | 31 | 27 | 1  | 32 | 16 |
| 8  | 21 | 24 | 31 | 27 | 1  | 32 | 16 |
| 8  | 22 | 23 | 31 | 27 | 1  | 32 | 16 |
| 8  | 21 | 23 | 31 | 27 | 2  | 31 | 16 |
| 8  | 21 | 24 | 31 | 27 | 2  | 31 | 16 |
| 7  | 21 | 23 | 31 | 27 | 2  | 32 | 16 |
| 8  | 21 | 23 | 30 | 27 | 2  | 32 | 16 |
| 8  | 21 | 23 | 31 | 27 | 2  | 32 | 16 |
| 8  | 21 | 24 | 31 | 27 | 2  | 32 | 16 |
| 8  | 22 | 23 | 31 | 27 | 2  | 32 | 16 |

TABLE VI

Embodiments for {e4, f4, g4, h4, j4, k4, m4, n4}

| e4 | f4 | g4 | h4 | j4 | k4 | m4 | n4 |
|----|----|----|----|----|----|----|----|
| 30 | 19 | 25 | 11 | 28 | 31 | 5  | 13 |
| 30 | 19 | 25 | 11 | 28 | 31 | 5  | 14 |
| 30 | 19 | 25 | 11 | 29 | 31 | 4  | 13 |
| 30 | 19 | 25 | 11 | 29 | 31 | 4  | 14 |
| 30 | 19 | 25 | 10 | 29 | 31 | 5  | 13 |
| 30 | 19 | 25 | 11 | 29 | 31 | 5  | 13 |
| 30 | 19 | 25 | 10 | 29 | 31 | 5  | 14 |
| 30 | 19 | 25 | 11 | 29 | 31 | 5  | 14 |

As part of the inverse transform, the operations in (56) can be decomposed in the similar way.

As an example, first, consider $[f_1, f_3, \ldots, f_{31}]$ in (56) as a vector g, $g=[g_0, g_1, \ldots g_{15}]$. The elements in g are grouped into four vectors, $g^0=[g_0, g_8, g_7, g_{15}]$, $g^1=[g_4, g_{12}, g_3, g_{11}]$, $g^2=[g_2, g_{10}, g_5, g_{13}]$, and $g^3=[g_6, g_{14}, g_1, g_9]$. Then apply matrix multiplications to $g^0$, $g^1$, $g^2$, and $g^3$, respectively, as shown in (73)-(76).

$$[d_0, d_1, d_{14}, d_{15}]^T = (Y^0)^T \times (g^0)^T \quad (73)$$

$$[d_2, d_3, d_{12}, d_{13}]^T = (Y^1)^T \times (g^1)^T \quad (74)$$

$$[d_4, d_5, d_{10}, d_{11}]^T = (Y^2)^T \times (g^2)^T \quad (75)$$

$$[d_6, d_7, d_8, d_9]^T = (Y^3)^T \times (Y^3)^T \times (g^3)^T \quad (76)$$

The four outputting vectors in (73)-(76) may form the outputting vector d in (56), $d=[d_0, d_1, d_2, \ldots, d_{15}]$. In other words, with some re-ordering operations, the 16×16 matrix multiplication in (56) may be factorized into four 4×4 matrix multiplications as from (73) to (76).

Example Forward and Inverse Transform Operation

The input to forward transform may be a prediction residual block, denoted as $X_{M \times N}$. To perform a 2-D forward transform on $X_{M \times N}$, the M rows and N columns in $X_{M \times N}$ are transformed in each dimension sequentially, which are known as the horizontal and vertical forward transforms, respectively. Either the horizontal or vertical forward transform may be formed first.

If the horizontal forward transform is performed first, $X_{M \times N}$ may be right-multiplied by $T_N^T$ first (the superscript T means transposition) and right shifted with a proper number of bits in order to accommodate 16-bit arithmetic. The result $U_{M \times N}$, may be as follows:

$$U_{M \times N} = (X_{M \times N} \times T_N^T + f_{fwd,h}) >> (\log_2(N) + \log_2(T_N(0,0)) + \Delta BD - 7) \quad (77)$$

Note that ">>" means right shifting. The factor $f_{fwd,h}$ is for rounding, and may be in the range $[0, 2^{(\log_2(N)+\log_2(T_N(0,0))+\Delta BD-7)}]$. For simplicity of exposition, the $f_{fwd,h}$ may be equal to $2^{(\log_2(N)+\log_2(T_N(0,0))+\Delta BD-8)}$.

After the horizontal forward transform, a vertical forward transform may be performed on the intermediate block $U_{M \times N}$. The process of vertical forward transform may be as follows:

$$Y_{M \times N} = (T_M \times U_{M \times N} + f_{fwd,v}) >> (\log_2(M) + \log_2(T_N(0,0))) \quad (78)$$

where the factor $f_{fwd,v}$ may be in the range $[0, 2^{(\log_2(M)+\log_2(T_N(0,0)))}]$, and, for simplicity of exposition, may be equal to $2^{(\log_2(M)+\log_2(T_N(0,0))-1)}$.

If the vertical forward transform is performed first, $X_{M \times N}$ may be left-multiplied by $T_M$ first and right shifted with a proper number of bits in order to accommodate 16-bit arithmetic. The result $U_{M \times N}$, may be as follows:

$$U_{M \times N} = (T_M \times X_{M \times N} + f_{fwd,v}) >> (\log_2(M) + \log_2(T_N(0,0)) + \Delta BD - 7) \quad (79)$$

where the factor $f_{fwd,v}$ is for rounding, and may be in the range $[0, 2^{(\log_2(N)+\log_2(T_N(0,0))+\Delta BD-7)}]$. For simplicity of exposition herein, the $f_{fwd,v}$ may be equal to $2^{(\log_2(N)+\log_2(T_N(0,0))+\Delta BD-8)}$.

After the vertical forward transform, horizontal forward transform may be performed on the intermediate block $U_{M \times N}$. The process of horizontal forward transform may be as follows:

$$Y_{M \times N} = (U_{M \times N} \times T_N^T + f_{fwd,h}) >> (\log_2(N) + \log_2(T_N(0,0))) \quad (80)$$

where the factor $f_{fwd,h}$ may be in the range $[0, 2^{(\log_2(M)+\log_2(T_N(0,0)))}]$, and, for simplicity of exposition, may be equal to $2^{(\log_2(M)+\log_2(T_N(0,0))-1)}$.

The input to inverse transform is a dequantized block $Y'_{M \times N}$. To perform a 2-D inverse transform on $Y'_{M \times N}$, the M rows and N columns in $Y'_{M \times N}$ are transformed in a sequential manner, using the horizontal and vertical inverse transforms, respectively. Either horizontal or vertical inverse transform may be performed first.

If the horizontal inverse transform is performed first, $Y'_{M \times N}$ may be first right-multiplied by $T_N$ and right shifted with a proper number of bits in order to accommodate 16-bit arithmetic. The result $V_{M \times N}$ may be as follows:

$$V_{M \times N} = (Y'_{M \times N} \times T_N + f_{inv,h}) >> (\log_2(T_N(0,0)) + 1) \quad (81)$$

where the factor $f_{inv,h}$ may be in the range $[0, 2^{(\log_2(T_N(0,0))+1)}]$. For simplicity of exposition herein, the $f_{inv,h}$ may be equal to $2^{(\log_2(T_N(0,0)))}$.

After the horizontal inverse transform, vertical inverse transform may be performed on the intermediate block $V_{M \times N}$. The process of vertical inverse transform may be as follows $$X'_{M \times N} = (T_M^T \times V_{M \times N} + f_{inv,v}) >> (\log_2(T_N(0,0)) + 6 - \Delta BD) \quad (82)$$

where the factor $f_{inv,v}$ may be in the range [0, $2^{(log_2(T_N(0,0))+6-\Delta BD)}$], and, for simplicity of exposition, may be equal to $2^{(log_2(T_N(0,0))+5-\Delta BD)}$.

If the vertical inverse transform is performed first, $Y'_{M \times N}$ may be left-multiplied by $T_M{}^T$ first and right shifted with a proper number of bits in order to accommodate 16-bit arithmetic. The result $V_{M \times N}$ may be as follows:

$$V_{M \times N} = (T_M{}^T \times Y'_{M \times N} + f_{inv,v}) >> (log_2(T_N(0,0))+1) \quad (83)$$

where the factor $f_{inv,v}$ is for rounding, and may be in the range [0, $2^{(log_2(T_N(0,0))+1)}$]. For simplicity of exposition, the $f_{inv,v}$ may be equal to $2^{(log_2(T_N(0,0)))}$.

After the vertical inverse transform, horizontal inverse transform may be performed on the intermediate block $V_{M \times N}$. The process of horizontal inverse transform may be as follows:

$$X'_{M \times N}(V_{M \times N} \times T_N + f_{inv,h}) >> (log_2(T_N(0,0))+6-\Delta BD) \quad (83)$$

where the factor $f_{inv,h}$ may be in the range [0, $2^{(log_2(T_N(0,0))+6-\Delta BD)}$], and, for simplicity of exposition herein, may equal to $2^{(log_2(T_N(0,0))+5-\Delta BD)}$.

Example Communications Systems

Figure 8:
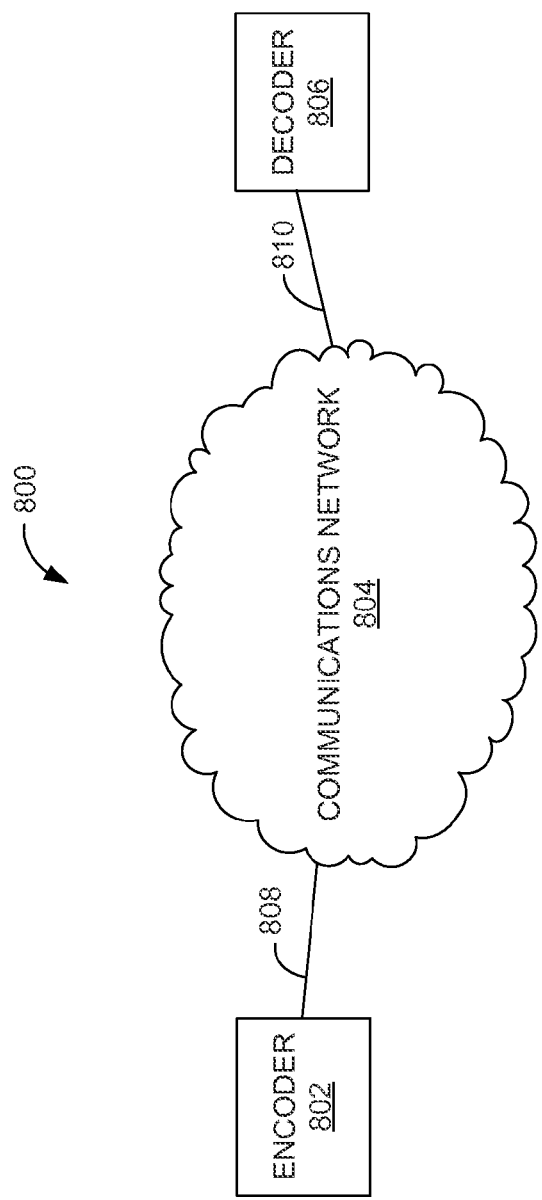
FIG. 8 illustrates a communication system in accordance with an non-limiting embodiment.

FIG. 8 illustrates a communication system 800 in accordance with one non-limiting embodiment. As illustrated, an encoder 802 may be in communication with a communications network 804 via a connection 808. The encoder 802 may utilize the elements and processing as provided herein. Further, the connection 808 may be a wireline connection or a wireless connection. A decoder 806 may also be in communication with the communications network 806 via a connection 97810. The decoder 806 may also utilize the elements and processing as provided herein. Further, the connection 810 may be a wireline connection or a wireless connection. The communications network 806 may be any suitable type of communication system, as provided in more detail below with respect to FIGS. 9A, 9B, 9C, 9D and 9E. The encoder 806 may be incorporated into any of a wide variety of terminals, such as, without limitation, digital televisions, wireless communication devices, wireless broadcast systems, personal digital assistants (PDAs), laptop or desktop computers, tablet computers, digital cameras, digital recording devices, video gaming devices, video game consoles, cellular or satellite radio telephones, digital media players, and the like.

Figure 9A:
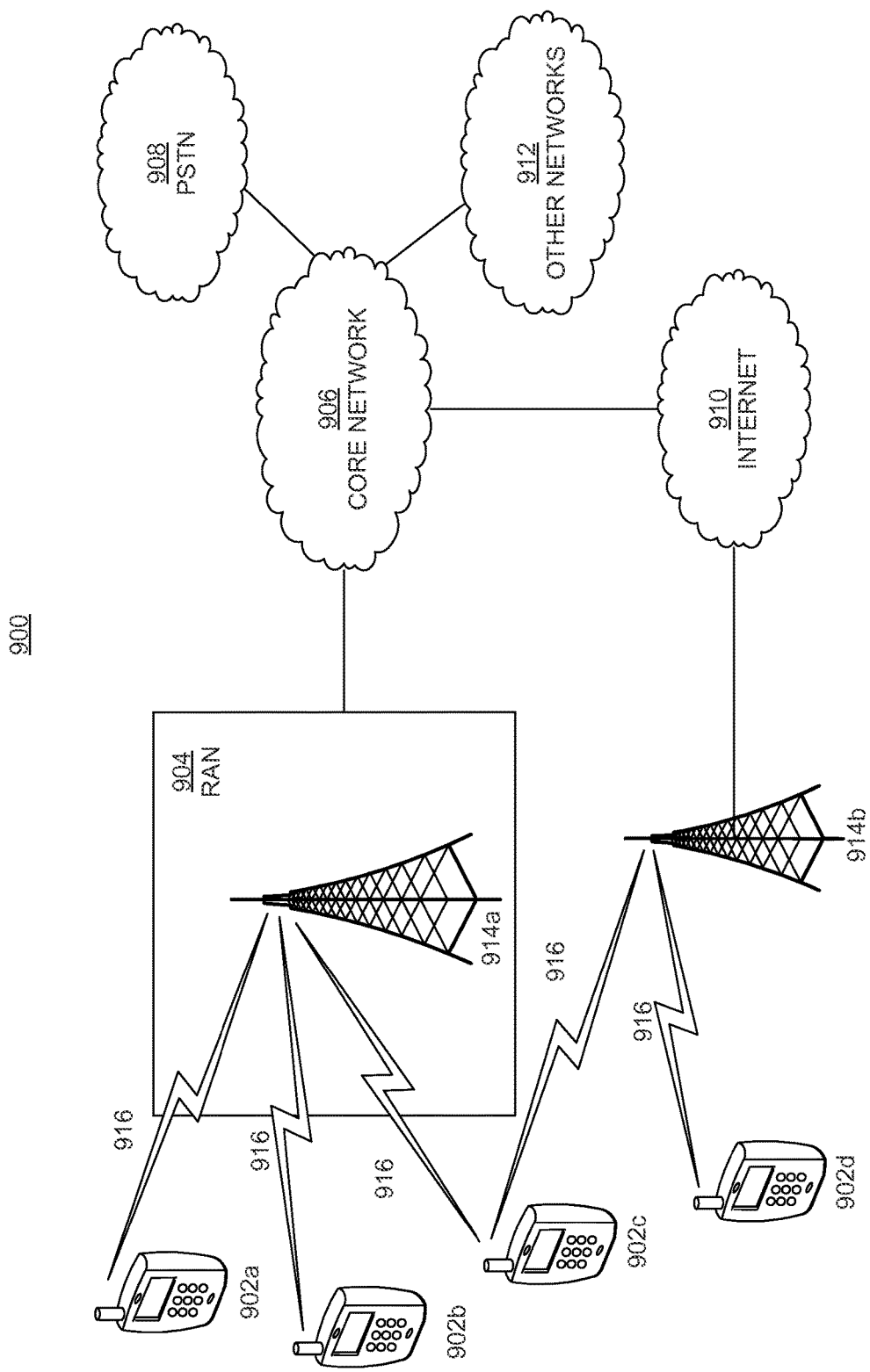
FIG. 9A is a system diagram of an example communications system in which one or more disclosed embodiments may be implemented.

FIG. 9A is a diagram of an example communications system 900 in which one or more disclosed embodiments may be implemented. The communications system 900 may be a multiple access system that provides content, such as voice, data, video, messaging, broadcast, etc., to multiple wireless users. The communications system 900 may enable multiple wireless users to access such content through the sharing of system resources, including wireless bandwidth. For example, the communications systems 900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 9A, the communications system 900 may include wireless transmit/receive units (WTRUs) 902a, 902b, 902c, 902d, a radio access network (RAN) 904, a core network 906, a public switched telephone network (PSTN) 908, the Internet 910, and other networks 912, though it will be appreciated that the disclosed embodiments contemplate any number of WTRUs, base stations, networks, and/or network elements. Each of the WTRUs 902a, 902b, 902c, 902d may be any type of device configured to operate and/or communicate in a wireless environment. By way of example, the WTRUs 902a, 902b, 902c, 902d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 900 may also include a base station 914a and a base station 914b. Each of the base stations 914a, 914b may be any type of device configured to wirelessly interface with at least one of the WTRUs 902a, 902b, 902c, 902d to facilitate access to one or more communication networks, such as the core network 906, the Internet 910, and/or the networks 912. By way of example, the base stations 914a, 914b may be a base transceiver station (BTS), a Node-B, an eNode B, a Home Node B, a Home eNode B, a site controller, an access point (AP), a wireless router, and the like. While the base stations 914a, 914b are each depicted as a single element, it will be appreciated that the base stations 914a, 914b may include any number of interconnected base stations and/or network elements.

The base station 914a may be part of the RAN 904, which may also include other base stations and/or network elements (not shown), such as a base station controller (BSC), a radio network controller (RNC), relay nodes, etc. The base station 914a and/or the base station 914b may be configured to transmit and/or receive wireless signals within a particular geographic region, which may be referred to as a cell (not shown). The cell may further be divided into cell sectors. For example, the cell associated with the base station 914a may be divided into three sectors. Thus, in one embodiment, the base station 914a may include three transceivers, i.e., one for each sector of the cell. In another embodiment, the base station 914a may employ multiple-input multiple output (MIMO) technology and, therefore, may utilize multiple transceivers for each sector of the cell.

The base stations 914a, 914b may communicate with one or more of the WTRUs 902a, 902b, 902c, 902d over an air interface 916, which may be any suitable wireless communication link (e.g., radio frequency (RF), microwave, infrared (IR), ultraviolet (UV), visible light, etc.). The air interface 916 may be established using any suitable radio access technology (RAT).

More specifically, as noted above, the communications system 900 may be a multiple access system and may employ one or more channel access schemes, such as CDMA, TDMA, FDMA, OFDMA, SC-FDMA, and the like. For example, the base station 914a in the RAN 904 and the WTRUs 902a, 902b, 902c may implement a radio technology such as Universal Mobile Telecommunications System (UMTS) Terrestrial Radio Access (UTRA), which may establish the air interface 916 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 914a and the WTRUs 902a, 902b, 902c may implement a radio technology such as Evolved UMTS Terrestrial Radio Access (E-UTRA), which may establish the air interface 916 using Long Term Evolution (LTE) and/or LTE-Advanced (LTE-A).

In other embodiments, the base station 914a and the WTRUs 902a, 902b, 902c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 914b in FIG. 9A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 914b and the WTRUs 902c, 902d may implement a radio technology such as IEEE 802.11 to establish a wireless local area network (WLAN). In another embodiment, the base station 914b and the WTRUs 902c, 902d may implement a radio technology such as IEEE 802.15 to establish a wireless personal area network (WPAN). In yet another embodiment, the base station 914b and the WTRUs 902c, 902d may utilize a cellular-based RAT (e.g., WCDMA, CDMA2000, GSM, LTE, LTE-A, etc.) to establish a picocell or femtocell. As shown in FIG. 9A, the base station 914b may have a direct connection to the Internet 910. Thus, the base station 914b may not be required to access the Internet 910 via the core network 906.

The RAN 904 may be in communication with the core network 906, which may be any type of network configured to provide voice, data, applications, and/or voice over internet protocol (VoIP) services to one or more of the WTRUs 902a, 902b, 902c, 902d. For example, the core network 906 may provide call control, billing services, mobile location-based services, pre-paid calling, Internet connectivity, video distribution, etc., and/or perform high-level security functions, such as user authentication. Although not shown in FIG. 9A, it will be appreciated that the RAN 904 and/or the core network 906 may be in direct or indirect communication with other RANs that employ the same RAT as the RAN 904 or a different RAT. For example, in addition to being connected to the RAN 904, which may be utilizing an E-UTRA radio technology, the core network 906 may also be in communication with another RAN (not shown) employing a GSM radio technology.

The core network 906 may also serve as a gateway for the WTRUs 902a, 902b, 902c, 902d to access the PSTN 908, the Internet 910, and/or other networks 912. The PSTN 908 may include circuit-switched telephone networks that provide plain old telephone service (POTS). The Internet 910 may include a global system of interconnected computer networks and devices that use common communication protocols, such as the transmission control protocol (TCP), user datagram protocol (UDP) and the internet protocol (IP) in the TCP/IP internet protocol suite. The networks 912 may include wired or wireless communications networks owned and/or operated by other service providers. For example, the networks 912 may include another core network connected to one or more RANs, which may employ the same RAT as the RAN 104 or a different RAT.

Some or all of the WTRUs 902a, 902b, 902c, 902d in the communications system 900 may include multi-mode capabilities, i.e., the WTRUs 902a, 902b, 902c, 902d may include multiple transceivers for communicating with different wireless networks over different wireless links. For example, the WTRU 902c shown in FIG. 9A may be configured to communicate with the base station 914a, which may employ a cellular-based radio technology, and with the base station 914b, which may employ an IEEE 802 radio technology.

Figure 9B:
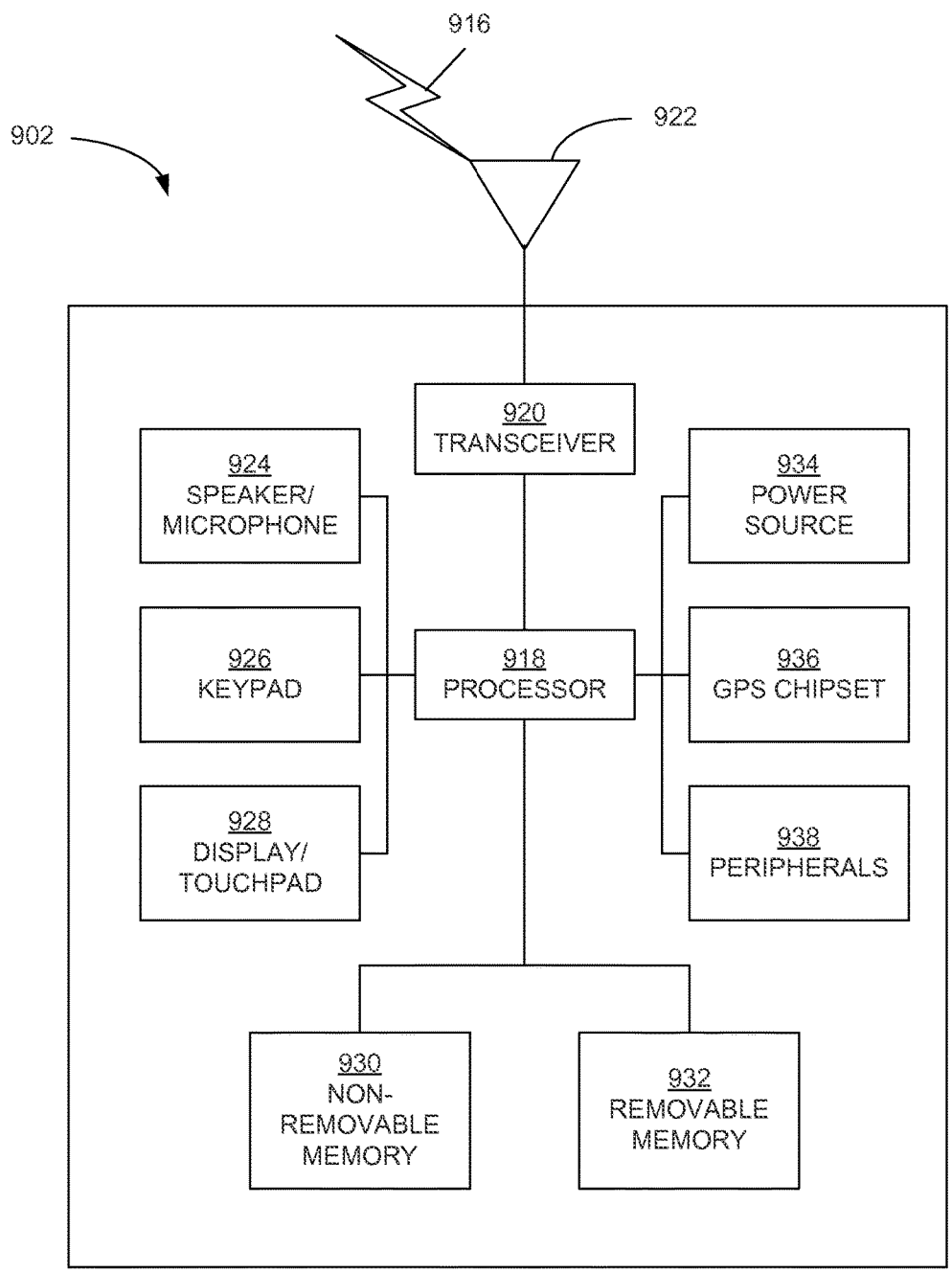
FIG. 9B is a system diagram of an example wireless transmit/receive unit (WTRU) that may be used within the communications system illustrated in FIG. 9A.

FIG. 9B is a system diagram of an example WTRU 902. As shown in FIG. 9B, the WTRU 902 may include a processor 918, a transceiver 920, a transmit/receive element 922, a speaker/microphone 924, a keypad 926, a display/touchpad 928, non-removable memory 906, removable memory 932, a power source 934, a global positioning system (GPS) chipset 936, and other peripherals 938. It will be appreciated that the WTRU 902 may include any sub-combination of the foregoing elements while remaining consistent with an embodiment.

The processor 918 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the WTRU 902 to operate in a wireless environment. The processor 918 may be coupled to the transceiver 920, which may be coupled to the transmit/receive element 922. While FIG. 9B depicts the processor 918 and the transceiver 920 as separate components, it will be appreciated that the processor 918 and the transceiver 920 may be integrated together in an electronic package or chip.

The transmit/receive element 922 may be configured to transmit signals to, or receive signals from, a base station (e.g., the base station 914a) over the air interface 916. For example, in one embodiment, the transmit/receive element 922 may be an antenna configured to transmit and/or receive RF signals. In another embodiment, the transmit/receive element 922 may be an emitter/detector configured to transmit and/or receive IR, UV, or visible light signals, for example. In yet another embodiment, the transmit/receive element 922 may be configured to transmit and receive both RF and light signals. It will be appreciated that the transmit/receive element 922 may be configured to transmit and/or receive any combination of wireless signals.

In addition, although the transmit/receive element 922 is depicted in FIG. 9B as a single element, the WTRU 902 may include any number of transmit/receive elements 922. More specifically, the WTRU 902 may employ MIMO technology. Thus, in one embodiment, the WTRU 902 may include two or more transmit/receive elements 922 (e.g., multiple antennas) for transmitting and receiving wireless signals over the air interface 916.

The transceiver 920 may be configured to modulate the signals that are to be transmitted by the transmit/receive element 922 and to demodulate the signals that are received by the transmit/receive element 922. As noted above, the WTRU 902 may have multi-mode capabilities. Thus, the transceiver 920 may include multiple transceivers for enabling the WTRU 902 to communicate via multiple RATs, such as UTRA and IEEE 802.11, for example.

The processor 918 of the WTRU 902 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 906 and/or the removable memory 932. The non-removable memory 906 may include random-access memory (RAM), read-only memory (ROM), a hard disk, or any other type of memory storage device. The removable memory 932 may include a subscriber identity module (SIM) card, a memory stick, a secure digital (SD) memory card, and the like. In other embodiments, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. For example, the power source 934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 918 may also be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 916 from a base station (e.g., base stations 914a, 914b) and/or determine its location based on the timing of the signals being received from two or more nearby base stations. It will be appreciated that the WTRU 902 may acquire location information by way of any suitable location-determination method while remaining consistent with an embodiment.

The processor 918 may further be coupled to other peripherals 938, which may include one or more software and/or hardware modules that provide additional features, functionality and/or wired or wireless connectivity. For example, the peripherals 938 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 9C:
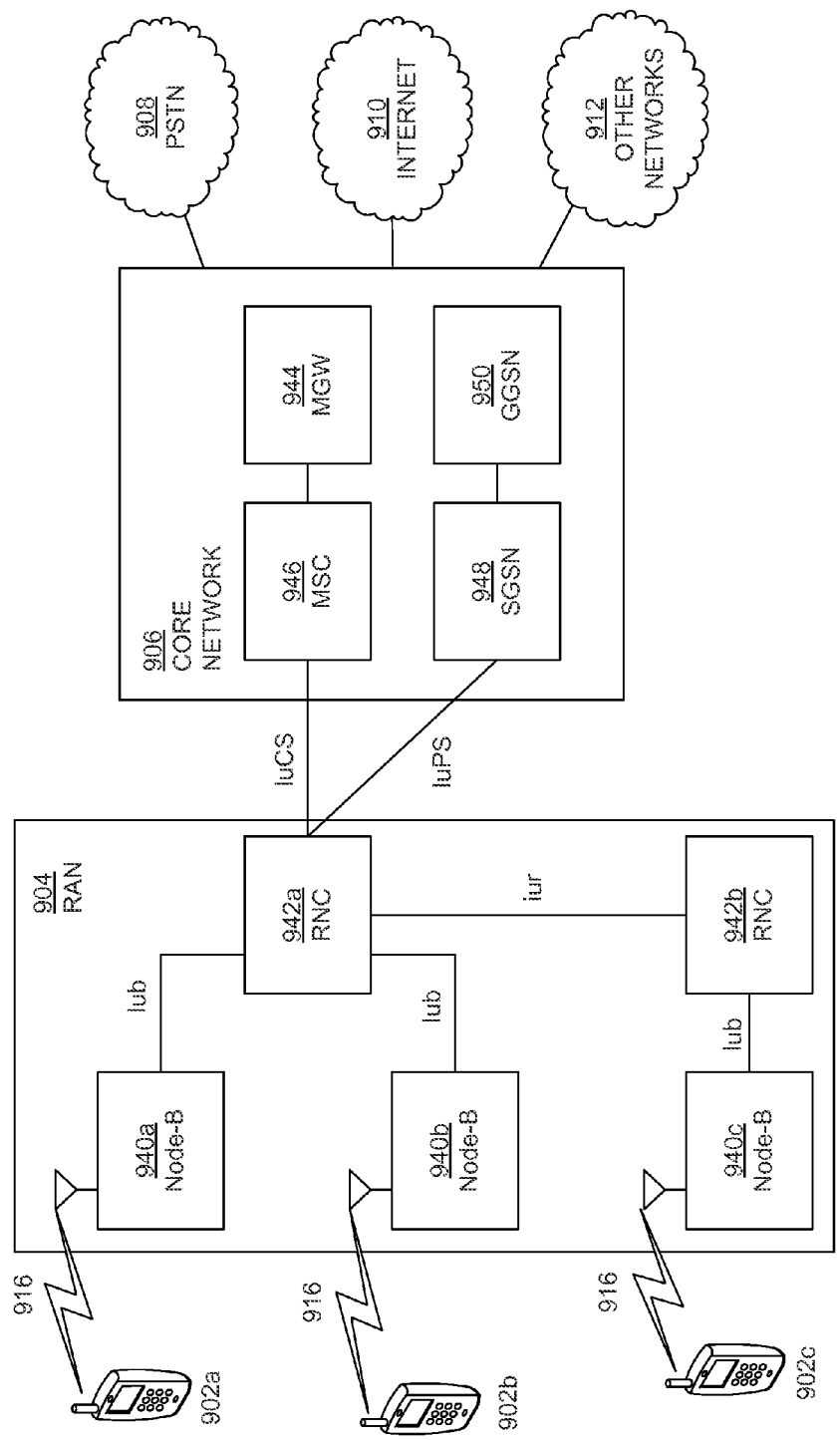
FIGS. 9C, 9D, and 9E are system diagrams of example radio access networks and example core networks that may be used within the communications system illustrated in FIG. 9A.

FIG. 9C is a system diagram of the RAN 904 and the core network 906 according to an embodiment. As noted above, the RAN 904 may employ a UTRA radio technology to communicate with the WTRUs 902a, 902b, 902c over the air interface 916. The RAN 904 may also be in communication with the core network 906. As shown in FIG. 9C, the RAN 904 may include Node-Bs 940a, 940b, 940c, which may each include one or more transceivers for communicating with the WTRUs 902a, 902b, 902c over the air interface 916. The Node-Bs 940a, 940b, 940c may each be associated with a particular cell (not shown) within the RAN 904. The RAN 904 may also include RNCs 942a, 942b. It will be appreciated that the RAN 904 may include any number of Node-Bs and RNCs while remaining consistent with an embodiment.

As shown in FIG. 9C, the Node-Bs 940a, 940b may be in communication with the RNC 942a. Additionally, the Node-B 940c may be in communication with the RNC 942b. The Node-Bs 940a, 940b, 940c may communicate with the respective RNCs 942a, 942b via an Iub interface. The RNCs 942a, 942b may be in communication with one another via an Iur interface. Each of the RNCs 942a, 942b may be configured to control the respective Node-Bs 940a, 940b, 940c to which it is connected. In addition, each of the RNCs 942a, 942b may be configured to carry out or support other functionality, such as outer loop power control, load control, admission control, packet scheduling, handover control, macrodiversity, security functions, data encryption, and the like.

The core network 906 shown in FIG. 9C may include a media gateway (MGW) 944, a mobile switching center (MSC) 946, a serving GPRS support node (SGSN) 948, and/or a gateway GPRS support node (GGSN) 950. While each of the foregoing elements are depicted as part of the core network 906, it will be appreciated that any one of these elements may be owned and/or operated by an entity other than the core network operator.

The RNC 942a in the RAN 904 may be connected to the MSC 946 in the core network 906 via an IuCS interface. The MSC 946 may be connected to the MGW 944. The MSC 946 and the MGW 944 may provide the WTRUs 902a, 902b, 902c with access to circuit-switched networks, such as the PSTN 908, to facilitate communications between the WTRUs 902a, 902b, 902c and traditional land-line communications devices.

The RNC 942a in the RAN 904 may also be connected to the SGSN 948 in the core network 906 via an IuPS interface. The SGSN 948 may be connected to the GGSN 950. The SGSN 948 and the GGSN 950 may provide the WTRUs 902a, 902b, 902c with access to packet-switched networks, such as the Internet 910, to facilitate communications between and the WTRUs 902a, 902b, 902c and IP-enabled devices.

As noted above, the core network 906 may also be connected to the networks 912, which may include other wired or wireless networks that are owned and/or operated by other service providers.

Figure 9D:
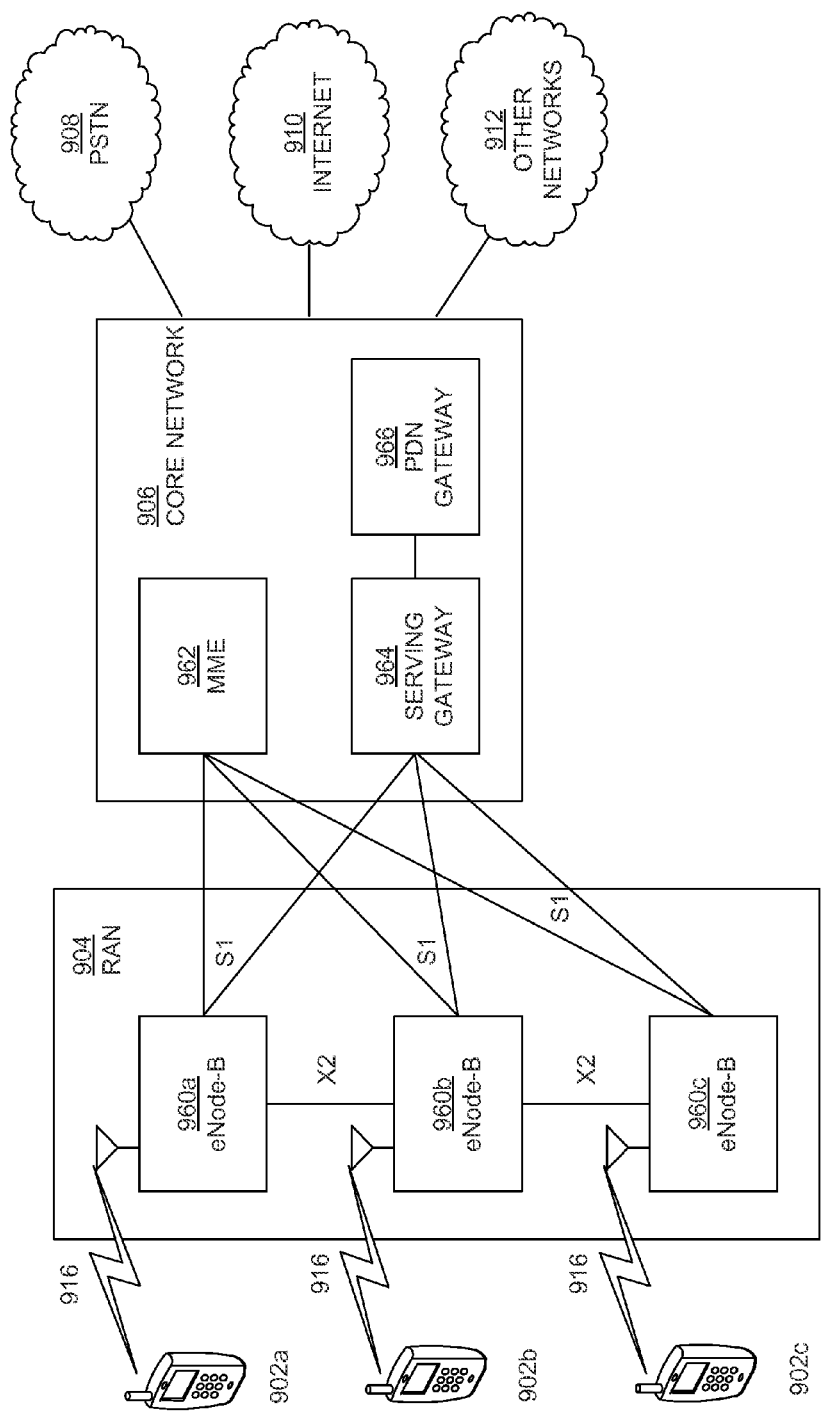

FIG. 9D is a system diagram of the RAN 904 and the core network 906 according to another embodiment. As noted above, the RAN 904 may employ an E-UTRA radio technology to communicate with the WTRUs 902a, 902b, 902c over the air interface 916. The RAN 904 may also be in communication with the core network 906.

The RAN 904 may include eNode-Bs 960a, 960b, 960c, though it will be appreciated that the RAN 904 may include any number of eNode-Bs while remaining consistent with an embodiment. The eNode-Bs 960a, 960b, 960c may each include one or more transceivers for communicating with the WTRUs 902a, 902b, 902c over the air interface 916. In one embodiment, the eNode-Bs 960a, 960b, 960c may implement MIMO technology. Thus, the eNode-B 960a, for example, may use multiple antennas to transmit wireless signals to, and receive wireless signals from, the WTRU 902a.

Each of the eNode-Bs 960a, 960b, 960c may be associated with a particular cell (not shown) and may be configured to handle radio resource management decisions, handover decisions, scheduling of users in the uplink and/or downlink, and the like. As shown in FIG. 9D, the eNode-Bs 960a, 960b, 960c may communicate with one another over an X2 interface.

The core network 906 shown in FIG. 9D may include a mobility management gateway (MME) 962, a serving gateway 964, and a packet data network (PDN) gateway 966. While each of the foregoing elements are depicted as part of the core network 906, it will be appreciated that any one of these elements may be owned and/or operated by an entity other than the core network operator.

The MME 962 may be connected to each of the eNode-Bs 960a, 960b, 960c in the RAN 904 via an S1 interface and may serve as a control node. For example, the MME 962 may be responsible for authenticating users of the WTRUs 902a, 902b, 902c, bearer activation/deactivation, selecting a particular serving gateway during an initial attach of the WTRUs 902a, 902b, 902c, and the like. The MME 962 may also provide a control plane function for switching between the RAN 904 and other RANs (not shown) that employ other radio technologies, such as GSM or WCDMA.

The serving gateway 964 may be connected to each of the eNode Bs 960a, 960b, 960c in the RAN 904 via the S1 interface. The serving gateway 964 may generally route and forward user data packets to/from the WTRUs 902a, 902b, 902c. The serving gateway 964 may also perform other functions, such as anchoring user planes during inter-eNode B handovers, triggering paging when downlink data is available for the WTRUs 902a, 902b, 902c, managing and storing contexts of the WTRUs 902a, 902b, 902c, and the like.

The serving gateway 964 may also be connected to the PDN gateway 966, which may provide the WTRUs 902a, 902b, 902c with access to packet-switched networks, such as the Internet 910, to facilitate communications between the WTRUs 902a, 902b, 902c and IP-enabled devices.

The core network 906 may facilitate communications with other networks. For example, the core network 906 may provide the WTRUs 902a, 902b, 102c with access to circuit-switched networks, such as the PSTN 908, to facilitate communications between the WTRUs 902a, 902b, 902c and traditional land-line communications devices. For example, the core network 906 may include, or may communicate with, an IP gateway (e.g., an IP multimedia subsystem (IMS) server) that serves as an interface between the core network 906 and the PSTN 908. In addition, the core network 906 may provide the WTRUs 902a, 902b, 902c with access to the networks 912, which may include other wired or wireless networks that are owned and/or operated by other service providers.

Figure 9E:
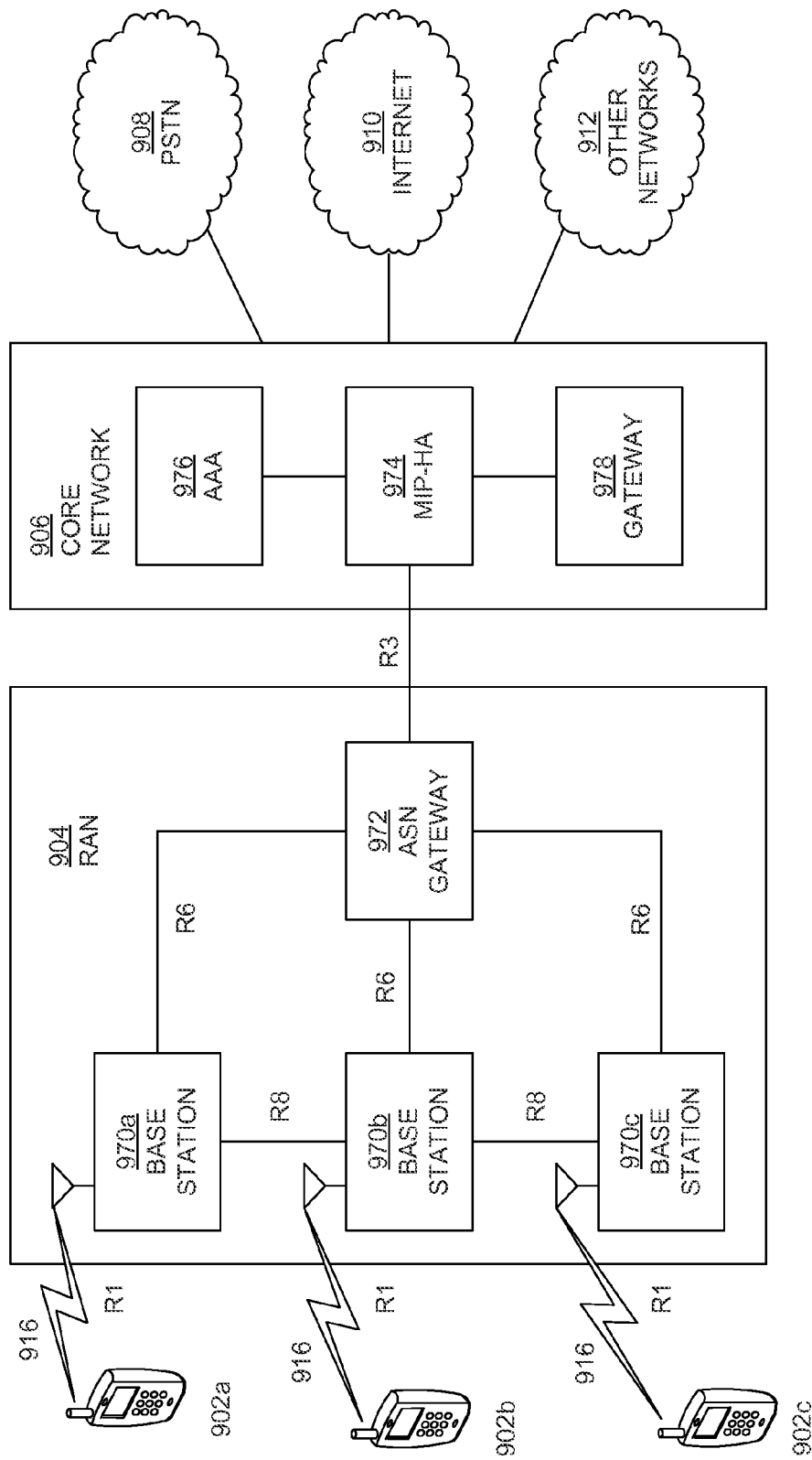

FIG. 9E is a system diagram of the RAN 904 and the core network 906 according to another embodiment. The RAN 904 may be an access service network (ASN) that employs IEEE 802.16 radio technology to communicate with the WTRUs 902a, 902b, 902c over the air interface 916. As will be further discussed below, the communication links between the different functional entities of the WTRUs 902a, 902b, 902c, the RAN 904, and the core network 906 may be defined as reference points.

As shown in FIG. 9E, the RAN 904 may include base stations 970a, 970b, 970c, and an ASN gateway 972, though it will be appreciated that the RAN 904 may include any number of base stations and ASN gateways while remaining consistent with an embodiment. The base stations 970a, 970b, 970c may each be associated with a particular cell (not shown) in the RAN 904 and may each include one or more transceivers for communicating with the WTRUs 902a, 902b, 902c over the air interface 916. In one embodiment, the base stations 970a, 970b, 970c may implement MIMO technology. Thus, the base station 970a, for example, may use multiple antennas to transmit wireless signals to, and receive wireless signals from, the WTRU 902a. The base stations 970a, 970b, 970c may also provide mobility management functions, such as handoff triggering, tunnel establishment, radio resource management, traffic classification, quality of service (QoS) policy enforcement, and the like. The ASN gateway 972 may serve as a traffic aggregation point and may be responsible for paging, caching of subscriber profiles, routing to the core network 906, and the like.

The air interface 916 between the WTRUs 902a, 902b, 902c and the RAN 904 may be defined as an R1 reference point that implements the IEEE 802.16 specification. In addition, each of the WTRUs 902a, 902b, 902c may establish a logical interface (not shown) with the core network 906. The logical interface between the WTRUs 902a, 902b, 902c and the core network 906 may be defined as an R2 reference point, which may be used for authentication, authorization, IP host configuration management, and/or mobility management.

The communication link between each of the base stations 970a, 970b, 970c may be defined as an R8 reference point that includes protocols for facilitating WTRU handovers and the transfer of data between base stations. The communication link between the base stations 970a, 970b, 970c and the ASN gateway 972 may be defined as an R6 reference point. The R6 reference point may include protocols for facilitating mobility management based on mobility events associated with each of the WTRUs 902a, 902b, 902c.

As shown in FIG. 9E, the RAN 904 may be connected to the core network 906. The communication link between the RAN 104 and the core network 906 may defined as an R3 reference point that includes protocols for facilitating data transfer and mobility management capabilities, for example. The core network 906 may include a mobile IP home agent (MIP-HA) 974, an authentication, authorization, accounting (AAA) server 976, and a gateway 978. While each of the foregoing elements are depicted as part of the core network 906, it will be appreciated that any one of these elements may be owned and/or operated by an entity other than the core network operator.

The MIP-HA 974 may be responsible for IP address management, and may enable the WTRUs 902a, 902b, 902c to roam between different ASNs and/or different core networks. The MIP-HA 974 may provide the WTRUs 902a, 902b, 902c with access to packet-switched networks, such as the Internet 910, to facilitate communications between the WTRUs 902a, 902b, 902c and IP-enabled devices. The AAA server 976 may be responsible for user authentication and for supporting user services. The gateway 978 may facilitate interworking with other networks. For example, the gateway 978 may provide the WTRUs 902a, 902b, 902c with access to circuit-switched networks, such as the PSTN 908, to facilitate communications between the WTRUs 902a, 902b, 902c and traditional land-line communications devices. In addition, the gateway 978 may provide the WTRUs 902a, 902b, 902c with access to the networks 912, which may include other wired or wireless networks that are owned and/or operated by other service providers.

Although not shown in FIG. 9E, it will be appreciated that the RAN 904 may be connected to other ASNs and the core network 906 may be connected to other core networks. The communication link between the RAN 904 the other ASNs may be defined as an R4 reference point, which may include protocols for coordinating the mobility of the WTRUs 902a, 902b, 902c between the RAN 904 and the other ASNs. The communication link between the core network 906 and the other core networks may be defined as an R5 reference, which may include protocols for facilitating interworking between home core networks and visited core networks.

Embodiments

Various embodiments of the methods, apparatuses and systems for integer transforms, and/or integer transform operations, for transforming data (e.g., residual video data) are provided below. In an embodiment ("first embodiment"), an apparatus may include a processor and memory. The memory may include a set of transform matrices and instructions executable by the processor for transforming data (e.g., residual video data) using any of the set of transform matrices. Each transform matrix of the set of transform matrices is orthogonal and has a different number of elements. Each element of the respective number of elements is an integer. Differences among norms of basis vectors of each transform matrix satisfy a given threshold, and the basis vectors approximate corresponding basis vectors of a discrete cosine transform (DCT) matrix.

In an embodiment ("second embodiment"), each transform matrix of the set of transform matrices may be approximately orthogonal, have a different number of elements and be fully factorizable. Each element of the respective number of elements is an integer. The differences among norms of basis vectors of each transform matrix may satisfy a given threshold, and the basis vectors may approximate corresponding basis vectors of the DCT matrix.

In an embodiment, such as the first embodiment and/or the second embodiment, the given threshold may be a threshold which, when satisfied, indicates the differences among the norms of the basis vectors are insignificant (e.g., within a certain degree of precision).

In an embodiment, such as the first embodiment and/or the second embodiment, the given threshold may be a threshold which, when satisfied, indicates the norms of the basis vectors are approximately equal.

In an embodiment, such as the first embodiment, the second embodiment and/or any subsequently-provided preceding embodiment ("intervening embodiment"), the basis vectors may approximate corresponding basis vectors of a discrete cosine transform (DCT) matrix in accordance with a measure of distortion (e.g., in accordance with a measure of distortion satisfying a pre-defined threshold).

In an embodiment, such as the first embodiment, the second embodiment and/or any intervening embodiment, the measure of distortion may be based on the DCT matrix.

In an embodiment, such as the first embodiment, the second embodiment and/or any intervening embodiment, the measure of distortion may be based on at least a portion of the basis vectors and the corresponding basis vectors of the DCT matrix.

In an embodiment, such as the first embodiment, the second embodiment and/or any intervening embodiment, the measure of distortion may be defined at least in part by equations (3) and (4), where $DCT_N$ is the DCT matrix with N×N elements, S is a set of basis vectors of a selected transform matrix of the set of transform matrices, $ICT_N$ is the selected transform matrix with N×N elements and with each basis vector thereof being normalized, and wherein $DCT_N^T$ is a transpose matrix of $DCT_N$.

In an embodiment, such as the first embodiment, the second embodiment and/or any intervening embodiment, the set of basis vectors may include some or all of the basis vectors of the selected transform matrix.

In an embodiment, such as the first embodiment, the second embodiment and/or any intervening embodiment, each transform matrix of the set of transform matrices may be decomposable into an even part and an odd part.

In an embodiment, such as the first embodiment, the second embodiment and/or any intervening embodiment, each transform matrix of the set of transform matrices may include $2^N \times 2^N$ elements, and N may be a positive integer.

In an embodiment, such as the first embodiment, the second embodiment and/or any intervening embodiment, each of the even and odd parts may include $2^{N-1} \times 2^{N-1}$ elements.

In an embodiment, such as the first embodiment, the second embodiment and/or any intervening embodiment, the even part may be scaled by a factor M, and M may be a positive integer.

In an embodiment, such as in the first embodiment, the second embodiment and/or any intervening embodiment, transforming by the odd part may include a result of an application of order-$2^{N-2}$ transform to each subband resulting from one-layer wavelet decomposition.

In an embodiment, such as the first embodiment, the second embodiment and/or any intervening embodiment, the result may be scaled by a factor M, and M may be a positive integer.

In an embodiment, such as the first embodiment, the second embodiment and/or any intervening embodiment, the wavelet transform may be a Haar transform.

In an embodiment, such as the first embodiment, the second embodiment and/or any intervening embodiment, the memory may further include instructions executable by the processor to generate, and store in the memory, the set of transform matrices.

In an embodiment, such as the first embodiment, the second embodiment and/or any intervening embodiment, the apparatus may be any of a video encoder, video decoder, and a WTRU.

In an embodiment ("third embodiment"), a tangible computer readable storage medium may have stored thereon a set of transform matrices and instructions executable by a processor for transforming data (e.g., residual video data) using any of the set of transform matrices. Each transform matrix of the set of transform matrices may be orthogonal and may have a different number of elements. Each element of the respective number of elements is an integer. Differences among norms of basis vectors of each transform matrix may satisfy a given threshold, and the basis vectors may approximate corresponding basis vectors of the DCT matrix.

In an alternative third embodiment, each transform matrix of the set of transform matrices may be approximately orthogonal, have a different number of elements and be fully factorizable. Each element of the respective number of elements is an integer. The differences among norms of basis vectors of each transform matrix may satisfy a given threshold, and the basis vectors may approximate corresponding basis vectors of the DCT matrix.

In an embodiment, such as the third embodiment, the alternative third embodiment and/or any intervening embodiment, the given threshold may be a threshold which, when satisfied, indicates the differences among the norms of the basis vectors are insignificant (e.g., within a certain degree of precision).

In an embodiment, such as the third embodiment, the alternative third embodiment and/or any intervening embodiment, the given threshold may be a threshold which, when satisfied, indicates the norms of the basis vectors are approximately equal.

In an embodiment, such as the third embodiment, the alternative third embodiment and/or any intervening embodiment, the basis vectors may approximate corresponding basis vectors of a DCT matrix in accordance with a measure of distortion.

In an embodiment, such as the third embodiment, the alternative third embodiment and/or any intervening embodiment, the basis vectors may approximate corresponding basis vectors of a DCT matrix in accordance with a measure of distortion that satisfies a pre-defined threshold.

In an embodiment, such as the third embodiment, the alternative third embodiment and/or any intervening embodiment, the measure of distortion may be based on the DCT matrix.

In an embodiment, such as the third embodiment, the alternative third embodiment and/or any intervening embodiment, the measure of distortion may be based on at least a portion of the basis vectors and the corresponding basis vectors of the DCT matrix.

In an embodiment, such as the third embodiment, the alternative third embodiment and/or any intervening embodiment, the measure of distortion may be defined at least in part by equations (3) and (4), where $DCT_N$ is the DCT matrix with N×N elements, S is a set of basis vectors of a selected transform matrix of the set of transform matrices, $ICT_N$ is the selected transform matrix with N×N elements and with each basis vector thereof being normalized, and wherein $DCT_N^T$ is a transpose matrix of $DCT_N$.

In an embodiment, such as the third embodiment, the alternative third embodiment and/or any intervening embodiment, the set of basis vectors comprises some or all of the basis vectors of the selected transform matrix.

In an embodiment, such as the third embodiment, the alternative third embodiment and/or any intervening embodiment, each transform matrix of the set of transform matrices may be decomposable into an even part and an odd part.

In an embodiment, such as the third embodiment, the alternative third embodiment and/or any intervening embodiment, each transform matrix of the set of transform matrices may include $2^N \times 2^N$ elements, and wherein N is a positive integer.

In an embodiment, such as the third embodiment, the alternative third embodiment and/or any intervening embodiment, each transform matrix of the set of transform matrices may be decomposable into an even part and an odd part, and each of the even and odd parts comprises $2^{N-1} \times 2^{N-1}$ elements.

In an embodiment, such as the third embodiment, the alternative third embodiment and/or any intervening embodiment, the even part may be scaled by a factor M, and M may be a positive integer.

In an embodiment, such as the third embodiment, the alternative third embodiment and/or any intervening embodiment, transforming by the odd part may include a result of an application of order-$2^{N-2}$ transform to each subband resulting from one-layer wavelet decomposition.

In an embodiment, such as the third embodiment, the alternative third embodiment and/or any intervening embodiment, the result may be scaled by a factor M, and M may a positive integer.

In an embodiment, such as the third embodiment, the alternative third embodiment and/or any intervening embodiment, the wavelet transform may be a Haar transform.

In an embodiment, such as the third embodiment, the alternative third embodiment and/or any intervening embodiment, the tangible computer readable storage medium may have stored thereon instructions executable by a processor to generate the set of transform matrices.

In an embodiment ("fourth embodiment"), a method for forming a transform matrix of an order-N integer transform ("order-N transform matrix") for transforming residual video data may include forming an even part of an intermediary transform matrix using a lower-order transform matrix. The method may include obtaining a lower-order odd part of the lower-order transform matrix. The method may include forming an odd part of the intermediary transform matrix by processing each of a low frequency subband and a high frequency subband of a wavelet transform using the lower-order odd part of the lower-order transform matrix. The method may include applying the intermediary transform matrix to an even-odd combining matrix, as well.

In an embodiment, such as the fourth embodiment, obtaining the lower-order odd part may include decomposing the lower-order transform matrix into the lower-order odd part and a lower-order even part using an even-odd decomposition matrix.

In an embodiment, such as the fourth embodiment and/or any intervening embodiment, each basis vector of the order-N transform matrix may have a respective amount of zero crossings, and the method further include: re-ordering the basis vectors based on the amounts of zero crossings.

In an embodiment, such as the fourth embodiment and/or any intervening embodiment, re-ordering the basis vectors may include re-ordering the basis vectors by increasing amounts of zero crossings.

In an embodiment, such as the fourth embodiment and/or any intervening embodiment, the lower-order transform matrix may include transform coefficients determined empirically.

In an embodiment, such as the fourth embodiment and/or any intervening embodiment, the wavelet transform may be a Haar transform.

In an embodiment ("fifth embodiment"), an apparatus configured for forming a transform matrix of an order-N integer transform ("order-N transform matrix") for transforming residual video data may include a processor and memory. The memory may include instructions executable by the processor. The instructions may include instructions executable by the processor to (i) form an even part of an intermediary transform matrix using a lower-order transform matrix, (ii) obtain a lower-order odd part of the lower-order transform matrix, (iii) form an odd part of the intermediary transform matrix by processing each of a low frequency subband and a high frequency subband of a wavelet transform using the lower-order odd part of the lower-order transform matrix, and/or (iv) apply the intermediary transform matrix to an even-odd combining matrix.

In an embodiment, such as the fifth embodiment, the instructions executable by the processor to obtain the lower-order odd part may include instructions executable by the processor to decompose the lower-order transform matrix into the lower-order odd part and a lower-order even part using an even-odd decomposition matrix.

In an embodiment, such as the fifth embodiment and/or any intervening embodiment, each basis vector of the order-N transform matrix may have a respective amount of zero crossings, and the instructions may include instructions executable by the processor to re-order the basis vectors based on the amounts of zero crossings.

In an embodiment, such as the fifth embodiment and/or any intervening embodiment, the instructions executable by the processor to re-order the basis vectors may include instructions executable by the processor to re-order the basis vectors by increasing amounts of zero crossings.

In an embodiment, such as the fifth embodiment and/or any intervening embodiment, the lower-order transform matrix may include transform coefficients determined empirically.

In an embodiment, such as the fifth embodiment and/or any intervening embodiment, the wavelet transform may include a Haar transform.

In an embodiment ("sixth embodiment"), a method for forming an order-N integer transform matrix for transforming residual video data may include decomposing the order-N transform matrix into an even part and an odd part. The method may include decomposing the odd part into first and second subbands using a wavelet transform. The method may include processing each of the first and second subbands using a lower order-N/4 transform matrix.

In an embodiment, such as the sixth embodiment, the first and second subbands may be low and high frequency subbands, respectively.

In an embodiment, such as the sixth embodiment and/or the intervening embodiment, the wavelet transform may be a Haar transform.

In an embodiment ("seventh embodiment"), an apparatus configured for forming an order-N integer transform matrix for transforming residual video data may include a processor and memory. The memory may include instructions executable by the processor. The instructions may include instructions executable by the processor to (i) decompose the order-N transform matrix into an even part and an odd part, (ii) decompose the odd part into first and second subbands using a wavelet transform, and/or (iii) process each of the first and second subbands using a lower order-N/4 transform matrix.

In an embodiment, such as the seventh embodiment, the first and second subbands may be low and high frequency subbands, respectively.

In an embodiment ("eighth embodiment"), a method for processing residual video data using an order-N integer transform may include receiving, at a preconditioning unit, a vector of residual video data. The method may include processing the vector of residual video data at the preconditioning unit so as to form first and second intermediate output vectors for transform. The method may include receiving the first and second intermediate output vectors at first and second lower-order transform units, respectively. The method may include transforming the first intermediate output vector at the first lower-order transform unit so as to form even-indexed transform coefficients using basis vectors of an order-N/2 integer transform. The method may include transforming the second intermediate output vector at the second lower-order transform unit so as to form odd-indexed transform coefficients using an order-N/2 integer matrix based on an order-N/4 odd-part matrix.

In an embodiment, such as the eighth embodiment, processing the vector of residual video data at the preconditioning unit may include applying the vector of residual video data to an even-odd decomposition matrix for transform.

In an embodiment, such as the eighth embodiment and/or any intervening embodiment, transforming the first intermediate output vector at the first lower-order transform unit may include applying an even part of an intermediary transform matrix to the first intermediate output vector, and the even part of the intermediary transform matrix may include an order-N/2 integer transform matrix.

In an embodiment, such as the eighth embodiment and/or any intervening embodiment, transforming the second intermediate output vector at the second lower-order transform unit may include generating first and second subbands of the second intermediate output vector, and/or applying an order-N/4 odd-part matrix to each of the first and second subbands.

In an embodiment, such as the eighth embodiment and/or any intervening embodiment, the first and second subbands may be low and high frequency subbands, respectively.

In an embodiment ("ninth embodiment"), an apparatus configured for processing residual video data using an order-N integer transform may include a preconditioning unit, a first lower-order transform unit and a second lower-order transform unit. The preconditioning unit may be adapted to receive a vector of residual video data. The preconditioning unit may be adapted to process the vector of residual video data so as to form first and second intermediate output vectors for transform. The first and second lower-order transform units may be adapted to receive the first and second intermediate output vectors, respectively. The first lower-order transform unit may be adapted to transform the first intermediate output vector so as to form even-indexed transform coefficients using basis vectors of an order-N/2 integer transform. The second lower-order transform unit may be adapted to transform the second intermediate output vector so as to form odd-indexed transform coefficients using an order-N/2 integer matrix based on an order-N/4 odd-part matrix.

In an embodiment, such as the ninth embodiment, the preconditioning unit may be adapted to apply the vector of residual video data to an even-odd decomposition matrix for transform when forming the first and second intermediate output vectors for transform.

In an embodiment, such as the ninth embodiment and/or any intervening embodiment, the first lower-order transform unit may be adapted to apply an even part of an intermediary transform matrix to the first intermediate output vector when transforming the first intermediate output vector, and the even part of the intermediary transform matrix may include an order-N/2 integer transform matrix.

In an embodiment, such as the ninth embodiment and/or any intervening embodiment, the second lower-order transform unit may be adapted to generate first and second subbands of the second intermediate output vector and apply an order-N/4 odd-part matrix to each of the first and second subbands when transforming the second intermediate output vector.

In an embodiment, such as the ninth embodiment and/or any intervening embodiment, the first and second subbands may be low and high frequency subbands, respectively.

In an embodiment ("tenth embodiment"), a method for processing residual video data using an order-N integer transform may include receiving, at a preconditioning unit, a plurality of vectors of residual video data. The method may include processing the vectors at the preconditioning unit so as to form respective first and second intermediate output vectors for transform. The method may include receiving the first and second intermediate output vectors at first and second lower order units, respectively. The method may include transforming the first intermediate output vectors at the first lower-order transform unit so as to form a first set of even-indexed transform coefficients using basis vectors of an order-N/2 integer transform. The method may include transforming the second intermediate output vector at the second lower-order transform unit so as to form a first set of odd-indexed transform coefficients using an order-N/2 integer matrix based on an order-N/4 odd-part matrix. The method may include receiving, at the preconditioning unit, a plurality of vectors of a transform matrix formed from the first set of even-indexed transform coefficients and the first set of odd-indexed transform coefficients. The method may include processing the vectors at the preconditioning unit so as to form respective third and fourth intermediate output vectors for transform. The method may include receiving the third and fourth intermediate output vectors at first and second lower-order transform units, respectively. The method may include transforming the third intermediate output vectors at the first lower-order transform unit so as to form a second set of even-indexed transform coefficients using basis vectors of an order-N/2 integer transform. The method may include transforming the fourth intermediate output vector at the second lower-order transform unit so as to form a second set of odd-indexed transform coefficients using an order-N/2 integer matrix based on an order-N/4 odd-part matrix.

In an embodiment, such as the tenth embodiment, dividing the vector of residual video data at the preconditioning unit may include applying the vector of residual video data to an even-odd decomposition matrix for transform.

In an embodiment, such as the tenth embodiment and/or any intervening embodiment, transforming the first intermediate output vector at the first lower-order transform unit may include applying an even part of an intermediary transform matrix to the first intermediate output vector, and the even part of the intermediary transform matrix may include or be an order-N/2 integer transform.

In an embodiment, such as the tenth embodiment and/or any intervening embodiment, transforming the second lower-order intermediate output vector at the second transform unit may include generating first and second subbands of the second intermediate output vector, and/or applying an order-N/4 odd-part matrix to each of the first and second subbands.

In an embodiment, such as the tenth embodiment and/or any intervening embodiment, dividing the vectors at the preconditioning unit may include applying the basis vectors to an even-odd decomposition matrix for transform.

In an embodiment, such as the tenth embodiment and/or any intervening embodiment, transforming the third intermediate output vector at the first lower-order transform unit may include applying an even part of an intermediary transform matrix to the third intermediate output vector, and the even part of the intermediary transform matrix may include or be an order-N/2 integer transform.

In an embodiment, such as the tenth embodiment and/or any intervening embodiment, transforming the fourth intermediate output vector at the second lower-order transform unit may include generating first and second subbands of the second intermediate output vector, and/or applying an order-N/4 odd-part matrix to each of the first and second subbands.

In an embodiment, such as the tenth embodiment and/or any intervening embodiment, the first and second subbands may be low and high frequency subbands, respectively.

In an embodiment, such as the tenth embodiment and/or any intervening embodiment, any of the preconditioning unit, first lower-order transform unit and second lower-order transform unit is adapted to use 16 bit arithmetic for processing.

In an embodiment ("eleventh embodiment"), an apparatus for processing residual video data using an order-N integer transform may include a preconditioning unit, a first lower-order transform unit and a second lower-order transform unit. The preconditioning unit may be adapted to receive a plurality of vectors of residual video data. The preconditioning unit may be adapted to process the vectors so as to form respective first and second intermediate output vectors for transform. The first and second lower-order transform units may be adapted to receive the first and second intermediate output vectors, respectively. The first lower-order transform unit may be adapted to transform the first intermediate output vectors so as to form a first set of even-indexed transform coefficients using basis vectors of an order-N/2 integer transform. The second lower-order transform unit may be adapted to transform the second intermediate output vector so as to form a first set of odd-indexed transform coefficients using an order-N/2 integer matrix based on an order-N/4 odd-part matrix. The preconditioning unit may be adapted to receive a plurality of vectors of a transform matrix formed from the first set of even-indexed transform coefficients and the first set of odd-indexed transform coefficients. The preconditioning unit may be adapted to process the vectors so as to form respective third and fourth intermediate output vectors for transform. The first and second lower-order transform units may be adapted to receive the third and fourth intermediate output vectors, respectively. The first lower-order transform unit may be adapted to transform the third intermediate output vectors so as to form a second set of even-indexed transform coefficients using basis vectors of an order-N/2 integer transform. The second lower-order transform unit may be adapted to transform the fourth intermediate output vector so as to form a second set of odd-indexed transform coefficients using an order-N/2 integer matrix based on an order-N/4 odd-part matrix.

In an embodiment, such as the eleventh embodiment, the preconditioning unit may be adapted to apply the vector of residual video data to an even-odd decomposition matrix for transform when forming the first and second intermediate output vectors for transform.

In an embodiment, such as the eleventh embodiment and/or any intervening embodiment, the first lower-order transform unit may be adapted to apply an even part of an intermediary transform matrix to the first intermediate output vector when transforming the first intermediate output vector, and the even part of the intermediary transform matrix may include or be an order-N/2 integer transform.

In an embodiment, such as the eleventh embodiment and/or any intervening embodiment, the second lower-order transform unit may be adapted to generate first and second subbands of the second intermediate output vector and apply an order-N/4 odd-part matrix to each of the first and second subbands when transforming the second intermediate output vector.

In an embodiment, such as the eleventh embodiment and/or any intervening embodiment, the preconditioning unit may be adapted to apply the basis vectors to an even-odd decomposition matrix for transform when forming the third and fourth intermediate output vectors for transform.

In an embodiment, such as the eleventh embodiment and/or any intervening embodiment, the first lower-order transform unit may be adapted to apply an even part of an intermediary transform matrix to the third intermediate output vector when transforming the third intermediate output vector, and the even part of the intermediary transform matrix may include or be an order-N/2 integer transform.

In an embodiment, such as the eleventh embodiment and/or any intervening embodiment, the second lower-order transform unit may be adapted to generate first and second subbands of the second intermediate output vector, and apply an order-N/4 odd-part matrix to each of the first and second subbands when transforming the fourth intermediate output vector.

In an embodiment, such as the eleventh embodiment and/or any intervening embodiment, the first and second subbands may be low and high frequency subbands, respectively.

In an embodiment, such as the eleventh embodiment and/or any intervening embodiment, any of the preconditioning unit, first lower-order transform unit and second lower-order transform unit may be adapted to use 16 bit arithmetic for processing.

In an embodiment ("twelfth embodiment"), a method for processing residual video data using an order-N integer transform may include receiving, at a first preconditioning unit, a vector of residual video data and processing the vector of residual video data at the first preconditioning unit so as to form first and second intermediate output vectors for transform. The method may include receiving the first intermediate output vector at a first transform unit and transforming the first intermediate output vector at the first transform unit so as to form even-indexed transform coefficients using basis vectors of an order-N/2 integer even part transform matrix and an order-N/2 integer odd part matrix. The method may include receiving the second intermediate output vector at a second transform unit, and transforming the second intermediate output vector at the second transform unit so as to form odd-indexed transform coefficients by processing the second intermediate output vector through successive order-N/2 integer matrices. The order-N/2 integer matrices may, collectively, factorize the odd part of the order-N transform matrix.

In an embodiment, such as the twelfth embodiment, the successive order-N/2 integer matrices may be based on an order-N/4 odd-part matrix, and processing the second intermediate output vector through successive order-N/2 integer matrices may include generating first and second subbands of the second intermediate output vector; and/or applying the order-N/4 odd-part matrix to each of the first and second subbands.\

In an embodiment, such as the twelfth embodiment and/or any intervening embodiment, transforming the first intermediate output vector at the first transform unit may include applying an even part of an intermediary transform matrix to the first intermediate output vector, the even part of the intermediary transform matrix may include or be a lower-order transform matrix.

In an embodiment, such as the twelfth embodiment and/or any intervening embodiment, processing the vector of residual video data at the preconditioning unit may include applying the vector of residual video data to an even-odd decomposition matrix for transform.

In an embodiment, such as the twelfth embodiment and/or any intervening embodiment, the order-N integer transform may be an order-8 integer transform, and the successive order-N/2 integer matrices may include or be three successive order-4 integer matrices.

In an embodiment, such as the preceding embodiment, the first successive order-4 integer matrix may include even symmetry along one diagonal and odd another diagonal, the second successive order-4 integer matrix may include even symmetry along one diagonal and zero symmetry along another diagonal, and the third successive order-4 integer matrix may include even symmetry along one diagonal and odd another diagonal.

In an embodiment, such as the twelfth embodiment and/or any intervening embodiment, the order-N integer transform may be an order-16 integer transform, and the successive order-N/2 integer matrices may include or be four successive order-8 integer matrices.

In an embodiment, such as the preceding embodiment, the first successive order-8 integer matrix may include even symmetry along one diagonal and odd another diagonal, the second successive order-8 integer matrix may include even symmetry along one diagonal and zero symmetry along another diagonal, the third successive order-8 integer matrix may include even symmetry along one diagonal and zero symmetry along another diagonal and the fourth successive order-8 integer matrix may include even symmetry along one diagonal and odd another diagonal.

In an embodiment, such as the twelfth embodiment and/or any intervening embodiment, the order-N integer transform may be an order-8 integer transform, and processing the second intermediate output vector through successive order-N/2 integer matrices may include (i) processing the second intermediate output vector through a first order-4 integer matrix so as to form a first set of intermediary transform elements, (ii) processing the first set of intermediary transform elements through a second order-4 integer matrix so as to form a second set of intermediary transform elements, and/or processing the second set of intermediary transform elements through a third order-4 integer matrix so as to form the odd-indexed transform coefficients.

In an embodiment, such as the twelfth embodiment and/or any intervening embodiment, the order-N integer transform may be an order-16 integer transform, and processing the second intermediate output vector through successive order-N/2 integer matrices may include (i) processing the second intermediate output vector through a first order-8 integer matrix so as to form a first set of intermediary transform elements, (ii) processing the first set of intermediary transform elements through a second order-8 integer matrix so as to form a second set of intermediary transform elements, (iii) processing the second set of intermediary transform elements through a third order-8 integer matrix so as to form a third set of intermediary transform elements, and/or (iv) processing the third set of intermediary transform elements through a fourth order-8 integer matrix so as to form the odd-indexed transform coefficients.

In an embodiment, such as the twelfth embodiment and/or any intervening embodiment, the order-N integer transform may be an order-32 integer transform, and processing the second intermediate output vector through successive order-N/2 integer matrices may include (i) processing the second intermediate output vector through a first order-16 integer matrix so as to form a first set of intermediary transform elements, (ii) processing the first set of intermediary transform elements through a second order-16 integer matrix so as to form a second set of intermediary transform elements, (iii) processing the second set of intermediary transform elements through a third order-16 integer matrix so as to form a third set of intermediary transform elements, processing the third set of intermediary transform elements through a fourth order-16 integer matrix so as to decompose the third set of intermediary transform elements into four vectors for transform by respective order-4 integer matrices, and/or (iv) applying each of the four vectors to the by respective order-4 integer matrices so as to form the odd-indexed transform coefficients.

In an embodiment ("thirteenth embodiment"), an apparatus for processing residual video data using an order-N integer transform may include a preconditioning unit, a first transform unit, and a second transform unit. The preconditioning unit may be adapted to receive a vector of residual video data. The preconditioning unit may be adapted to process the vector of residual video data so as to form first and second intermediate output vectors for transform. The first transform unit may be adapted to receive the first intermediate output. The first transform unit may be adapted to transform the first intermediate output vector so as to form even-indexed transform coefficients using basis vectors of an order-N/2 integer even part transform matrix and an order-N/2 integer odd part matrix. The second transform unit may be adapted to receive the second intermediate output vector. The second transform unit may be adapted to transform the second intermediate output vector so as to form odd-indexed transform coefficients by processing the second intermediate output vector through successive order-N/2 integer matrices. The order-N/2 integer matrices may collectively factorize the odd part of order-N integer transform matrix.

In an embodiment, such as the thirteenth embodiment, the successive order-N/2 integer matrices may be based on an order-N/4 odd-part matrix, and the second transform unit may be adapted to generate first and second subbands of the second intermediate output vector and apply the order-N/4 odd-part matrix to each of the first and second subbands when processing the second intermediate output vector through successive order-N/2 integer matrices.

In an embodiment, such as the thirteenth embodiment and/or any intervening embodiment, the first transform unit may be adapted to apply an even part of an intermediary transform matrix to the first intermediate output vector when transforming the first intermediate output vector, and the even part of the intermediary transform matrix may include or be a lower-order transform matrix.

In an embodiment, such as the thirteenth embodiment and/or any intervening embodiment, the preconditioning unit may be adapted to apply the vector of residual video data to an even-odd decomposition matrix for transform when forming the first and second intermediate output vectors for transform.

In an embodiment, such as the thirteenth embodiment and/or any intervening embodiment, the first transform unit may be adapted to apply an even part of an intermediary transform matrix to the first intermediate output vector when transforming the first intermediate output vector, and the even part of the intermediary transform matrix may include or be a lower-order transform matrix.

In an embodiment, such as the thirteenth embodiment and/or any intervening embodiment, the order-N integer transform may be an order-8 integer transform, and the successive order-N/2 integer matrices may include or be three successive order-4 integer matrices.

In an embodiment, such as the preceding embodiment, the first successive order-4 integer matrix may include even symmetry along one diagonal and odd another diagonal, the second successive order-4 integer matrix may include even symmetry along one diagonal and zero symmetry along another diagonal, and the third successive order-4 integer matrix may include even symmetry along one diagonal and odd another diagonal.

In an embodiment, such as the thirteenth embodiment and/or any intervening embodiment, the order-N integer transform may be an order-16 integer transform, and the successive order-N/2 integer matrices may include or be four successive order-4 integer matrices.

In an embodiment, such as the thirteenth embodiment and/or any intervening embodiment, the first successive order-8 integer matrix may include even symmetry along one diagonal and odd another diagonal, the second successive order-8 integer matrix may include even symmetry along one diagonal and zero symmetry along another diagonal, the third successive order-8 integer matrix may include even symmetry along one diagonal and zero symmetry along another diagonal and the fourth successive order-8 integer matrix may include even symmetry along one diagonal and odd another diagonal.

In an embodiment, such as the thirteenth embodiment and/or any intervening embodiment, the order-N integer transform may be an order-16 integer transform, and the successive order-N/2 integer matrices may include or be four successive order-4 integer matrices.

In an embodiment, such as the preceding embodiment, the first successive order-4 integer matrix may include even symmetry along one diagonal and odd another diagonal, the second successive order-4 integer matrix may include even symmetry along one diagonal and zero symmetry along another diagonal, the third successive order-4 integer matrix may include even symmetry along one diagonal and zero symmetry along another diagonal and the fourth successive order-4 integer matrix may include even symmetry along one diagonal and odd another diagonal.

In an embodiment, such as the thirteenth embodiment and/or any intervening embodiment, the order-N integer transform may be an order-8 integer transform, and when processing the second intermediate output vector through successive order-N/2 integer matrices, the second transform unit may be adapted to (i) process the second intermediate output vector through a first order-4 integer matrix so as to form a first set of intermediary transform elements, (ii) process the first set of intermediary transform elements through a second order-4 integer matrix so as to form a second set of intermediary transform elements, and/or (iii) process the second set of intermediary transform elements through a third order-4 integer matrix so as to form the odd-indexed transform coefficients.

In an embodiment, such as the thirteenth embodiment and/or any intervening embodiment, the order-N integer transform may be an order-16 integer transform, and when processing the second intermediate output vector through successive order-N/2 integer matrices, the second transform unit may be adapted to (i) process the second intermediate output vector through a first order-8 integer matrix so as to form a first set of intermediary transform elements, (ii) process the first set of intermediary transform elements through a second order-8 integer matrix so as to form a second set of intermediary transform elements, (iii) process the second set of intermediary transform elements through a third order-8 integer matrix so as to form a third set of intermediary transform elements, and/or (iv) process the third set of intermediary transform elements through a fourth order-8 integer matrix so as to form the odd-indexed transform coefficients.

In an embodiment, such as the thirteenth embodiment and/or any intervening embodiment, the order-N integer transform may be an order-32 integer transform, and, when processing the second intermediate output vector through successive order-N/2 integer matrices, the second transform unit may be adapted to (i) process the second intermediate output vector through a first order-16 integer matrix so as to form a first set of intermediary transform elements, (ii) process the first set of intermediary transform elements through a second order-16 integer matrix so as to form a second set of intermediary transform elements, (iii) process the second set of intermediary transform elements through a third order-16 integer matrix so as to form a third set of intermediary transform elements, (iv) process the third set of intermediary transform elements through a fourth order-16 integer matrix so as to decompose the third set of intermediary transform elements into four vectors for transform by respective order-4 integer matrices, and/or apply each of the four vectors to the by respective order-4 integer matrices so as to form the odd-indexed transform coefficients.

CONCLUSION

Although features and elements are provided above in particular combinations, one of ordinary skill in the art will appreciate that each feature or element can be used alone or in any combination with the other features and elements. In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the provided methods.

No element, act, or instruction used in the description of the present application should be construed as critical or essential to the invention unless explicitly provided as such. Also, as used herein, the articles "a" and "an" are intended to include one or more items. For example, the article "an" in the phrase "in an embodiment" is intended to include, for example, "in a single embodiment", "in multiple embodiments", "in an embodiments" and/or "in all embodiments." Where only one item is intended, the term "single" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

What is claimed is:

1. An apparatus providing transform coding of residual video data, the apparatus comprising: a processor; and a memory, wherein: the memory comprises an even transform for forming even-indexed transform coefficients and an odd transform for forming odd-indexed transform coefficients; the even and odd transforms collectively represent an integer transform; the integer transform has an order and is orthogonal or approximately orthogonal; differences among norms of basis vectors of the integer transform matrix satisfy a given threshold which, when satisfied, indicates the norms of the basis vectors are approximately equal; the basis vectors approximate corresponding basis vectors of a discrete cosine transform (DCT) matrix; the odd transform comprises a plurality of successively ordered integer matrices; and each of the plurality of successively ordered integer matrices (i) has an order that is lower than the order of the integer transform, and (ii) comprises at most two non-zero elements per row and at most two non-zero elements per column; and the memory further comprises instructions executable by processor for: receiving the video data; processing the video data into a set of the even-indexed and odd-indexed transform coefficients, which processing includes transforming the video data using the even and odd transforms to form the even-indexed and odd-indexed transform coefficients; and outputting the set of the even-indexed and odd-indexed transform coefficients.

2. The apparatus of claim 1, wherein the memory further comprises: instructions executable by the processor for generating, and storing in the memory, the even and odd transforms.

3. The apparatus of claim 1, wherein the instructions executable by the processor for processing the video data, which, when executed by the processor, cause:

transform of a first vector, input into the even transform, into the even-indexed transform coefficients; and
transform of a second vector, input into the odd transform, into the odd-indexed transform coefficients, wherein the first and second vectors correspond to a vector of the data processed through a preconditioning matrix.

4. The apparatus of claim 3, wherein the instructions that cause the transform of a second vector into the odd-indexed transform coefficients comprise: instructions executable by the processor, which when executed by the processor, cause processing of the second vector through the successively ordered integer matrices.

5. The apparatus of claim 1, wherein:
the odd transform further comprises a plurality of integer matrices for processing a plurality of vectors output from the plurality of successively ordered integer matrices; and
each of the plurality of integer matrices has an order that is lower than the order of the plurality of successively ordered integer matrices.

6. The apparatus of claim 1, wherein the basis vectors approximate corresponding basis vectors of a discrete cosine transform (DCT) matrix in accordance with a measure of distortion satisfying a pre-defined threshold.

7. The apparatus of claim 5, wherein the instructions that cause the transform of a second vector into the odd-indexed transform coefficients comprise:
instructions executable by the processor, which when executed by the processor, cause (i) processing of the second vector through the successively ordered integer matrices, and (ii) processing of one of the plurality of vectors through a respective one of the plurality of integer matrices.

8. The apparatus of claim 6, wherein the measure of distortion is based on a subset of the basis vectors and the corresponding basis vectors of the DCT matrix.

9. The apparatus of claim 1, wherein each of the successively ordered integer matrices has an order that is one half of the order of the integer transform.

10. The apparatus of claim 1, wherein the even transform comprises at least one integer matrix, and wherein the at least one integer matrix has an order that is lower than the order of the integer transform.

11. The apparatus of claim 10, wherein the at least one integer matrix is scaled by a factor M, and wherein M is a positive integer.

12. The apparatus of claim 1, wherein transforming by the odd transform comprises obtaining a result of an application of a transform having an order one quarter of the order of the integer transform to each subband resulting from one-layer wavelet decomposition of the odd transform.

13. The apparatus of claim 12, wherein the result is scaled by a factor M, and wherein M is a positive integer.

14. The apparatus of claim 12, wherein the wavelet transform is a Haar transform.

15. The apparatus of claim 1, wherein the apparatus is any of a video encoder, video decoder, and a wireless transmit and/or receiver unit (WTRU).

16. A method for processing residual video data using even and odd transforms that collectively represent an integer transform having an order greater than or equal to sixteen, the method comprising:
receiving, at a preconditioning unit, a vector of residual video data;
processing the vector of residual video data at the preconditioning unit so as to form first and second vectors for transform;
receiving the first vector at a first transform unit;
transforming the first vector at the first transform unit so as to form even-indexed transform coefficients using basis vectors of at least one integer matrix of the even transform, wherein the at least one integer matrix of the even transform has an order lower than the order of the integer transform;
receiving the second vector at a second transform unit; and
transforming the second vector at the second transform unit so as to form odd-indexed transform coefficients by processing the second vector through successively ordered integer matrices of the odd transform, wherein each of the successively ordered integer matrices has (i) an order that is lower than the order of the integer transform, and (ii) at most two non-zero elements per row and at most two non-zero elements per column.

17. The method of claim 16, wherein the successively ordered integer matrices are based on an odd-part matrix having an order that is one quarter of the order of the integer transform, and wherein processing the second vector through successively ordered integer matrices comprises:
generating first and second subbands of the second vector; and
applying the odd-part matrix to each of the first and second subbands.

18. The method of claim 16, wherein the order of each of the successively ordered integer matrices is 8.

19. The method of claim 16, wherein at least one of the successively ordered integer matrices comprises symmetry of magnitudes along both diagonals.

20. The method of claim 16, wherein:
the order of the integer transform is sixteen;
processing the second vector through successively ordered integer matrices comprises:
processing the second vector through a first integer matrix so as to form a first set of intermediary transform elements;
processing the first set of intermediary transform elements through a second integer matrix so as to form a second set of intermediary transform elements;
processing the second set of intermediary transform elements through a third integer matrix so as to form a third set of intermediary transform elements; and
processing the third set of intermediary transform elements through a fourth integer matrix so as to form the odd-indexed transform coefficients; and
each of the first, second, third and fourth integer matrices has an order lower than the order of the integer transform.

21. The method of claim 16, wherein:
the order of the integer transform is thirty two;
processing the second vector through successively ordered integer matrices comprises:
processing the second vector through a first integer matrix so as to form a first set of intermediary transform elements;
processing the first set of intermediary transform elements through a second integer matrix so as to form a second set of intermediary transform elements;
processing the second set of intermediary transform elements through a third integer matrix so as to form a third set of intermediary transform elements;
processing the third set of intermediary transform elements through a fourth integer matrix so as to decompose the third set of intermediary transform elements into four vectors; and applying the four vectors to fifth, sixth, seventh and eighth integer matrices so as to form the odd-indexed transform coefficients;

each of the first, second, third and fourth integer matrices has an order lower than the order of the integer transform; and each of the fifth, sixth, seventh and eighth integer matrices have an order lower than the order of the fourth integer matrix.

22. An apparatus for processing residual video data using even and odd transforms having an order greater than or equal to sixteen, the apparatus comprising a preconditioning unit, a first transform unit, and a second transform unit, wherein:

the preconditioning unit is adapted to receive a vector of residual video data;

the preconditioning unit is adapted to process the vector of residual video data so as to form first and second vectors for transform;

the first transform unit is adapted to receive the first vector;

the first transform unit is adapted to transform the first vector so as to form even-indexed transform coefficients using basis vectors of at least one integer matrix of the even transform, wherein the at least one integer matrix of the even transform has an order lower than the order of the integer transform;

the second transform unit is adapted to receive the second vector; and the second transform unit is adapted to transform the second vector so as to form odd-indexed transform coefficients by processing the second vector through successively ordered integer matrices of the odd transform;

each of the successively ordered integer matrices has (i) an order that is lower than the order of the integer transform, and (ii) has at most two non-zero elements per row and at most two non-zero elements per column.

23. The apparatus of claim 22, wherein the successively ordered integer matrices are based on an odd-part matrix having an order that is one quarter of the order the integer transform, and wherein the second transform unit is adapted to (i) generate first and second subbands of the second vector, and (ii) apply the odd-part matrix to each of the first and second subbands when processing the second vector through successively ordered integer matrices.

24. The apparatus of claim 22, wherein the order of each of the successively ordered integer matrices is 8.

25. The apparatus of claim 22, wherein at least one of the successively ordered integer matrices comprises symmetry of magnitudes along both diagonals.

26. The apparatus of claim 22, wherein:

the order of the integer transform is sixteen;

when processing the second vector through successively ordered integer matrices, the second transform unit is adapted to:

process the second vector through a first integer matrix so as to form a first set of intermediary transform elements;

process the first set of intermediary transform elements through a second integer matrix so as to form a second set of intermediary transform elements;

process the second set of intermediary transform elements through a third integer matrix so as to form a third set of intermediary transform elements; and process the third set of intermediary transform elements through a fourth integer matrix so as to form the odd-indexed transform coefficients, and each of the first, second, third and fourth integer matrices has an order lower than the order of the integer transform.

27. The apparatus of claim 22, wherein:

the order of the integer transform is thirty two;

when processing the second vector through successively ordered integer matrices, the second transform unit is adapted to:

process the second vector through a first integer matrix so as to form a first set of intermediary transform elements;

process the first set of intermediary transform elements through a second integer matrix so as to form a second set of intermediary transform elements;

process the second set of intermediary transform elements through a third integer matrix so as to form a third set of intermediary transform elements;

process the third set of intermediary transform elements through a fourth integer matrix so as to decompose the third set of intermediary transform elements into four vectors; and apply the four vectors to fifth, sixth, seventh and eighth integer matrices so as to form the odd-indexed transform coefficients;

each of the first, second, third and fourth integer matrices has an order lower than the order of the integer transform; and each of the fifth, sixth, seventh and eighth integer matrices have an order lower than the order of the fourth integer matrix.

* * * * *